(12) United States Patent
Machida et al.

(10) Patent No.: US 6,897,261 B1
(45) Date of Patent: May 24, 2005

(54) BRANCHED OLEFINIC MACROMONOMER, OLEFIN GRAFT COPOLYMER, AND OLEFIN RESIN COMPOSITION

(75) Inventors: Shuji Machida, Ichihara (JP); Kazuo Sato, Ichihara (JP); Tomio Tatsumi, Ichihara (JP); Yasuhiro Goto, Ichihara (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 28 days.

(21) Appl. No.: 10/019,293

(22) PCT Filed: Jul. 18, 2000

(86) PCT No.: PCT/JP00/04811

§ 371 (c)(1),
(2), (4) Date: Jan. 4, 2002

(87) PCT Pub. No.: WO01/07493

PCT Pub. Date: Feb. 1, 2001

(30) Foreign Application Priority Data

Jul. 26, 1999 (JP) ............................................ 11/210543
Oct. 21, 1999 (JP) ............................................ 11/299006

(51) Int. Cl.[7] ........................ C08F 297/08; C08F 290/04
(52) U.S. Cl. ........................ 525/242; 525/240; 525/245; 526/348; 526/348.3; 526/351
(58) Field of Search ................................ 525/240, 242, 525/245; 526/348, 348.3, 351, 160, 170

(56) References Cited

U.S. PATENT DOCUMENTS

| | | |
|---|---|---|
| 5,608,009 A | 3/1997 | Machida et al. |
| 5,670,580 A | 9/1997 | Tazaki et al. |
| 5,739,225 A | 4/1998 | Tazaki et al. |
| 5,747,620 A | 5/1998 | Machida et al. |
| 5,955,557 A | 9/1999 | Machida et al. |
| 6,121,402 A | 9/2000 | Machida et al. |
| 6,169,154 B1 | 1/2001 | Machida et al. |
| 6,184,327 B1 * | 2/2001 | Weng et al. |
| 6,573,352 B1 * | 6/2003 | Tatsumi et al. ............. 526/351 |
| 6,660,809 B1 * | 12/2003 | Weng et al. ................ 525/245 |

FOREIGN PATENT DOCUMENTS

| | | |
|---|---|---|
| EP | 676421 | 10/1995 |
| EP | 727446 | 8/1996 |
| JP | 1-207248 | 8/1989 |
| JP | 5-43619 | 2/1993 |
| JP | 5-320260 | 12/1993 |
| JP | 11-349634 | 12/1999 |
| JP | 2000-38418 | 2/2000 |
| WO | 94/07930 | 4/1994 |

OTHER PUBLICATIONS

Derwent Abstracts, WO 98/55520, Dec. 10, 1998.
Derwent Publications, AN 1999–352874, JP 11–130807, May 18, 1999.
S. Ueki, et al., Science and Technology in Catalysis, No. 92, XP–001106222, pp. 359–362, "Synthesis of Propylene Macromonomer with Terminal Methacryl Group by Vanadium—Based Catalyst", 1995.

* cited by examiner

Primary Examiner—Caixia Lu
(74) Attorney, Agent, or Firm—Oblon, Spivak, McClelland, Maier & Neustadt, P.C.

(57) ABSTRACT

The invention relates to olefin branched macromonomers, olefin graft copolymers and olefin resin compositions having the advantage of good compatibility with polyolefin resins and good moldability and workability. The olefin branched macromonomer satisfies the following (a) and (b):

(a) its weight-average molecular weight (Mw) measured through gel permeation chromatography (GPC) falls between 400 and 200000;
(b) its vinyl content is at least 70 mol % of all the unsaturated groups in the macromonomer.

10 Claims, No Drawings

BRANCHED OLEFINIC MACROMONOMER, OLEFIN GRAFT COPOLYMER, AND OLEFIN RESIN COMPOSITION

TECHNICAL FIELD

The present invention relates to olefin branched macromonomers, olefin graft copolymers and olefin resin compositions having the advantages of good compatibility with polyolefin resins and good moldability and workability.

BACKGROUND ART

Polyolefins are thermoplastic resins having good chemical stability, good moldability and workability, and good mechanical properties, and, in addition, they are easy to recycle. Another advantage of the resins is that they give few harmful substances when incinerated. Therefore, it is believed that their applications will further increase in future. For their prospects in the field of polyolefin industry, it is expected that the resins having such good characteristics intrinsic thereto are further improved to make them have better properties to thereby expand their applications further more. For this, it is considered that one effective means is to compound different types of polyolefins into resin composites. For compounding them, it is an important technique to use compatibilizer. In the technical field that requires more high-level workability of resins, for example, in the field of large-size blow molding, expansion foaming through extrusion, sheet forming and thermoforming, it is desired to further improve the moldability and the workability of resins. For improving the moldability and the workability of resins, for example, branched polyolefins may be used for improving the melt flowability of resins.

In the related art technique, it is said that propylene macromonomers are employable as compatibilizers for polyolefin resins. Regarding propylene macromonomers, disclosed are a method for producing propylene prepolymers (Japanese Patent Laid-Open Nos. 207248/1989, 25215/1993); and a method of modifying vinylidene-type unsaturated terminals to thereby introduce a polar group thereinto (Japanese Patent Laid-Open No. 259582/1996). The former produces dimers such as 4-methylpentene-1, and its problem is that the degree of polymerization of the products is low. In the latter, the products produced are not copolymerizable as they are vinylidene-terminated, and a vinyl group must be introduced thereinto. Anyhow, the products of these methods are unsuitable for compatibilizers.

On the other hand, for one example of compounding different types of polyolefins, mentioned are graft copolymers. Some examples of graft polymers are disclosed in Japanese Patent Laid-Open No. 230717/1988 and International Patent Publication No. 502308/1996, but their melt workability and compatibility are not still so good.

The present invention is to provide novel olefin branched macromonomers, olefin graft copolymers, as well as propylene macromonomers, propylene graft copolymers, and also olefin resin compositions having good compatibility with polyolefin resins and having good moldability and workability.

DISCLOSURE OF THE INVENTION

We, the present inventors have assiduously studied in consideration of the above-mentioned viewpoints, and, as a result, have found that olefin branched macromonomers, olefin graft copolymers, as well as propylene macromonomers, propylene graft copolymers, and olefin resin compositions having specific primary structures and specific solution properties can attain the object of the invention. On the basis of these findings, we have completed the invention.

The invention provides olefin branched macromonomers, olefin graft copolymers and olefin resin compositions mentioned below (hereinafter referred to as "the first aspect of the invention"), and provides propylene macromonomers, propylene graft copolymers and olefin resin compositions mentioned below (hereinafter referred to as "the second aspect of the invention").

Specifically, the first aspect of the invention is as follows:

1. An olefin branched macromonomer satisfying the following (a) and (b):

(a) its weight-average molecular weight (Mw) measured through gel permeation chromatography (GPC) falls between 400 and 200000;

(b) its vinyl content is at least 70 mol % of all the unsaturated groups in the macromonomer.

2. The olefin branched macromonomer of above 1, which satisfies any of the following (i), (ii) and (iii):

(i) the ratio of the temperature dependency ($E_2$) of the macromonomer solution viscosity to the temperature dependency ($E_1$) of the solution viscosity of the linear polymer which has the same type of monomer, the same chemical composition and the same intrinsic viscosity as those of the macromonomer, $E_2/E_1$, satisfies the following relationship:

$$1.01 \leq E_2/E_1 \leq 2.5;$$

(ii) the ratio of the number-average molecular weight measured through GPC (GPC-Mn) to the number-average molecular weight measured through $^{13}$C-NMR (NMR-Mn) of the macromonomer satisfies the following relationship:

$$(GPC\text{-}Mn)/(NMR\text{-}Mn) > 1;$$

(iii) the macromonomer has branches existing not at the α- and/or β-substituents of the monomer that constitutes the macromonomer, and the number of the branches falls between 0.01 and 40 in one molecule of the macromonomer.

3. The olefin branched macromonomer of above 1 or 2, for which the monomer to constitute it is propylene, or a combination of propylene and at least one selected from ethylene, α-olefins having from 4 to 20 carbon atoms, cyclic olefins and styrenes, and of which the propylene content falls between 0.1 and 100 mol %.

4. The olefin branched macromonomer of above 1 or 2, for which the monomer to constitute it is ethylene, or a combination of ethylene and at least one selected from α-olefins having from 4 to 20 carbon atoms, cyclic olefins and styrenes, and of which the ethylene content falls between 50 and 99.9 mol %.

5. The olefin branched macromonomer of above 1 or 2, for which the monomer to constitute it is ethylene or propylene.

6. An olefin graft copolymer obtained by copolymerizing the olefin branched macromonomer of any of above 1 to 5 with at least one comonomer selected from ethylene, propylene, α-olefins having from 4 to 20 carbon atoms, cyclic olefins and styrenes, in the presence of a metallocene catalyst.

7. An olefin graft copolymer obtained by copolymerizing the olefin branched macromonomer of any of above 1 to 5 with at least one comonomer selected from ethylene, propylene, α-olefins having from 4 to 20 carbon atoms, cyclic olefins and styrenes, in the presence of a Ziegler-Natta catalyst.

8. The olefin graft copolymer of above 6 or 7, which satisfies the following (1) and/or (2):

(1) its intrinsic viscosity [η] measured in a solvent decalin at 135° C. falls between 0.3 and 15 dl/g;

(2) it contains from 0.01 to 70% by weight of the olefin branched macromonomer of any of above 1 to 5.

9. An olefin resin composition comprising 100 parts by weight of a thermoplastic resin, and from 0.05 to 70 parts by weight of the olefin graft copolymer of any of above 6 to 8.

10. The olefin resin composition of above 9, of which the relaxation rate of the long-term relaxation component measured through solid $^1$H-NMR ($1/R_1$) falls between 1.0 and 2.0 (1/sec).

11. The olefin resin composition of above 9 or 10, of which the ratio of the relaxation rate ($1/R_1$) of above 10 to the relaxation rate $(1/R_1)_0$ of the long-term relaxation component, measured through solid $^1$H-NMR, of a resin composition not containing the propylene branched macromonomer of any of above 1 to 5, $[(1/R_1)/(1/R_1)_0]$, satisfies the following relationship:

$$[(1/R_1)/(1/R_1)_0] \geq 1.01.$$

The second aspect of the invention is as follows:

1. A propylene macromonomer satisfying the following (a), (b) and (c):
   (a) its weight-average molecular weight (Mw) measured through gel permeation chromatography (GPC) falls between 800 and 500000;
   (b) its vinyl content is at least 70 mol % of all the unsaturated groups in the macromonomer;
   (c) its propylene content falls between 50 and 100 mol %.

2. The propylene macromonomer of above 1, for which the monomer to constitute it is propylene, or a combination of propylene and at least one selected from ethylene, α-olefins having from 4 to 20 carbon atoms, cyclic olefins and styrenes.

3. The propylene macromonomer of above 1 or 2, for which the monomer to constitute it is ethylene and propylene.

4. An olefin graft copolymer obtained by copolymerizing the propylene macromonomer of any of above 1 to 3 with at least one comonomer selected from ethylene, propylene, α-olefins having from 4 to 20 carbon atoms, cyclic olefins and styrenes, in the presence of a metallocene catalyst.

5. An olefin graft copolymer obtained by copolymerizing the propylene macromonomer of any of above 1 to 3 with at least one comonomer selected from ethylene, propylene, α-olefins having from 4 to 20 carbon atoms, cyclic olefins and styrenes, in the presence of a Ziegler-Natta catalyst.

6. The olefin graft copolymer of above 4 or 5, which contains from 0.01 to 40% by weight of the propylene macromonomer of any of above 1 to 3.

7. The propylene graft copolymer of any of above 4 to 6, which satisfies the following (1) and/or (2):
   (1) its intrinsic viscosity [η] measured in a solvent decalin at 135° C. falls between 0.3 and 15 dl/g;
   (2) the ratio of the weight-average molecular weight (Mw) to the number-average molecular weight (Mn) thereof measured through GPC, Mw/Mn, falls between 1.5 and 4.5.

8. An olefin resin composition comprising 100 parts by weight of a thermoplastic resin, and from 0.05 to 70 parts by weight of the propylene graft copolymer of any of above 4 to 7.

9. The olefin resin composition of above 8, of which the relaxation rate of the long-term relaxation component measured through solid $^1$H-NMR ($1/R_1$) falls between 1.0 and 2.0 (1/sec).

10. The olefin resin composition of above 8 or 9, of which the ratio of the relaxation rate ($1/R_1$) of above 9 to the relaxation rate $(1/R_1)_0$ of the long-term relaxation component, measured through solid $^1$H-NMR, of a resin composition not containing the propylene graft copolymer of any of above 4 to 7, $[(1/R_1)/(1/R_1)_0]$, satisfies the following relationship:

$$[(1/R_1)/(1/R_1)_0] \geq 1.01.$$

BEST MODES OF CARRYING OUT THE INVENTION

Embodiments of the invention are described below.

I. First Aspect of the Invention:

In this section, the first aspect of the invention will be simply referred to as "the invention".

As in the above, the invention provides olefin branched macromonomers, olefin graft copolymers and olefin resin composition.

The olefin branched macromonomer [1], the olefin graft copolymer [2] and the olefin resin composition [3] of the invention are described in detail hereinunder.

[1] Olefin Branched Macromonomer:

The olefin branched macromonomer of the invention satisfies the following (a) and (b):

(a) its weight-average molecular weight (Mw) measured through gel permeation chromatography (GPC) falls between 400 and 200000;

(b) its vinyl content is at least 70 mol % of all the unsaturated groups in the macromonomer.

The olefin branched macromonomer of the invention (hereinafter this will be referred to as "the macromonomer") has a low to middle-level molecular weight, and has side chains, in which the main chain or some side chains are vinyl-terminated. Since the macromonomer has side chains and contains many vinyl groups, it is effective in various chemical reactions such as typically grafting reaction. In addition, since its molecular weight falls in a broad range of from relatively low to high molecular weights, it is usable as the material for compatibilizers for various resins and also as a resin moldability improver.

The weight-average molecular weight (Mw) of the macromonomer of the invention, measured through GPC, falls between 400 and 200000, but preferably between 500 and 180000, more preferably between 600 and 150000, even more preferably between 700 and 130000, most preferably between 900 and 100000. Macromonomers having Mw of smaller than 400 are useless in production of graft copolymers, as their ability to improve resin compatibility and resin melt tension is not good; but those having Mw of larger than 200000 are unfavorable since the apparent terminal vinyl content thereof is extremely small and the graft copolymerization efficiency with them is poor.

For GPC for the invention, the following method is employable.

Method of GPC:

Device: Waters 150C
        detector, RI
        column, TOSO GMHHR-H(S)HT
    Solvent: 1,2,4-trichlorobenzene
    Temperature: 145° C.
    Flow Rate: 1.0 ml/min
    Calibration Curve: Universal Calibration
    Sample Concentration: 0.2%

In the invention, the vinyl content of the macromonomer falls between 70 and 100% of all the unsaturated groups in the macromonomer. Preferably, it falls between 75 and 100%, more preferably between 80 and 100%, most preferably between 85 and 100%. If the vinyl content is smaller than 70%, the efficiency in grafting reaction with the macromonomer is low, and the residual macromonomer lowers the physical properties of graft polymers.

The vinyl content relative to all the unsaturated groups in the macromonomer may be measured according to the following method (1) through $^1$H-NMR, or (2) through IR.

(1) ¹H-NMR Method:

From the data of ¹H-NMR, the peaks are assigned as follows:

4.8 ppm to 5.1 ppm: methylene proton of vinyl group 5.6 ppm to 5.85 ppm: methine proton of vinyl group 4 ppm to 6 ppm except the above peaks: other unsaturated bonds such as vinylidene group The vinyl content relative to all the unsaturated groups in the macromonomer is calculated in terms of the percentage of the vinyl groups to all the unsaturated groups in the macromonomer appearing within the range of from 4 ppm to 6 ppm.

(2) IR Method:

The sample to be measured is formed into a press sheet, and this is subjected to IR absorption spectrometry. From the IR data, the vinyl content is determined as follows: The macromonomer has the following three types of carbon—carbon unsaturated double bonds. Their peak positions are as in the following Table, and their data are obtained according to the formulae therein.

| Unsaturated Bond | Peak Position | Calculation |
| --- | --- | --- |
| trans | 963 cm$^{-1}$ | Nt = 0.083A$_{963}$/(ρ·t) |
| terminal vinyl | 907 cm$^{-1}$ | Nv = 0.114A$_{907}$/(ρ·t) |
| vinylidene | 888 cm$^{-1}$ | Nvd = 0.109A$_{888}$/(ρ·t) |

Nt, Nv, Nvd: the number of the unsaturated bonds per 100 carbons.
A: absorbance.
ρ: resin density (g/cc).
T: sample thickness (mm).

The terminal vinyl selectivity in the macromonomer is represented by:

Nv/(Nt+Nv+Nvd)×100 (%).

The macromonomer of the invention has branches, and the "branches" therein are not specifically defined so far as they are caused by the difference in the structure between branched macromonomers and non-branched, or that is, linear macromonomers. The structural difference between them includes, for example, the differences therebetween in the temperature dependence of solution viscosity, the terminal group structure, the stereospecificity, and the compositional ratio. More concretely, the "branches" may be specified by the following (i), (ii) and (iii). Any of these may apply to the present invention.

(i) Branches detected from the temperature dependence of solution viscosity:

For its branches, the macromonomer of the invention preferably satisfies the following requirement:

$$1.01 \leq E_2/E_1 \leq 2.5.$$

This indicates the ratio, $E_2/E_1$, of the temperature dependency ($E_2$) of the macromonomer solution viscosity to the temperature dependency ($E_1$) of the solution viscosity of the linear polymer which has the same type of monomer, the same chemical composition and the same intrinsic viscosity as those of the macromonomer, in which $E_2$ and $E_1$ are obtained according to the method of measuring the temperature dependency of polymer solution viscosity mentioned below.

More preferably, it satisfies $$1.03 \leq E_2/E_1/2.5,$$

even more preferably, $$1.04 \leq E_2/E_1 \leq 2.5,$$

most preferably, $$1.05 \leq E_2/E_1 \leq 2.5.$$

If the ratio is smaller than 1.01, the branch formation in the macromonomer is unsatisfactory, and the polymers obtained through grafting with the macromonomer are ineffective for improving the melt workability and the compatibility of polyolefin resins. On the other hand, in the macromonomer of which the ratio is larger than 2.5, the branch formation is good, but the macromonomer of the type lowers the mechanical properties of the graft polymers with it, and is therefore unfavorable.

The method for measuring the temperature dependency ($E_2$, $E_1$) of polymer solution viscosity is described in detail. In the invention, the temperature dependency ($E_2$, $E_1$) is measured according to the method that comprises the steps <1> to <4> mentioned below.

<1> Preparation of Linear Polymer:

To measure its $E_1$, a sample of the linear polymer is prepared. In case where the macromonomer of the invention is a homopolymer, prepared is a linear homopolymer having the same type of monomer and having the same intrinsic viscosity [η] measured in a solvent decalin at 135° C. as those of the homo-macromonomer. For example, the linear homopolymer may be prepared by polymerizing a monomer in a toluene solvent in the presence of a polymerization catalyst of Cp$_2$ZrCl$_2$/methylaluminoxane (Al/Zr≧500 by mol). The intrinsic viscosity of the linear homopolymer may be controlled in any ordinary manner, for example, by controlling the polymerization pressure, the monomer concentration, the polymerization temperature, the catalyst amount and the degree of hydrogen introduction. The difference between the intrinsic viscosity of the linear homopolymer thus prepared and that of the branched homopolymer (macromonomer) of the invention prepared according to method mentioned below must be within the range of ±10%.

In case where the macromonomer of the invention is a copolymer, prepared is a linear copolymer having the same type of monomer, the same copolymerization composition and the same intrinsic viscosity [η] measured in a solvent decalin at 135° C. as those of the co-macromonomer. For example, the linear copolymer may be prepared by copolymerizing at least two different types of monomers in a toluene solvent in the presence of a polymerization catalyst of Cp$_2$ZrCl$_2$/methylaluminoxane (Al/Zr≧500 by mol). The intrinsic viscosity of the linear copolymer may be controlled in any ordinary manner, for example, by controlling the olefin concentration, the polymerization pressure, the polymerization temperature, the catalyst amount and the degree of hydrogen introduction. The copolymerization referred to herein indicates the polymerization system in which at least two different types of monomers are previously mixed and then copolymerized in the form of their mixture. The difference between the intrinsic viscosity of the linear copolymer thus prepared and that of the branched copolymer (macromonomer) of the invention prepared according to method mentioned below, and the difference therebetween in the copolymerization composition must be both within the range of ±10%. The linear homopolymer and copolymer may be or may not be vinyl-terminated.

Except that mentioned hereinabove, the polymerization catalyst usable in obtaining the linear homopolymer and copolymer includes Ziegler-Natta catalysts comprising a transition metal compound of Group 4 of the Periodic Table and an organoaluminium compound (e.g., in Japanese Patent Publication No. 3356/1978), and high-activity Ziegler-Natta catalysts comprising a catalyst component prepared through contact of a magnesium compound with a titanium compound in the presence or absence of an electron donor, and an organoaluminium compound (e.g., in Japanese Patent Laid-Open Nos. 43094/1978, 135102/1980, 135103/1980, 18606/1981).

The transition metal compound of Group 4 of the Periodic Table for the Ziegler-Natta catalysts includes transition metal halides. For the transition metal halides, preferred are titanium halides, and more preferred is titanium trichloride. Titanium trichloride may be obtained in various methods. For example, titanium tetrachloride is reduced in any desired manner; the product obtained through the reduction is activated by milling it in a ball mill and/or by washing it with a solvent (for example, in an inert solvent and/or a polar compound-containing inert solvent); titanium trichloride or titanium trichloride eutectoids (e.g., $TiCl_3+(\frac{1}{3})AlCl_3$) are further co-ground along with any of amines, ethers, esters, sulfur derivatives, halogen derivatives, organic or inorganic nitrogen compounds or phosphorus compounds; or titanium trichloride having been liquefied in the presence of an ether compound is crystallized. In addition, those obtained according to the method described in Japanese Patent Publication No. 3356/1978 are also employable.

The magnesium compound includes, for example, metal magnesium, magnesium halides (e.g., magnesium chloride), and magnesium alkoxides (e.g., magnesium diethoxide).

The electron donor includes, for example, alcohols (e.g., ethanol) and esters (e.g., benzoates). For the organoaluminium compound serving as the other component of the catalysts, preferred are compounds of a formula, $AlR_nX_{3-n}$, in which R represents an alkyl group having from 1 to 10 carbon atoms, an alkoxy group having from 1 to 10 carbon atoms, or an aryl group having from 6 to 10 carbon atoms; X represents a halogen atom; and n is a value satisfying $0<n\leq3$. Concretely, they include triethylaluminium, triisobutylaluminium, tri-n-propylaluminium, diethylaluminium monochloride, diethylaluminium monobromide, diethylaluminium monoiodide, diethylaluminium monoethoxide, diisobutylaluminium monoisobutoxide, diethylaluminium monohydride, diisobutylaluminium monohydride, ethylaluminium sesquichloride, ethylaluminium dichloride. One or more of these may be used for the catalyst.

<2> Determination of Sample Concentration:

The solution viscosity of the linear polymer, homopolymer or copolymer prepared according to the method mentioned above, and that of the macromonomer of the invention to be prepared according to the method mentioned below are measured, for which the concentration of the sample may be controlled in the following manner. Concretely, the concentration of the olefin branched macromonomer of the invention and that of the control, linear polymer prepared as in the above <1> are so controlled that the relative viscosity of the two may be on the same level within a range of from 3 to 10, at a temperature predetermined for the measurement. For this, the relative viscosity of the two must be the same, not overstepping a difference of ±5% therebetween. Their relative viscosity is measured in a solvent of trichlorobenzene (TCB) at a temperature predetermined within a range of from 40° C. to 145° C.

<3> Measurement of Temperature Dependency of Relative Viscosity:

The relative viscosity of the TCB solution of each sample, of which the sample concentration has been determined in the above <2>, is measured at different temperatures. The condition for the measurement may be as follows:

Temperature Range for Measurement: 40° C. to 145° C.

Points for Measurement: Each sample is measured at least at 4 points, for which the temperature difference between the adjacent points is at least 10° C.

Accuracy of Temperature for Measurement: set point ±0.05° C.

Frequency of Measurement: One sample is measured at least 5 times at the same temperature. The highest value and the lowest value are omitted, and the remaining data are averaged.

Viscometer: Ubbellohde viscometer.

Solvent: TCB (containing 1000 ppm of antioxidant, BHT).

<4> Evaluation:

The data are plotted in coordinates, of which the X-axis indicates the reciprocal of the temperature (absolute temperature) for measurement, and the Y-axis indicates the logarithmic number of the relative viscosity ($T_1/T_0$; $T_1$ is the viscosity of the solution, and $T_0$ is the viscosity of the solvent alone), or indicates the logarithmic number of $T_1$ itself. A straight line is drawn through linear regression of the plotted curve. From the inclination of the straight line, $E_1$ of the linear polymer and $E_2$ of the olefin branched macromonomer of the invention are determined through least square approximation. In case where $T_1$ itself is for the Y-axis herein, it is natural that the same viscometer showing the same blank value ($T_0$) should used for the two, the control linear polymer and the macromonomer of the invention.

(ii) Branches detected from the ratio of the number-average molecular weight measured through GPC to that measured through $^{13}C$-NMR:

The ratio of the number-average molecular weight measured through GPC (GPC-Mn) to the number-average molecular weight measured through $^{13}C$-NMR (NMR-Mn) of the macromonomer of the invention satisfies the following relationship:

$$(GPC\text{-}Mn)/(NMR\text{-}Mn)>1.$$

Specifically, the ratio, (GPC-Mn)/(NMR-Mn), of the number-average molecular weight measured through GPC (GPC-Mn) of the macromonomer of the invention, to the number-average molecular weight thereof measured through $^{13}C$-NMR (NMR-Mn) (for this, the terminal groups in the macromonomer are quantified through $^{13}C$-NMR, and the number-average molecular weight of the macromonomer is derived from the data of the terminal groups) is larger than 1. Preferably, the ratio falls between 1 and 10, more preferably between 0.05 and 8, most preferably between 1.1 and 7. If the ratio is 1 or less, the number of the branches in the macromonomer is small or the macromonomer has no branches. If the macromonomer of the type is used in producing graft polymers, the resulting graft polymers are unfavorable since they are ineffective for improving the melt workability and the compatibility of polyolefin resins.

How to obtain these (GPC-Mn) and (NMR-Mn) is described in detail hereinunder.

<How to obtain (GPC-Mn)>

Using the device mentioned above and according to the method also mentioned above, the molecular weight of the macromonomer of the invention is measured. For example, in case where the macromonomer of the invention is a PP polymer, its number-average molecular weight (Mn) in terms of propylene is divided by the molecular weight of propylene, and the number of monomer molecules in one molecule of the macromonomer (GPC-Mn) is thus obtained. In case where it is a PE polymer, its number number-average molecular weight (Mn) in terms of ethylene is divided by the molecular weight of ethylene, and the number of monomer molecules in one molecule of the macromonomer (GPC-Mn) is thus obtained.

<How to obtain (NMR-Mn)>

The terminals of the macromonomer of the invention comprise an unsaturated terminal group such as vinyl, vinylidene or vinylene group, and a saturated terminal alkyl group such as, for example, n-butyl, isobutyl or propyl group. The macromonomer is subjected to $^{13}$C-NMR for these terminal groups, through which the presence and the quantity of the individual terminal groups are determined. Based on the results, the ratio of the number of monomer molecules to that of terminals constituting the main chain of the macromonomer is obtained, and this indicates the number of monomer molecules in one molecule of the macromonomer (NMR-Mn). Concretely, in case where the macromonomer of the invention is a homopolymer, the relative intensity (Im) corresponding to the number of monomer molecules constituting the macromonomer is determined from the absorption peaks for any of methyl, methylene or methine group appearing in the NMR pattern.

From the absorption peaks corresponding to the terminal groups mentioned above, the total sum of the relative intensity (Ie) corresponding to the number of the terminal groups is determined. On the presumption that the macromonomer is not branched and that the number of the terminals of the non-branched macromonomer is two, the number of the monomer molecules in one macromonomer molecule, (NMR-Mn) is represented as follows:

$$NMR\text{-}Mn=2(Im)/(Ie).$$

In case where the macromonomer of the invention is a copolymer, the relative intensity (Im) thereof that corresponds to the number of monomer molecules constituting the main chain of the copolymer is determined from the absorption peaks peculiar to the monomers constituting the main chain and from the copolymerization composition of the copolymer, and the other factors are determined in the same manner as that for the homopolymer. From these, the number of monomer molecules in one macromonomer molecule, NMR-Mn is determined.

(NMR-Mn) and (GPC-Mn) obtained in the manner as above are compared with each other.

(NMR-Mn) is calculated and determined on the presumption that the macromonomer has no branch. For branched macromonomers, therefore, this is estimated to be smaller than the actual molecular weight, and there is a difference between it and (GPC-Mn). In order that the presence of branches in the macromonomer is clarified according to this method, it is desirable that a sample of an obviously linear polymer is measured to calculate its molecular weight according to the method as above, and the ratio to the thus-calculated molecular weight of the sample is used as a factor. More preferably, samples of obviously linear polymers that differ in the molecular weight are measured to determine the factor. Using the thus-determined factor, the accuracy in clarifying the presence of the branches in the macromonomer is increased. The obviously linear samples referred to herein are those of the polymer produced according to the method mentioned hereinunder. With the factor, f, the presence of the branches in the macromonomer is represented more accurately by f×[(GPC-Mn)/(NMR-Mn)], and this is more preferred in the invention. (iii) The macromonomer has branches existing not at the α- and/or β-substituents of the monomer molecules that constitute the macromonomer, and the number of the branches falls between 0.01 and 40 in one molecule of the macromonomer. The method for measuring (iii) is described concretely. It includes the following three methods <1>, <2> and <3>. In the invention, any of these methods is employable. The summary of these methods is described.

<1> Method of GPC:

The amount of the oligomer molecules fed into the reaction system for forming the side chains of the macromonomer, and the amount of the non-reacted oligomer molecules that have remained in the system after the branch-forming reaction are quantified, and the amount of the branches in the macromonomer formed is determined from the thus-quantified data.

<2> Method of Composition Analysis:

This is for branched macromonomers which comprise side chains and a main chain having a sequence completed after the branch-forming reaction and in which some types of monomer molecules are only in the side chains but not in the main chain. The branched macromonomers of the type are analyzed for the copolymerization composition, and the branches therein are quantified.

<3> Method of Stereospecificity Analysis:

This is for branched macromonomers in which the side chains significantly differ from the main chain having a sequence completed after the branch-forming reaction in point of the stereospecificity. The branched macromonomers of the type are analyzed for the stereospecificity, and the branches therein are quantified.

These methods are described in detail hereinunder.

<1> Method of GPC:

The reaction mixture after the process of producing a branched macromonomer (this is in the form of a mixture of the branched macromonomer formed and the side-chain-forming but non-reacted oligomer) is subjected to GPC, through which the ratio (a) of the branched macromonomer to the side-chain-forming but non-reacted oligomer is determined. Specifically, the ratio, a (%), indicates the proportion of the non-reacted oligomer moiety to the total peak area in GPC. In this case, when the neighboring peaks are near to each other, the GPC pattern is processed for waveform separation. The molecular weight of the side-chain-forming oligomer and the molecular weight distribution thereof can be previously determined. Therefore, the waveform separation of the GPC pattern may be effected with accuracy.

Next, the amount of the side-chain-forming oligomer fed into the polymerization system is referred to as b (gram); and the yield of the reaction mixture after the production of the branched macromonomer is referred to c (gram). From these a, b and c, the branches in the branched macromonomer can be qualified.

Specifically, the amount of the non-reacted oligomer is represented by:

$$c \times a/100 \text{ (gram)}.$$

Accordingly, the amount of the oligomer taken in the branched macromonomer to form the branches is represented by:

$$b-[c \times a/100] \text{ (gram)}.$$

On the other hand, the actual yield of the branched macromonomer is represented by:

$$c(1-a/100) \text{ (gram)}.$$

Accordingly, the weight ratio of the oligomer existing in the branched macromonomer as its branches is defined by:

$$\{b-[c \times a/100]\}/[c(1-a/100)] \text{ (gram/gram)}.$$

In general, this value falls between 0.0001 and 0.7, preferably between 0.0005 and 0.6, more preferably between 0.0007 and 0.55, even more preferably between 0.0008 and 0.50, most preferably between 0.001 and 0.50.

If this value is smaller than 0.0001, the branch formation in the macromonomer is insufficient, and the graft polymers with the macromonomer are ineffective for improving the melt workability and the compatibility of polyolefin resins. On the other hand, if it is larger than 0.7, the branch formation in the macromonomer is good, but the macromonomer lowers the graft copolymers with it and is therefore unfavorable.

The number of branches in one branched macromonomer is represented as follows:

The number-average molecular weight of the side-chain-forming oligomer measured through GPC is indicated by $(Mn)^M$; and the molecular weight of the monomer (this corresponds to the molecular weight of ethylene when GPC is in terms of polyethylene, but corresponds to the molecular weight of propylene when GPC is in terms of polypropylene) is indicated by M. The weight of the oligomer taken in the above-mentioned, branched macromonomer as its side chains is indicated by:

$\{b-[c \times a/100]\}$ (gram).

From these values, the mean degree of polymerization (Pn) of the side-chain-forming oligomer is indicated by:

$Pn=(Mn)/M;$ and the number, m, of the monomer molecules constituting the side-chain-forming oligomer is indicated by:

$m=\{b-[c \times a/100]\}/M$ (mol).

Accordingly, the number of molecules of the side-chain-forming oligomer, m/Pn (mol), is defined as follows:

$\{b-[c \times a/100]\}/(Mn)^M$ (mol).

In the same manner as above, the number of molecules of the branched macromonomer (mol) is calculated.

The number-average molecular weight of the branched macromonomer measured through GPC is indicated by $(Mn)^B$. One method for determining this value is based on the data of GPC of the reaction mixture after the production of the branched macromonomer (the mixture is in the form of the branched macromonomer and the side-chain-forming but non-reacted oligomer) like that mentioned hereinabove. In case where the branched macromonomer is obviously separated from the side-chain-forming but non-reacted oligomer in the reaction mixture, the value of $(Mn)^B$ is determined from the peaks of the branched macromonomer appearing in the high-molecular weight range. In case where the neighboring peaks are near to each other, the GPC pattern may be processed for waveform separation.

The molecular weight of the side-chain-forming oligomer and the molecular weight distribution thereof can be previously determined. Therefore, the waveform separation of the GPC pattern may be effected with accuracy. After the GPC pattern has been thus processed for waveform separation, $(Mn)^B$ is determined from the peaks of the branched macromonomer appearing in the high-molecular weight range of the pattern.

Another method for determining the value $(Mn)^B$ is as follows: The side-chain-forming but non-reacted oligomer is removed from the reaction mixture through solvent fractionation, and $(Mn)^B$ is determined from the GPC pattern of the thus-fractionated branched macromonomer.

For the solvent to be used in the method, the good solvent includes, for example, aliphatic hydrocarbon solvents such as hexane, heptane, octane; alicyclic saturated hydrocarbon solvents such as cyclohexane; aromatic hydrocarbon solvents such as benzene, toluene, xylene; TCB, decahydronaphthalene; and halogenohydrocarbon solvents such as chlorobenzene, tetrachloroethylene. The bad solvent includes, for example, alcohols such as isopropanol, hexyl alcohol, ethyl alcohol, methyl alcohol, and ethers. The solvent fractionation may be effected in any ordinary manner, for which the blend ratio of the good solvent and the bad solvent, the temperature and the temperature pattern may be suitably controlled.

The molecular weight of the monomer (this corresponds to the molecular weight of ethylene when GPC is in terms of polyethylene, but corresponds to the molecular weight of propylene when GPC is in terms of polypropylene) is indicated by M; and the actual yield of the branched macromonomer mentioned above is indicated by:

$c(1-a/100)$ (gram).

Similarly, the number of molecules of the branched macromonomer is indicated by:

$[c(1-a/100)]/(Mn)^B$ (mol).

Accordingly, the number of the branches existing in one branched macromonomer molecule is defined as follows:

The ratio of side-chain-forming oligomer molecules/branched macromonomer molecules is represented by:

$[\{b-(c \times a/100)\}/\{c(1-a/100)\}] \times [(Mn)^B/(Mn)^M]$.

In general, this value falls between 0.01 and 40/macromonomer molecule,
preferably between 0.05 and 35,
more preferably between 0.1 and 30,
even more preferably between 0.15 and 30,
most preferably between 0.2 and 25.

If this is smaller than 0.01, the branch formation in the macromonomer is unsatisfactory, and the polymers obtained through grafting with the macromonomer are ineffective for improving the melt workability and the compatibility of polyolefin resins. On the other hand, in the macromonomer of which the ratio is larger than 40, the branch formation is good, but the macromonomer of the type lowers the mechanical properties of the graft polymers with it, and is therefore unfavorable.

<2> Method of Composition Analysis:

The number-average molecular weight of the side-chain-forming oligomer is indicated by $(Mn)^M$; and the copolymerization composition of the monomer existing only in the side chains is indicated by $[(Mc)^M]$ (mol %). The molecular weight of the monomer (this corresponds to the molecular weight of ethylene when GPC is in terms of polyethylene, but corresponds to the molecular weight of propylene when GPC is in terms of polypropylene) is indicated by M. The number of the monomer molecules in one side-chain-forming oligomer molecule is represented by:

$[(Mn)^M/M] \cdot [(Mc)^M/100]$ (mol).

The number-average molecular weight of the branched macromonomer is indicated by $(Mn)^B$; and the copolymerization composition of the monomer existing only in the side chains is indicated by $[(Mc)^B]$ (mol %). In the same manner as above, the number of the monomer molecules existing only in the side chains in one macromonomer is represented by:

$[(Mn)^B/M] \cdot [(Mc)^B/100]$.

Accordingly, the number of branches in one branched macromonomer molecule is represented by:

$[(Mn)^B (Mc)^B]/[(Mn)^M (Mc)^M]$.

In general, this value falls between 0.01 and 40/macromonomer molecule,
preferably between 0.05 and 35,
more preferably between 0.1 and 30,
even more preferably between 0.15 and 30,
most preferably between 0.2 and 25.

If this is smaller than 0.01, the branch formation in the macromonomer is unsatisfactory, and the polymers obtained through grafting with the macromonomer are ineffective for improving the melt workability and the compatibility of polyolefin resins. On the other hand, in the macromonomer of which the ratio is larger than 40, the branch formation is good, but the macromonomer of the type lowers the mechanical properties of the graft polymers with it, and is therefore unfavorable.

<3> Method of Stereospecificity Analysis:

In this method, the stereospecificity (corresponding to the index of the stereospecificity indicated by the meso-fraction ([mm] % or [mmmm] %) or the racemi-fraction ([rr] % or [rrrr]%) measured through $^{13}$C-NMR) of the side-chain-forming oligomers constituting the branched macromonomer is represented by $(Tc)^M$; and the number-average molecular weight of the oligomers measured through GPC is by $(Mn)^M$. The stereospecificity of the branched macromonomer is represented by $(Tc)^B$; and the number-average molecular weight thereof is by $(Mn)^B$. The stereospecificity of the polymer with no side-chain-forming oligomer is represented by Tc.

First determined is the ratio of the side chains to the main chain of the branched macromonomer, or that is, the sequence ratio of the two in the branched macromonomer. Based on the additivity of the stereospecificity, $(Tc)^M$, of the side-chain-forming oligomer to the stereospecificity, Tc, of the polymer with no side-chain-forming oligomer, the stereospecificity, $(Tc)^B$, of the branched macromonomer is represented as follows:

$(Tc)^B = Tc(1-X) + (Tc)^M X.$

In this, X means the existence ratio of the side-chain-forming oligomer in the branched macromonomer (0<X<1). That is, X is as follows:

$X = [Tc - (Tc)^B]/[Tc - (Tc)^M].$

The mean degree of polymerization (Pn) of the side-chain-forming oligomer is:

$Pn = (Mn)^M/M,$ and the number, m (mol), of the monomer molecules in the side-chain-forming oligomer is:

$m = X/M$ (mol).

Accordingly, the number of the side-chain-forming oligomer molecules is m/Pn (mol), and is defined as follows:

$X/(Mn)^M$ (mol).

Similarly, the number of the branched macromonomer molecules is defined by $1/(Mn)^B$. Accordingly, the number of branches in one branched macromonomer molecule is represented by:

$[Tc - (Tc)^B](Mn)^B/[Tc - (Tc)^M](Mn)^M.$

The range of this value is the same as in the above <2>.

Regarding the "branches" in the macromonomer of the invention, the macromonomer may be subjected to $^{13}$C-NMR to directly detect the ternary carbons at the branch points therein, and the number of branches in the macromonomer may be calculated from the thus-detected data. This method is effective for the branched macromonomer having a relatively large amount of branches. Measured through $^{13}$C-NMR, the macromonomer of the invention has from 0.01 to 40 ternary carbons in one molecule. Preferably, it has from 0.1 to 15 ternary carbons in one molecule. The condition in the $^{13}$C-NMR measurement may be the same as that mentioned hereinabove.

In addition to the above-mentioned requirements for it, the olefin branched macromonomer of the invention may be such that one and the same or different two or more types of monomers form the polymer chain at any branch point therein.

The olefin branched macromonomer of the invention may also be such that the stereospecificity of the polymer chain is any of isotactic, atactic or syndiotactic stereospecificity at any branch point therein. Further, it may be such that the copolymerization composition of the polymer chain is the same or different at any branch point therein.

The olefin branched macromonomer [1] of the invention is not specifically defined so far as it satisfies the above-mentioned requirements. The constitutive units of the macromonomer may be any of olefin homopolymers or olefin copolymers, or may also be in any form of their combinations. Concretely, atactic polypropylene is represented by APP; isotactic polypropylene is by IPP; syndiotactic polypropylene is by SPP; and X-g-Y indicates grafting of X with Y. Examples of the macromonomer that comprises homopolymers are APP-g-APP, APP-g-IPP, APP-g-SPP, IPP-g-IPP, IPP-g-SPP, and SPP-g-SPP. In these, vinyl groups may be in any of APP, IPP or SPP. Of such macromonomers of homopolymers, preferred are those of propylene (APP, IPP).

Examples of the macromonomer that comprises homopolymers and copolymers are IPP-g-PE, APP-g-PE, SPP-g-PE, in which PE means polyethylene. Copolymers of propylene (P) and ethylene (E) are represented by (P-co-E) in which -co- means copolymerization of the two. Examples of the macromonomer that comprises the copolymer, (P-co-E) are IPP-g-(P-co-E); those in which ethylene (E) is replaced with any of α-olefins having from 4 to 20 carbon atoms, such as butene, hexene and octene, or is replaced with any of styrene derivatives or cyclic olefins; and those in which IPP is replaced with any of APP or SPP. Concretely mentioned are those with a mark "O" in the following matrix, in which $C_{4-20}$ means α-olefins having from 4 to 20 carbon atoms; Cyclo and Cy mean cyclic olefins; and St means styrene derivatives.

| (B) Side Chain or Main Chains | (A) Main Chain or Side Chains | | | |
|---|---|---|---|---|
| | P-co-E | P-co-$C_{4-20}$ | P-co-Cyclo | P-co-St |
| IPP | O | O | O | O |
| APP | O | O | O | O |
| SPP | O | O | O | O |

Main chain or Side chains: This means combinations of Main chain (A) and Side chains (B), and combinations of main chain (B) and Side chains (A).

Examples of the macromonomer that comprises copolymers are those with a mark "O" in the following matrix.

| | | Main Chain or Side Chains | | | | | |
|---|---|---|---|---|---|---|---|
| | | P-co-E | P-co-$C_{4-20}$ | P-co-Cy | P-co-St | E-co-$C_{4-20}$ | E-co-Cy |
| Side Chain or Main Chains | P-co-E | 0 | 0 | 0 | 0 | 0 | 0 |
| | P-co-$C_{4-20}$ | | 0 | 0 | 0 | 0 | 0 |
| | P-co-Cy | | | 0 | 0 | 0 | 0 |
| | P-co-St | | | | 0 | 0 | 0 |
| | E-co-$C_{4-20}$ | | | | | 0 | 0 |
| | E-co-Cy | | | | | | 0 |

P-co-E: propylene-ethylene copolymer
P-co-$C_{4-20}$: propylene-$C_{4-20}$ α-olefin copolymer
P-co-Cy: propylene-cyclic olefin copolymer
P-co-St: propylene-styrene copolymer
E-co-$C_{4-20}$: ethylene $C_{4-20}$ α-olefin copolymer
E-co-Cy: ethylene-cyclic olefin copolymer
Main chain or Side chains: This means combinations of Main chain (A) and Side chains (B), and combinations of Main chain (B) and Side chains (A).

Of the macromonomers of copolymers mentioned above, especially preferred are the following two.

(1) Olefin branched macromonomers comprising propylene and at least one selected from ethylene, α-olefins having from 4 to 20 carbon atoms, cyclic olefins and styrenes, and having a propylene content of from 0.1 to 99.9 mol %, preferably from 0.2 to 99 mol %, more preferably from 1.0 to 95 mol %, even more preferably from 2 to 95 mol %, most preferably from 5 to 90 mol %.

(2) Olefin branched macromonomers comprising ethylene and at least one selected from α-olefins having from 4 to 20 carbon atoms, cyclic olefins and styrenes, and having an ethylene content of from 50 to 99.9 mol %, preferably from 60 to 99 mol %.

The olefin in the olefin branched macromonomer of the invention includes propylene, ethylene, α-olefins having from 4 to 20 carbon atoms, cyclic olefins and styrenes.

The α-olefins having from 4 to 20 carbon atoms include, for example, α-olefins such as 1-butene, 3-methyl-1-butene, 4-methyl-1-butene, 4-phenyl-1-butene, 1-pentene, 3-methyl-1-pentene, 4-methyl-1-pentene, 3,3-dimethyl-1-pentene, 3,4-dimethyl-1-pentene, 4,4-dimethyl-1-pentene, 1-hexene, 4-methyl-1-hexene, 5-methyl-1-hexene, 6-phenyl-1-hexene, 1-octene, 1-decene, 1-dodecene, 1-tetradecene, 1-hexadecene, 1-octadecene, 1-eicosene, vinylcyclohexane; and halogen-Concretely, substituted α-olefins such as hexafluoropropene, tetrafluoroethylene, 2-fluoropropene, fluoroethylene, 1,1-difluoroethylene, 3-fluoropropene, trifluoroethylene, 3,4-dichloro-1-butene.

The cyclic olefins includes those of the following general formula (I-1):

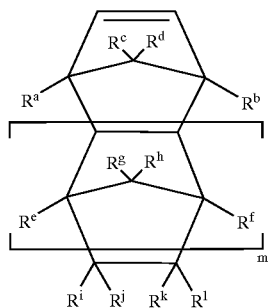

(I-1)

wherein $R^a$ to $R^1$ each represent a hydrogen atom, a hydrocarbon group having from 1 to 20 carbon atoms, or a halogen-, oxygen- or nitrogen-containing substituent; m indicates an integer of 0 or more; $R^i$ and $R^j$ each combined with $R^j$ and $R^i$, respectively, may form a ring; and $R^a$ to $R^1$ may be the same or different.

In the cyclic olefins of formula (I-1), $R_a$ to $R^1$ each represent a hydrogen atom, a hydrocarbon group having from 1 to 20 carbon atoms, or a halogen-, oxygen- or nitrogen-containing substituent, as so mentioned hereinabove.

Concretely the hydrocarbon group having from 1 to 20 carbon atoms includes, for example, an alkyl group having from 1 to 20 carbon atoms such as methyl, ethyl, n-propyl, isopropyl, n-butyl, isobutyl, t-butyl and hexyl groups; an aryl, alkylaryl or arylalkyl group having from 6 to 20 carbon atoms such as phenyl, tolyl and benzyl groups; an alkylidene group having from 1 to 20 carbon atoms such as methylidene, ethylidene and propylidene groups; and an alkenyl group having from 2 to 20 carbon atoms such as vinyl and allyl groups. However, $R^a$, $R^b$, $R^e$ and $R^f$ must not be an alkylene group. In case where any of $R^c$, $R^d$, $R^g$ to $R^l$ is an alkylidene group, the carbon atom to which it is bonded does not have any other substituent.

Concretely, the halogen-containing substituent includes, for example, a halogen atom such as fluorine, chlorine, bromine and iodine atoms; and a halogen-substituted alkyl group having from 1 to 20 carbon atoms such as chloromethyl, bromomethyl and chloroethyl groups.

The oxygen-containing substituent includes, for example, an alkoxy group having from 1 to 20 carbon atoms such as methoxy, ethoxy, propoxy and phenoxy groups; and an alkoxycarbonyl group having from 1 to 20 carbon atoms such as methoxycarbonyl and ethoxycarbonyl groups.

The nitrogen-containing substituent includes, for example, an alkylamino group having from 1 to 20 carbon atoms such as dimethylamino and diethylamino groups, and a cyano group.

Examples of the cyclic olefins of formula (I-1) are norbornene, 5-methylnorbornene, 5-ethylnorbornene, 5-propylnorbornene, 5,6-dimethylnorbornene, 1-methylnorbornene, 7-methylnorbornene, 5,5,6-trimethylnorbornene, 5-phenylnorbornene, 5-benzylnorbornene, 5-ethylidenenorbornene, 5-vinylnorbornene, 1,4,5,8-dimethano-1,2,3,4,4a,5,8,8a-octahydronaphthalene, 2-methyl-1,4,5,8-dimethano-1,2,3,4, 4a,5,8,8a-octahydronaphthalene, 2-ethyl-1,4,5,8-dimethano-1,2,3,4,4a,5,8,8a-octahydronaphthalene, 2,3-dimethyl-1,4,5,8-dimethano-1,2,3,4,4a,5,8,8a-octahydronaphthalene, 2-hexyl-1,4,5,8-dimethano-1,2,3,4, 4a,5,8,8a-octahydronaphthalene, 2-ethylidene-1,4,5,8-dimethano-1,2,3,4,4a,5,8,8a-octahydronaphthalene, 2-fluoro-1,4,5,8-dimethano-1,2,3,4,4a,5,8,8a-octahydronaphthalene, 1,5-dimethyl-1,4,5,8-dimethano-1,2, 3,4,4a,5,8,8a-octahydronaphthalene, 2-cyclohexyl-1,4,5,8-dimethano-1,2,3,4,4a,5,8,8a-octahydronaphthalene, 2,3-dichloro-1,4,5,8-dimethano-1,2,3,4,4a,5,8,8a-octahydronaphthalene, 2-isobutyl-1,4,5,8-dimethano-1,2,3,4,4a,5,8,8a-octahydronaphthalene, 1,2-dihydrocyclopentadiene, 5-chloronorbornene, 5,5-dichloronorbornene, 5-fluoronorbornene, 5,5,6-trifluoro-6-trifluoromethylnorbornene, 5-chloromethylnorbornene, 5-methoxynorbornene, 5,6-dicarboxynorbornene anhydrate, 5-dimethylaminonorbornene, and 5-cyanonorbornene.

The styrenes for use herein are not specifically defined, but preferred are styrene, alkylstyrenes, and divinylbenzene. More preferred are styrene, α-methylstyrene, p-methylstyrene and divinylbenzene.

The styrenes include, for example, styrene; alkylstyrenes such as p-methylstyrene, p-ethylstyrene, p-propylstyrene, p-isopropylstyrene, p-butylstyrene, p-tert-butylstyrene, p-phenylstyrene, o-methylstyrene, o-ethylstyrene, o-propylstyrene, o-isopropylstyrene, m-methylstyrene, m-ethylstyrene, m-isopropylstyrene, m-butylstyrene, mesitylstyrene, 2,4-dimethylstyrene, 2,5-dimethylstyrene, 3,5-dimethylstyrene; alkoxystyrenes such as p-methoxystyrene, o-methoxystyrene, m-methoxystyrene; and halogenostyrenes such as p-chlorostyrene, m-chlorostyrene, o-chlorostyrene, p-bromostyrene, m-bromostyrene, o-bromostyrene, p-fluorostyrene, m-fluorostyrene, o-fluorostyrene, o-methyl-p-fluorostyrene. Further mentioned are trimethylsilylstyrene, vinylbenzoates, and divinylbenzene.

In the invention, one or more of the above-mentioned olefins may be used either singly or as combined in any desired manner.

The method for producing the olefin branched macromonomer [1] of the invention is described in detail hereinunder. For producing the olefin branched macromonomer [1] of the invention, for example, olefins are homopolymerized or copolymerized in the presence of a metallocene catalyst.

The metallocene catalyst includes, for example, transition metal compounds having one or two ligands of cyclopentadienyl, substituted cyclopentadienyl, indenyl and substituted indenyl groups, as in Japanese Patent Laid-Open Nos. 19309/1983, 130314/1986, 163088/1991, 300887/1992, 211694/1992, and International Patent Publication No. 502036/1989, and those transition metal compounds in which the ligands are geometrically controlled, and these are characterized in that the properties of their active points are unified. For the transition metal in these transition metal compounds, preferred are those of Group 4 of the Periodic Table, concretely, zirconium, titanium and hafnium. Especially preferred are zirconium and hafnium.

In olefin polymerization or copolymerization in the presence of such a metallocene catalyst, terminal vinyl groups are formed through movement of the β-proton or β-methyl group at the ethylene terminal or propylene terminal of olefins. Preferably, therefore, the metallocene catalyst for use in the invention is one that induces the reaction at any of these two sites.

Examples of the metallocene catalyst usable herein are pentamethylcyclopentadienylzirconium trichloride, bis(pentamethylcyclopentadienyl)zirconium dichloride, indenylzirconium trichloride, bis(indenyl)zirconium dichloride, dimethylsilylene-bis(indenyl)zirconium dichloride, (dimethylsilylene)(dimethylsilylene)-bis(indenyl)zirconium dichloride, (dimethylsilylene)-bis(2-methyl-4-phenylindenyl)zirconium dichloride, (dimethylsilylene)-bis(benzoindenyl)zirconium dichloride, ethylene-bis(indenyl)zirconium dichloride, (ethylene)(ethylene)-bis(indenyl)zirconium dichloride, (ethylene)(ethylene)-bis(3-methylindenyl)zirconium dichloride, (ethylene)(ethylene)-bis(4,7-dimethylindenyl)zirconium dichloride, (tert-butylamido) (tetramethyl-$\eta^5$-cyclopentadienyl)-1,2-ethanediylzirconium dichloride, (tert-butylamido)dimethyl(tetramethyl-$\eta^5$-cyclopentadienyl)silanezirconium dichloride, (methylamido) (tetramethyl-$\eta^5$-cyclopentadienyl)-1,2-ethanediylzirconium dichloride, and compounds derived from them by substituting zirconium therein with any of hafnium or titanium.

A co-catalyst may be used along with the metallocene catalyst. For it, any of those described in the above-mentioned patent publications may be used. Preferred examples of the co-catalyst for use herein are linear or cyclic aluminoxanes (e.g., methylaluminoxane), ionic compounds (e.g., N,N-dimethylammonium tetrakis(pentafluorophenyl) borate, triethylammonium tetraphenylborate), Lewis acids (e.g., boron compounds such as triphenyl borate, tris(pentafluorophenyl) borate), and alkylaluminiums (e.g., tri-alkylaluminiums such as triethylaluminium, isobutylaluminium).

Olefin homopolymerization or copolymerization in the presence of the catalyst as above to give the olefin branched macromonomer of the invention may be effected in any known manner. For example, it may be effected in any mode of slurry polymerization, solution polymerization, vapor-phase polymerization, or liquid-phase polymerization in which the monomer of propylene or other α-olefins serves as a medium. In slurry polymerization, any solvent generally used in ordinary polymerization may be used. For example, usable are inert hydrocarbon solvents such as pentane, hexane, heptane, octane, nonane, decane, dodecane, cyclohexane, toluene. Of those, preferred are hexane, heptane, octane and toluene. While polymerized, the molecular weight of the polymer to be produced can be controlled. For controlling the molecular weight of the polymer, any known method may be employable. In general, the reaction temperature, the monomer concentration and the catalyst amount are varied for the molecular weight control. For producing the macromonomer of the invention, employable is any mode of one-stage polymerization or two-stage or more multi-stage polymerization.

The olefin to be (co)polymerized into the macromonomer of the invention includes propylene, ethylene, α-olefins having from 4 to 20 carbon atoms, cyclic olefins and styrenes. For specific examples of the α-olefins having from 4 to 20 carbon atoms, cyclic olefins and styrenes, referred to are those concretely mentioned hereinabove.

The condition of olefin homopolymerization or copolymerization to give the macromonomer of the invention is so controlled that the macromonomer produced has a branched structure and has an increased molecular weight. For example, preferred is low-temperature polymerization at 0° C. or lower, or polymerization for which the monomer concentration is increased. In general, the reaction temperature is not higher than 0° C., preferably falling between −78 and 0° C.; the reaction pressure falls between 0.01 and 45 kg/cm² G, preferably between 0.05 ad 40 kg/cm² G. The reaction time may fall between 0.1 an 10 hours. It is effective to pre-polymerize the olefins at low temperature under low pressure. Concretely, the olefins are prepolymerized at a temperature falling between −78 and 80° C., preferably between −50 and 60° C., under a pressure falling between atmospheric pressure and 10 kg/cm² G, preferably between 0.05 and 5 kg/cm² G, for from 1 minute to 24 hours, preferably from 5 minutes to 12 hours. The degree of prepolymerization may fall between 1 and 1000% by weight, preferably between 3 and 800% by weight per gram of the catalyst. The monomer to be used for the prepolymerization may be an α-olefin having 2 or more carbon atoms, preferably propylene.

The polymer product thus obtained is separated from the non-reacted monomers and the solvent used. Optionally, it may be subjected to post-treatment for deashing, washing and drying.

[2] Olefin Graft Copolymer:

The olefin graft copolymer of the invention is described.

The olefin graft copolymer of the invention is a polymer obtained by copolymerizing the above-mentioned, olefin branched macromonomer [1] with at least one comonomer selected from ethylene, propylene, α-olefins having from 4 to 20 carbon atoms, cyclic olefins and styrenes, in the presence of a metallocene catalyst or a Ziegler-Natta catalyst, preferably in the presence of a metallocene catalyst.

The metallocene catalyst is described hereinabove. The Ziegler-Natta catalyst includes, for example, those comprising a transition metal compound of Group 4 of the Periodic Table and an organoaluminium compound (for example, as in Japanese Patent Publication No. 3356/1978); and high-activity Ziegler-Natta catalysts comprising a catalyst component obtained through contact of a magnesium compound with a titanium compound in the presence or absence of en electron donor, and an organoaluminium compound (for example, as in Japanese Patent Laid-Open Nos. 43094/1978, 135102/1980, 135103/1980, 18606/1981).

The transition metal compound of Group 4 of the Periodic Table to be in the Ziegler-Natta catalysts may be a transition metal halide. For it, preferred are titanium halides, and more preferred is titanium trichloride. Titanium trichloride may be obtained in various methods. For example, titanium tetrachloride is reduced in any desired manner; the product obtained through the reduction is activated by milling it in a ball mill and/or by washing it with a solvent (for example, in an inert solvent and/or a polar compound-containing inert solvent); titanium trichloride or titanium trichloride eutectoids-(e.g., $TiCl_3+(\frac{1}{3})AlCl_3$) are further co-ground along with any of amines, ethers, esters, sulfur derivatives, halogen derivatives, organic or inorganic nitrogen compounds or phosphorus compounds; or titanium trichloride having been liquefied in the presence of an ether compound is crystallized. In addition, those obtained according to the method described in Japanese Patent Publication No. 3356/1978 are also employable.

The magnesium compound includes, for example, metal magnesium, magnesium halides (e.g., magnesium chloride), and magnesium alkoxides (e.g., magnesium diethoxide).

The electron donor includes, for example, alcohols (e.g., ethanol) and esters (e.g., benzoates). For the organoaluminium compound serving as the other component of the catalysts, preferred are compounds of a formula, $AlR_nX_{3-n}$, in which R represents an alkyl group having from 1 to 10 carbon atoms, an alkoxy group having from 1 to 10 carbon atoms, or an aryl group having from 6 to 10 carbon atoms; X represents a halogen atom; and n is a value satisfying $0<n\leq 3$. Concretely, they include triethylaluminium, triisobutylaluminium, tri-n-propylaluminium, diethylaluminium monochloride, diethylaluminium monobromide, diethylaluminium monoiodide, diethylaluminium monoethoxide, diisobutylaluminium monoisobutoxide, diethylaluminium monohydride, diisobutylaluminium monohydride, ethylaluminium sesquichloride, ethylaluminium dichloride. One or more of these may be used for the catalyst.

The olefin graft copolymer of the invention is a graft copolymer which has branch chains (these may be referred to as side chains) at any of the main chain or the side chains (these may be referred to as graft chains). It may have or may not have terminal vinyl groups. Preferably, it has no terminal vinyl group. The olefin graft copolymer of the invention is not specifically defined in point of the main chain and the side chains, but has the above-mentioned, olefin branched macromonomer [1] at least in any of the main chain or the side chains, and has branch chains (side chains). In case where at least any of the main chain or the side chains of the olefin graft copolymer is the olefin branched macromonomer [1], the others may be a polymer formed through polymerization (homopolymerization or copolymerization) of at least one monomer selected from ethylene, propylene, α-olefins having from 4 to 20 carbon atoms, cyclic olefins and styrenes. In this case, the polymer may have or may not have branch chains (side chains). When the polymer is a copolymer, the copolymer may be any of random copolymers or block copolymers. When the polymer is an ethylene polymer, its stereospecificity may be any of atactic, isotactic or syndiotactic stereospecificity.

More preferably, the olefin graft copolymer of the invention satisfies the following (1) and/or (2):

(1) its intrinsic viscosity [η] measured in a solvent decalin at 135° C. falls between 0.3 and 15 dl/g;

(2) it contains from 0.01 to 70% by weight of the above-mentioned, olefin branched macromonomer.

If the olefin graft copolymer does not satisfy the above (1), or that is, if its [η] is smaller than 0.3, its mechanical strength is not so good; but if larger than 15, its workability is often poor. If it does not satisfy the above (2), or that is, if the olefin branched macromonomer content of the copolymer is smaller than 0.01, the effect of the copolymer to improve the workability of resins will be poor; but if larger than 70, it will lower the flowability of resin melts. Still more preferably, the graft copolymer satisfies the following (3) and/or (4):

(3) its intrinsic viscosity [η] measured in a solvent decalin at 135° C. falls between 0.5 and 14 dl/g;

(4) it contains from 0.03 to 70% by weight of the above-mentioned, olefin branched macromonomer.

Even more preferably, the graft copolymer satisfies the following (5) and/or (6):

(5) its intrinsic viscosity [η] measured in a solvent decalin at 135° C. falls between 0.6 and 13 dl/g;

(6) it contains from 0.7 to 65% by weight of the above-mentioned, olefin branched macromonomer.

Most preferably, the graft copolymer satisfies the following (7) and/or (8):

(7) its intrinsic viscosity [η] measured in a solvent decalin at 135° C. falls between 0.7 and 12 dl/g;

(8) it contains from 0.8 to 60% by weight of the above-mentioned, olefin branched macromonomer.

One example of producing the olefin graft copolymer of the invention comprises preparing a macromonomer to form the side chains of the copolymer, in the same manner as that for producing the above-mentioned, olefin branched macromonomer [1] (first step), followed by copolymerizing it with at least one comonomer selected from ethylene, propylene, α-olefins having from 4 to 20 carbon atoms, cyclic olefins and styrenes, in the presence of a metallocene catalyst or in the presence of a Ziegler-Natta catalyst (second step). More concretely, the macromonomer component to form the side chains of the copolymer is first prepared, then this is transferred into a separate polymerization reactor while the catalytic activity is not still lost, and this is copolymerized with the comonomer therein. Alternatively, the copolymerization may be effected in a polymerization reactor that differs from the polymerization reactor in which the side-chain-forming macromonomer component is prepared through polymerization. In any of such two-stage polymerization (or more multi-stage polymerization) or separate line polymerization as above, the condition of reaction temperature and reaction pressure may be the same as that for the polymerization to prepare the side-chain-forming macromonomer component. For the second stage polymerization in the two-stage polymerization process, a fresh catalyst may be or may not be added to the system after the first stage polymerization.

According to the process, obtained are, for example, APP-g-APP, IPP-g-IPP and SPP-g-SPP, for which both the first and second stages of the process are for homopolymerization. In the process, when a suitable catalyst system is selected from metallocene catalysts or Ziegler-Natta catalysts, various types of graft copolymers can be obtained, including, for example, the above-mentioned graft copolymers of which both the main chain and the side chains of the macromonomer have the same stereospecificity, and graft copolymers of which the main chain differs from the side chains in point of the stereospecificity, such as APP-g-IPP, APP-g-SPP, IPP-g-SPP. When a combined catalyst system composed of a metallocene catalyst effective for producing APP, IPP and SPP macromonomers and at least one other catalyst is used, it is possible to produce macromonomers of which the stereospecificity of the main chain differs from that of the side chains. When these steps and catalysts are combined, various types of olefin graft copolymers such as those listed in the above-mentioned table can be produced. In the process of the invention, the same metallocene catalyst may be used both in the first step and the second step, or a Ziegler-Natta catalyst may be used in the second step.

In case where any one of the main chain or the side chains (graft chains) of the olefin graft copolymer of the invention is of a linear polymer, the olefin graft copolymer of the type can be produced by copolymerizing a vinyl-terminated linear polymer with at least one comonomer selected from ethylene, propylene, α-olefins having from 4 to 20 carbon atoms, cyclic olefins and styrenes, in the presence of a metallocene catalyst or in the presence of a Ziegler-Natta catalyst. The vinyl-terminated linear polymer is not specifically defined. For it, for example, polymers may be modified through exposure to heat or to any other external energy such as radiations.

The comonomer is selected from ethylene, propylene, α-olefins having from 4 to 20 carbon atoms, cyclic olefins and styrenes, and these may be the same as those mentioned hereinabove. The above-mentioned metallocene catalyst or Ziegler-Natta catalyst is used in the process of copolymerization. The copolymerization may be effected in the same manner and under the same condition as those mentioned hereinabove. In the invention, one and the same or two or more different types of the above-mentioned, olefin branched macromonomer [1] may be copolymerized with the comonomer, either singly or as combined in any desired ratio. Different types of the macromonomer [1], if combined for copolymerization, may be blended in a mode of solution blending or powder blending, or may be directly blended in a reactor. Preferably, the polymerization condition to be employed in the invention is such that the resulting copolymer may have a higher molecular weight, for which, for example, the monomer concentration is increased.

[3] Olefin Resin Composition:

The olefin resin composition of the invention comprises 100 parts by weight of a thermoplastic resin and from 0.05 to 70 parts by weight of the above-mentioned, olefin branched macromonomer [1] or olefin graft copolymer [2]. Preferably, it comprises 100 parts by weight of a thermoplastic resin and from 0.1 to 65 parts by weight, more preferably from 0.2 to 60 parts by weight, even more preferably from 0.3 to 50 parts by weight, most preferably from 0.35 to 40 parts by weight of the above-mentioned, olefin branched macromonomer [1] or olefin graft copolymer [2]. If the amount of the macromonomer [1] or the copolymer [2] serving as a compatibilizer is smaller than 0.05 parts by weight in the resin composition, the absolute amount of the compatibilizer is not enough and the compatibilizer will be ineffective for improving the physical properties of the resin composition. However, if its amount is larger than 70 parts by weight, the olefin branched macromonomer [1] or the olefin graft copolymer [2] is to be the main ingredient of the resin composition, and, if so, the macromonomer [1] or the copolymer [2] could not serve as a compatibilizer in the resin composition. In the olefin resin composition of the invention, any of the olefin branched macromonomer [1] or the olefin graft copolymer [2] may be used. Preferably, however, the resin composition contains the olefin graft copolymer [2].

The thermoplastic resin to be in the resin composition includes, for example, polyolefin resins, polystyrene resins, condensed polymers having an increased molecular weight, and polymers produced through addition polymerization and having an increased molecular weight. Examples of the polyolefin resins are high-density polyethylene, low-density polyethylene, poly-3-methylbutene-1, poly-4-methylpentene-1; linear low-density polyethylene copolymerized with any of butene-1, hexene-1, octene-1,4-methylpentene-1, or 3-methylbutene-1; ethylene-vinyl acetate copolymer, saponified ethylene-vinyl acetate copolymer, ethylene-acrylic acid copolymer, ethylene-acrylate copolymer, ethylene ionomer, and polypropylene. Examples of the polystyrene resins are general polystyrene, isotactic polystyrene, and high-impact polystyrene (modified with rubber). Examples of the condensed polymers having an increased molecular weight are polyacetal resin, polycarbonate resin; polyamide resin such as nylon 6 and nylon 6; polyester resin such as polyethylene terephthalate and polybutylene terephthalate; polyphenyleneoxide resin, polyimide resin, polysulfone resin, polyethersulfone resin, and polyphenylene-sulfide resin. Examples of the polymers produced through addition polymerization and having an increased molecular weight are polymers of polar vinyl monomers, and polymers of diene monomers, concretely, polymethyl methacrylate, polyacrylonitrile, acrylonitrile-butadiene copolymer, acrylonitrile-butadiene-styrene copolymer, diene polymer in which the diene chain is hydrogenated, and thermoplastic elastomer.

In the olefin resin composition of the invention, one preferred combination of thermoplastic resins is a polyolefin—polyolefin combination. For example, it includes a combination of polypropylene and polyethylene such as LLDPE, LDPE or HDPE; a combination of polypropylene and a soft olefin polymer such as ethylene/propylene copolymer, thermoplastic elastomer, EPDM or EPR; a combination of polypropylene and polystyrene such as APS, IPS or SPS; a combination of polypropylene and propylene/α-olefin copolymer; a combination of polyethylene and polystyrene such as APS, IPS or SPS; a combination of polyethylene and ethylene/α-olefin copolymer; a combination of propylene/α-olefin copolymer and polystyrene such as APS, IPS or SPS; a combination of ethylene/α-olefin copolymer and polystyrene such as APS, IPS or SPS; a combination of ethylene/styrene copolymer and polypropylene resin; a combination of ethylene/styrene copolymer and polyethylene resin; and a combination of polyethylene and a soft olefin polymer such as ethylene/propylene copolymer, elastic elastomer, EPDM or EPR. To the composite resin system as above, added is the olefin branched macromonomer [1] or the olefin graft copolymer [2] serving as a compatibilizer, and the mechanical properties of the resulting resin composition are improved.

Preferably, the olefin resin composition of the invention is such that the relaxation rate of the long-term relaxation component therein, measured through solid $^1$H-NMR, $(1/R_1)$ falls between 1.0 and 2.0 (1/sec), more preferably between 1.2 and 1.8 (1/sec), even more preferably between 1.3 and 1.6 (1/sec). Also preferably, the olefin resin composition of the invention is such that the ratio of the relaxation rate $(1/R_1)$ to the relaxation rate $(1/R_1)_0$ of the long-term relaxation component, measured through solid $^1$H-NMR, of a resin composition not containing the propylene branched macromonomer, $[(1/R_1)/(1/R_1)_0]$, satisfies the following relationship:

$$[(1/R_2)/(1/R_1)_0] \geq 1.01.$$

Satisfying it, the resin compatibility in the composition is good.
More preferably, the ratio satisfies;

$[(1/R_1)/(1/R_1)_0] \geq 1.02$, even more preferably, $[(1/R_1)/(1/R_1)_0] \geq 1.03$.

In the invention, the values $(1/R_1)$ and $(1/R_1)_0$ of the resin compositions are measured according to a method of inversion recovery (180°–τ–90°, pulse process), using a solid $^1$H-NMR device mentioned below.

Device: BRUKER's CPX-90
Nucleus to be measured: hydrogen nucleus ($^1$H)
Frequency: 90 MHz
Temperature: 30° C.
90° pulse width: 2.4 to 2.5 microseconds The invention is described in more detail with reference to the following Examples, which, however, are not intended to restrict the scope of the invention.

EXAMPLE I-1

Production of Propylene Branched Macromonomer
<1> Production of Branched Propylene Macromonomer:

A 1.6-liter, stainless pressure autoclave was well dried, and 100 ml of dewatered toluene and 6 mmols of Toso-Akuzo's methylaluminoxane were put into it in a nitrogen atmosphere, and these were cooled to 0° C. With stirring them, propylene was introduced into the autoclave, and its pressure was increased up to 5.0 kg/cm$^2$ G. The autoclave was thus saturated with propylene, and introducing propylene thereinto was stopped. Then, 1 ml of a toluene solution of 10 μmols of bis(pentamethylcyclopentadienyl) zirconium dichloride was put into the autoclave to start the polymerization of the monomer, propylene. The reaction temperature was kept at −5° C., and the polymerization was continued for 8 hours. After the polymerization finished, the non-reacted propylene was degassed and removed. The reaction mixture was put into a large amount of methanol and the polymer was recovered. This was dried at 80° C. for 12 hours under reduced pressure, and the amount of the polymer thus obtained was 20.1 g.

<2> Evaluation of branched propylene macromonomer:

The weight-average molecular weight (Mw), the ratio of temperature dependency of solution viscosity ($E_2/E_1$), and the terminal vinyl selectivity of the polymer obtained in the above were measured according to the methods mentioned hereinabove. The results obtained are shown in Table I-1.

In the Table, Example 1 means Example I-1, and the same shall apply to the other Examples and Comparative Examples.

COMPARATIVE EXAMPLE I-1

Production of Linear Propylene Macromonomer

The same process as in Example I-1 was repeated, except that the amount of toluene used was 400 ml, bis(pentamethylcyclopentadienyl)zirconium dichloride was replaced with cyclopentadienylzirconium dichloride, the polymerization temperature was 20° C., and the polymerization time was 90 minutes. As a result, 15.4 g of a polymer was obtained herein. This was evaluated in the same manner as in Example I-1, and its data are given in Table I-1.

TABLE I-1

| Details | Example 1 | Co. Example 1 |
|---|---|---|
| Resin Properties | | |
| structure | branched APP | linear APP |
| Mw | 7800 | 7900 |
| Terminal Vinyl Selectivity (%) | 91.5 | 0 |
| Intrinsic Viscosity [η] (g/dl) | 0.105 | 0.100 |
| Relative Viscosity (75° C.) | 3.18 | 3.20 |
| Sample Concentration (g/dl) | 14.02 | 05.39 |
| E1 | — | 3.36 × 10$^5$ |
| E2 | 4.09 × 10$^5$ | — |
| E2/E1 | 1.22 | — |

EXAMPLE I-2

Production of Propylene Branched Macromonomer
(1) Synthesis of Side-chain-forming Propylene Oligomer:

A 1.6-liter, stainless pressure autoclave was well dried, and 400 ml of dewatered toluene, 6 mmols (in terms of aluminium equivalent) of Toso-Akuzo's methylaluminoxane and 10 μmols of bis(pentamethylcyclopentadienyl) hafnium dichloride were put into it in a nitrogen atmosphere, and these were heated up to 30° C. Propylene having a controlled partial pressure of 6 kg/cm$^2$ G was continuously introduced into it, and reacted for 4 hours. The non-reacted propylene was degassed and remove, and the reaction mixture was recovered. This was washed with an aqueous solution of 3 N HCl, and then well washed with water. This was dried with anhydrous sodium sulfate, and subjected to distillation to remove the component having a boiling point at normal pressure of not higher than 230° C. Thus was obtained a viscous substance. This is an oligomer, atactic polypropylene (APP). Its NMR analysis revealed that the oligomer was vinyl-terminated.

This was dissolved in hexane, and dewatered and purified through bubbling with nitrogen.

(2) Production of propylene branched macromonomer:

A 1.6-liter, stainless pressure autoclave was well dried. 400 ml of dewatered toluene, 100 ml of a heptane solution of 15 g of the propylene oligomer produced in the above (1), 0.5 mmols of triisobutylaluminium, and 6 mmols (in terms of aluminium equivalent) of Toso-Akuzo's methylaluminoxane were put into it in a nitrogen atmosphere, and stirred for 10 minutes at room temperature. To this was added 10 μmols of rac-(1,2-ethylene)(2,1-ethylene)-bis(indenyl) hafnium dichloride [Et$_2$Ind$_2$HfCl$_2$]. This was heated up to 50° C., and propylene was continuously introduced thereinto to have a controlled partial pressure of 3 kg/cm$^2$ G, and polymerized for 4 hours.

After the polymerization, the reaction mixture was put into a large amount of methanol, and the polymer component was recovered. This was dried in air for one full day. To remove the non-reacted propylene oligomer (1) from it, this was washed five times with 500 ml of hexane. The insoluble product was dried, and 35 g of propylene branched macromonomer was obtained.

(3) Evaluation of Propylene Branched Macromonomer:

The propylene branched macromonomer obtained in the above (2) was evaluated as follows:
<1> Weight-average molecular weight (Mw);

This was measured through GPC according to the method mentioned above, and its Mw was 18400.
<2> Vinyl Content:

This was analyzed through $^1$H-NMR in the manner mentioned above. Based on the ratio of the methyl proton of the vinyl group appearing at 4.8 to 5.1 ppm to the unsaturated bonds appearing at 4 to 6 ppm, the ratio of the vinyl group to all the unsaturated bonds in the macromonomer was calculated, and it was 89.2%.

<3> Branch analysis:

The macromonomer was analyzed for its branches in the manner as follows: The side-chain-forming propylene oligomer, or that is, the vinyl-terminated atactic polypropylene [1] prepared in the above (1); the propylene branched macromonomer [II], which is a vinyl-terminated copolymer composed of [I] and propylene; and a control, polypropylene [III] produced not using the side-chain-forming propylene oligomer were analyzed through NMR. It revealed that the meso-triad fraction (mm) of [I], [II] and [III] is 23%, 45% and 85%, respectively. GPC analysis of [I] and [II] revealed that Mn of [I] is 4500 and Mn of [II] is 18400. The number of branches in one macromonomer molecule, calculated according to the stereospecificity analysis <3> mentioned above, is 2.6. The data obtained are shown in Table I-2.

EXAMPLE I-3

Production of Propylene/ethylene Branched Macromonomer (1) Continuous polymerization:

A 1.6-liter, stainless pressure autoclave was well dried. 600 ml of dewatered toluene, and 6 mmols (in terms of aluminium equivalent) of Toso-Akuzo's methylaluminoxane were put into it in a nitrogen atmosphere. Its temperature was kept at 20° C. This was saturated with propylene having a controlled partial pressure of 7 kg/cm$^2$ G and with ethylene having a controlled partial pressure of 2 kg/cm$^2$ G. Through a catalyst line, 10 μmols of bis(pentamethylcyclopentadienyl)hafnium dichloride was put into it, and the monomers were copolymerized for 5 minutes. In this stage, the inner pressure decreased owing to the monomer polymerization. Immediately after the reaction, the non-reacted monomers were degassed and removed, and they were completely removed through bubbling with nitrogen. A part of the toluene solution of the reaction mixture, propylene/ethylene copolymer [1] was sampled for analysis of the copolymer in this stage. Next, this was kept at 30° C., and propylene was continuously fed thereinto, having a controlled partial pressure of 6 kg/cm$^2$ G, and polymerized for 240 minutes. After the reaction, the reaction mixture was put into a large amount of methanol, and repeatedly washed with methanol to remove the propylene oligomer. This was dried, and 45 g of propylene/ethylene branched macromonomer [II] was obtained.

(2) Evaluation of Propylene/ethylene Branched Macromonomer:

The propylene/ethylene branched macromonomer obtained in the above (1) was evaluated as follows:

<1> The macromonomer was analyzed in the same manner as in Example I-2, and its Mw and vinyl selectivity were 15400 and 87%, respectively.

<2> Branch analysis:

The macromonomer was analyzed for its branches, according to the method of composition analysis <2> mentioned hereinabove.

Concretely, the side-chain-forming propylene/ethylene copolymer [I] (this was sampled in the course of macromonomer production), and the propylene/ethylene branched macromonomer [II] were analyzed through NMR and GPC. This revealed that the ethylene content of [I] and [II] is 56 mol % and 8 mol %, respectively. The GPC analysis revealed that the molecular weight at the peak tops of [I] and [II] is 5600 and 15400, respectively. From the data, the number of branches in one macromonomer molecule is 0.40. The data obtained are shown in Table I-2.

EXAMPLE I-4

Production of Propylene/ethylene Branched Macromonomer (1) One-pot polymerization for producing branched macromonomer:

A 1.6-liter, stainless pressure autoclave was well dried: 600 ml of dewatered toluene, and 6 mmols (in terms of aluminium equivalent) of Toso-Akuzo's methylaluminoxane were put into it in a nitrogen atmosphere. Its temperature was kept at 20° C. This was saturated with propylene having a controlled partial pressure of 7 kg/cm$^2$ G and with ethylene having a controlled partial pressure of 2 kg/cm$^2$ G. Through a catalyst line, 10 μmols of bis(pentamethylcyclopentadienyl)hafnium dichloride was put into it, and the monomers were copolymerized for 5 minutes. In this stage, the inner pressure decreased owing to the monomer polymerization. Immediately after the reaction, the non-reacted monomers were degassed and removed, and they were completely removed through bubbling with nitrogen. A part of the toluene solution of the reaction mixture, propylene/ethylene copolymer [1] was sampled for analysis of the copolymer in this stage. Next, this was kept at 30° C., and propylene at a flow rate of 10 normal liters/min and ethylene at a flow rate of 2 normal liters/min were continuously fed thereinto, having a controlled total pressure of 7 kg/cm$^2$ G, and polymerized for 60 minutes. After the reaction, the reaction mixture containing toluene-insoluble substances was put into a large amount of methanol, and repeatedly washed with methanol Then, this was dried in air for one full day. The yield of the reaction mixture [II] was 165 g. To remove the non-reacted ethylene/propylene oligomer from it, this was washed five times with 500 ml of toluene. The remaining insoluble solid was dried, and 145 g of ethylene/propylene branched macromonomer [III] was obtained.

(2) Evaluation of Propylene/ethylene Branched Macromonomer

<1> Weight-average Molecular Weight (Mw) and Vinyl Content:

The molecular weight and the vinyl selectivity of the macromonomer were 75000 and 95.8%, respectively.

<2> Branch Analysis:

The macromonomer was analyzed for its branches, according to above-mentioned method of GPC <1>.

Concretely, the propylene/ethylene copolymer [I] (this was sampled in the course of macromonomer production), the ethylene/propylene branched macromonomer mixture [II], and the ethylene/propylene branched macromonomer [III] were analyzed through GPC. This revealed that the molecular weight at the peak tops of [I] and [III] is 5600 (corresponding to $(Mn)^A$) and 75000 (corresponding to $(Mn)^B$), respectively. From the data of [II], the existence ratio, a, of the non-reacted oligomer (this is to form the side chains in the branched macromonomer, but is not reacted to form them) is 19.1%.

The amount, b, of the side-chain-forming oligomer fed to the polymerization system (this is derived from the data of the sample of the propylene/ethylene copolymer [I]) is 33 g. The yield, c, of the reaction mixture that contains the branched macromonomer is 165 g. From these values, the number of branches in one macromonomer molecule is 0.15. The data obtained herein are shown in Table I-2.

EXAMPLE I-5

Production of Ethylene/propylene Branched Macromonomer (1) Continuous polymerization:

A 1.6-liter, stainless pressure autoclave was well dried. 600 ml of dewatered toluene, and 6 mmols (in terms of aluminium equivalent) of Toso-Akuzo's methylaluminoxane were put into it in a nitrogen atmosphere. Its temperature was kept at 20° C. This was saturated with propylene having a controlled partial pressure of 7 kg/cm² G and with ethylene having a controlled partial pressure of 2 kg/cm² G. Through a catalyst line, 10 μmols of bis(pentamethylcyclopentadienyl) hafnium dichloride was put into it, and the monomers were copolymerized for 5 minutes. In this stage, the inner pressure decreased owing to the monomer polymerization. Immediately after the reaction, the non-reacted monomers were degassed and removed, and they were completely removed through bubbling with nitrogen. The reaction-mixture was put into a large amount of methanol and washed with it, and the methanol-insoluble viscous substance was recovered. This was dried under reduced pressure. After dried, this was re-dissolved in hexane, and dewatered through bubbling with nitrogen.

(2) Copolymerization of Ethylene/propylene Oligomer and Propylene:

A 1.6-liter, stainless pressure autoclave was well dried. 400 ml of dewatered toluene, 100 ml of a toluene solution of 15 g of the propylene/ethylene oligomer [I] produced in the above (1), 0.5 mmols of triisobutylaluminium, and 6 mmols (in terms of aluminium equivalent) of Toso-Akuzo's methylaluminoxane were put into it in a nitrogen atmosphere, and stirred for 10 minutes at room temperature. To this was added 10 μmols of rac-(1,2-ethylene)(2,1-ethylene)-bis(indenyl)hafnium dichloride [Et$_2$Ind$_2$HfCl$_2$]. This was heated up to 40° C., and propylene was continuously introduced thereinto to have a controlled partial pressure of 3 kg/cm² G, and polymerized for 15 hours.

After the polymerization, the reaction mixture was put into a large amount of methanol, and the polymer component was recovered. This was dried in air for one full day. To remove the non-reacted macromonomer from it, this was washed five times with 500 ml of hexane. The insoluble product was dried, and 60 g of propylene branched macromonomer [II] was obtained.

(3) Evaluation of branched ethylene/propylene macromonomer:

<1> The molecular weight and the vinyl selectivity of the macromonomer were 12500 and 88.7%, respectively.
<2> Branch analysis:

The macromonomer was analyzed for its branches, according to the method of composition analysis <2> mentioned hereinabove.

Concretely, the propylene/ethylene macromonomer [I] and the propylene/ethylene branched macromonomer [II] were analyzed through NMR and GPC. This revealed that the ethylene content of [I] and [II] is 56 mol % and 5 mol %, respectively. The GPC analysis revealed that the molecular weight at the peak tops of [I] and [II] is 5600 and 12500, respectively. From the data, the number of branches in one macromonomer molecule is 0.20. The data obtained are shown in Table I-2.

EXAMPLE I-6

Production of Graft Polymer 8 g of the macromonomer produced in Example I-1 was dissolved in 400 ml of toluene, and bubbled with nitrogen for 5 hours to thereby attain complete oxygen removal and water removal from it. A 1.6-liter stainless pressure autoclave was fully dried, and all of the toluene solution of the dried macromonomer and 50 ml of additional dry toluene were put into it in a nitrogen atmosphere to make 400 ml in all therein. 0.5 mmols of triisobutylaluminium, and 5 mmols of Toso-Akuzo's methylaluminoxane were added to it, heated up to 40° C., and kept stirred for 10 minutes at the temperature. To this was added 0.5 ml of a toluene solution of 1.0 μmol of racemi-dimethylsilyl-bis[2-methyl-4-phenylindenyl]zirconium dichloride. Next, propylene was introduced thereinto to have an increased pressure of 2.0 kg/cm² G, and polymerized for 25 minutes. After the polymerization, the non-reacted monomer was degassed and removed, and the reaction mixture was put into a large amount of methanol. This was filtered to recover the polymer. The polymer was washed three times with hexane to remove the non-reacted macromonomer from it. This was filtered and dried under reduced pressure. The yield of the graft copolymer thus obtained was 120 g.

Its intrinsic viscosity was 2.02 dl/g, and its macromonomer content measured through $^1$H-NMR was 0.8% by weight.

EXAMPLE I-7

Production of Graft Polymer

In the same manner as in Example I-6 using 1.0 μmol of racemi-dimethylsilyl-bis[2-methyl-4-phenylindenyl] zirconium dichloride, obtained was an ethylene graft copolymer, for which, however, propylene was replaced by ethylene, the polymerization pressure was 1.0 kg/cm² G, the polymerization temperature was 60° C., and the polymerization time was 17 minutes. The yield of the graft copolymer obtained was 36.6 g, the intrinsic viscosity thereof was 1.63 dl/g, and the macromonomer content thereof measured through $^1$H-NMR was 1.2% by weight.

EXAMPLE I-8

Production of Olefin Resin Composition (1) Preparation of Thermoplastic Resins and Properties Thereof:

For use herein, PP was prepared in the following manner.
The same pressure autoclave as in Example I-1 was used. 400 ml of a solvent, dewatered heptane, 0.7 mmols of triisobutylaluminium, and 5 μmols (in terms of Zr) of a catalyst rac-Me$_2$Si-[2Me-4Ph-Ind]$_2$ZrCl$_2$ held on a solid co-catalyst SiO$_2$/MAO (methylaluminoxane) were put into

TABLE I-2

| Details | Example 1 | Example 2 | Example 3 | Example 4 | Example 5 |
|---|---|---|---|---|---|
| Resin Properties | | | | | |
| Terminal Vinyl Selectivity (%) | 91.5 | 89.2 | 87.0 | 95.8 | 88.7 |
| Mw | 7800 | 18400 | 15400 | 75000 | 12500 |
| Structure | APP | IPP-g-APP | APP-g-EP | EP-g-EP | IPP-g-EP |
| Branch Content (mol %) | — | 5.0 | — | — | — |
| Number of Branches (/molecule) | — | 0.11 | 2.5 | 0.15 | 0.6 |
| Propylene Content (mol %) | 100 | 100 | 92 | 72 | 95 | the autoclave. In the catalyst used, the ratio of MAO/Zr is 400 by mol, and the ratio of SiO$_2$/MAO is 2.76/1 by weight.

After the catalyst was put into the autoclave, propylene was introduced thereinto to have a controlled pressure of 5 kg/cm$^2$ G, and was polymerized at 60° C. for 120 minutes. 150 g of polypropylene was thus obtained. Its intrinsic viscosity was 2.76 dl/g, and its melting point was 148° C.

Also for use herein, APP was prepared in the following manner:

A 5-liter stainless pressure autoclave was fully dried. 3 liters of dewatered toluene, 2 mmols of triisobutylaluminium, and 15 ml of Toso-Akuzo's methylaluminoxane were put into it in a nitrogen atmosphere. This was kept stirred for 10 minutes. 15 μmols of (tert-butylamido)(tetramethyl-η$^5$-cyclopentadienyl)-1,2-ethanediylzirconium dichloride [Cp*(CH$_2$)$_2$(tBuN)TiCl$_2$] was added thereto, and propylene was introduced into it to have an increased pressure of 7.5 kg/cm$^2$ G, and polymerized at 50° C. for 45 minutes. After the polymerization, the non-reacted monomer was degassed and removed. The reaction mixture was put into a large amount of methanol, and polypropylene was recovered. This was then dried at 80° C. under reduced pressure for 12 hours. The yield of polypropylene thus obtained was 470 g. Its intrinsic viscosity was 3.10 dl/g. This showed no melting point in DSC, and this was identified as atactic polypropylene (APP) by NMR.

(2) Preparation of Olefin Resin Composition:

The above PP and APP, amounting 100 parts by weight in total, and 5 parts by weight of the polymer obtained in Example I-6 were added to xylene containing 4000 ppm of an antioxidant, BHT, and dissolved therein under heat. This was re-precipitated in a large amount of methanol, and then dried to prepare an olefin resin composition.

(3) Evaluation of Olefin Resin Composition:

In a solvent decalin at 135° C., the intrinsic viscosity [η] of the olefin resin composition was measured, and corrected according to the Huggins' viscosity equation in which the Huggins' constant is 0.35.

The relaxation rate of the long-term relaxation component of the resin composition, (1/R$_1$) and (1/R$_1$)$_0$, was measured according to a method of inversion recovery (180°-τ-90°, pulse process), using a solid $^1$H-NMR device mentioned below. The data obtained are shown in Table I-3.

Device: BRUKER's CPX-90

Nucleus to be measured: hydrogen nucleus ($^1$H)

Frequency: 90 MHz

Temperature: 30° C.

90° pulse width: 2.4 to 2.5 microseconds

Measured through DSC and solid $^1$H-NMR (solid echo process), the degree of crystallization was the same between PP and HDPE.

COMPARATIVE EXAMPLE I-2

The same process as in Example I-8 was repeated herein, in which, however, the polymer obtained in Example I-6 was not used. The data obtained are shown in Table I-3.

EXAMPLE I-9

The same process as in Example I-8 was repeated herein, in which, however, PP was replaced with HDPE (Idemitsu Petrochemical's 440M) and the polymer of Example I-6 was with that of Example I-7. The data obtained are shown in Table I-3.

COMPARATIVE EXAMPLE I-3

The same process as in Example I-9 was repeated herein, in which, however, the polymer of Example I-7 was not used. The data obtained are shown in Table I-3.

TABLE I-3

| Details | Example 8 | Comp. Ex. 2 | Example 9 | Comp. Ex. 3 |
|---|---|---|---|---|
| PP (wt. %) | 90 | 90 | — | — |
| HDPE (wt. %) | — | — | 90 | 90 |
| APP (wt. %) | 10 | 10 | 10 | 10 |
| Polymer of Example 6 (wt. pts.) | 5 | — | — | — |
| Polymer of Example 1 (wt. pts.) | — | — | 5 | — |
| Relaxation Rate (1/R$_1$) | 1.45 | — | 1.66 | — |
| Relaxation Rate (1/R$_1$)$_0$ | — | 1.40 | — | 1.52 |
| [(1/R$_1$)/(1/R$_1$)$_0$] | 1.04 | — | 1.09 | — |

EXAMPLE I-10

Production of Graft Copolymer (1) Preparation of Aluminoxane:

For use herein, methylaluminoxane was processed in the following manner.

1.0 liter of a toluene solution of methylaluminoxane (1.5 mols/liter, from ALBEMARLE, containing 14.5% by weight of trimethylaluminium) was vaporized under reduced pressure (10 mmHg) at 60° C. to remove the solvent, and then dried up. In this condition, this was kept as it was for 4 hours, and then cooled to room temperature to obtain dry-up methylaluminoxane. The dry-up methylaluminoxane was re-dissolved in dewatered toluene added thereto, to thereby restore its volume to the original before solvent removal. Then, the trimethylaluminium content of the methylaluminoxane solution was determined through $^1$H-NMR, and was 3.6% by weight. The total aluminium content of the methylaluminoxane solution was measured according to a fluorescent X-ray (ICP) method, and was 1.32 mols/liter. Then, the solution was statically left as it was for 2 full days to thereby make the insoluble component deposited therein. The supernatant was filtered through a G5 glass filter in a nitrogen atmosphere to recover the filtrate. This is methylaluminoxane (a) for use herein. Its concentration measured through ICP was 1.06. From the thus-processed methylaluminoxane, 10.9% by weight of organoaluminium and 17.3% by weight of the insoluble component were removed.

(2) Preparation of Carrier for Olefin Polymerization Catalyst:

27.1 g of SiO$_2$ (Fuji Silicia Chemical's P-10) was dried under reduced pressure at 200° C. for 4.0 hours in a slight nitrogen atmosphere, and 25.9 g of dry SiO$_2$ was obtained. The dry SiO$_2$ was put into 400 ml of dewatered toluene that had been previously cooled to −78° C. in a bath of dry ice/methanol, and stirred. With still stirring, 145.5 ml of a toluene solution of the methylaluminoxane (a) prepared in the above (1) was dropwise added to the toluene suspension of SiO$_2$, over a period of 2 hours all through a dropping funnel.

Next, this was stirred for 4.0 hours, and then warmed from −78° C. up to 20° C. over a period of 6 hours, and this was kept in this condition for 4.0 hours. Next, this was heated from 20° C. up to 80° C. over a period of 1 hour, and then left at 80° C. for 4.0 hours to thereby complete the reaction of silica and methylaluminoxane therein. The resulting suspension was filtered at 80° C., and the solid thus obtained was washed twice with 400 ml of dewatered toluene at 60° C. and then twice with 400 ml of dewatered n-heptane at 60° C. After thus washed, the solid was dried under reduced pressure at 60° C. for 4.0 hours, and 33.69 g of SiO$_2$-held methylaluminoxane was obtained. This serves as a carrier for olefin polymerization catalyst. The proportion of methylaluminoxane held on SiO$_2$ was 30.1% per gram of SiO$_2$.

To all the thus-obtained, SiO$_2$-held methylaluminoxane, added was dewatered n-heptane to make 500 ml. The methylaluminoxane concentration in the suspension thus obtained herein was 0.27 mols/liter.

(3) Preparation of Catalyst Component:

2.0 mmols (7.41 ml) of the SiO$_2$-held methylaluminoxane prepared in the above (2) was put into a 50-ml container that had been purged with dry nitrogen, to which was added 20 ml of dewatered toluene and stirred. To the resulting suspension, added was 1.0 ml (10 μmols) of a toluene solution of racemi-dimethylsilyldiylbis-2-methyl-4-phenylindenylzirconium dichloride (mol/ml), and kept stirred at room temperature for 0.5 hours. Stirring it was stopped, and the solid catalyst component was deposited. The thus-deposited solid catalyst component was found red and the solution was colorless transparent. The solution was removed through decantation, 20 ml of n-heptane was added to the residue, and an SiO$_2$-held metallocene catalyst slurry was thus obtained.

(4) Production of Graft Copolymer:

200 ml of a heptane solution of the macromonomer prepared in Example I-3 (1) (this solution was prepared by dissolving 10 g of the macromonomer in heptane, and then well bubbled with nitrogen to fully remove water and oxygen from it), 0.5 mmols of triisobutylaluminium (TIBA), and 5 μmols (in terms of zirconium) of the carrier-held catalyst that had been prepared in the above (1) were put into a 1.6-liter stainless pressure autoclave equipped with a stirrer, in a nitrogen atmosphere. These were stirred, and heated up to 60° C. Propylene was introduced into it for 120 minutes to have a pressure of 0.6 MPa (gauge), and polymerized to produce a polymer.

After the reaction, the autoclave was degassed and opened, and the reaction mixture was taken out and filtered to recover the graft copolymer. This was washed repeatedly four times with a large amount of heptane to remove the non-reacted macromonomer. The thus-washed graft copolymer was dried under reduced pressure at 80° C. for 6 hours. The yield of the thus-dried graft copolymer was 42 g. Its intrinsic viscosity [η] was 2.20 dl/g, and the number of branches in the copolymer was 0.2/molecule.

EXAMPLE I-11

Production of Olefin Resin Composition (1) Production of Low-Stereospecificity Polypropylene:

<1> Preparation of Magnesium Compound:

A glass reactor having a capacity of about 6 liters and equipped with a stirrer was fully purged with nitrogen gas. About 2430 g of ethanol, 16 g of iodine and 160 g of metal magnesium were put into it, heated with stirring, and reacted under reflux until no hydrogen gas went out of the system, to thereby form a solid reaction product. The reaction liquid containing the solid product was dried under reduced pressure, and a magnesium compound was thus obtained.

<2> Preparation of Solid Catalyst Component (A):

16 g of the magnesium compound obtained in the above <1>, 80 ml of pure heptane, 2.4 ml of silicon tetrachloride, and 2.3 ml of diethyl phthalate were put into a 0.5-liter, three-neck glass flask that had been fully purged with nitrogen gas. This was kept at 90° C., and 77 ml of titanium tetrachloride was added thereto with stirring, and reacted at 110° C. for 2 hours. Then, the solid component was separated from it, and washed with pure heptane at 80° C. 122 ml of titanium tetrachloride was further added thereto, reacted at 110° C. for 2 hours, and then fully washed with pure heptane. Thus was obtained a solid catalyst component (A).

<3> Production of Low-stereospecificity Polypropylene:

20 g of polypropylene powder, 5.0 mmols of triisobutylaluminium (TIBA), 0.125 mmols of 1-allyl-3,4-dimethoxybenzene (ADMB), 0.2 mmols of diphenyldimethoxysilane (DPDMS), and 20 ml of a heptane solution containing 0.05 mmols (in terms of titanium) of the solid catalyst component (A) obtained in the above <2> were put into a 5-liter, stainless pressure autoclave, and this was degassed for 5 minutes. Then, propylene was introduced into it to have a total pressure of 2.8 MPa·G, and polymerized at 70° C. for 1.7 hours in a mode of vapor-phase polymerization.

<4> Properties of Polypropylene:

The polypropylene obtained in the above <3> is a soft polypropylene having the following properties:

(i) boiling heptane-insoluble content: 62.4% by weight,
(ii) intrinsic viscosity [η] in a solvent decalin at 135° C.: 4.27 dl/g,
(iii) structure: composition of isotactic polypropylene and atactic polypropylene.

(2) Preparation of Olefin Resin Composition:

An olefin resin composition was prepared in the same manner as in Example I-8 (2), for which, however, used were 100 parts by weight of the low-stereospecificity polypropylene obtained in the above (1) and 3 parts by weight of the graft copolymer obtained in Example I-10.

(3) Evaluation of Olefin Resin Composition:

The relaxation rate of the olefin resin composition was determined in the same manner as in Example I-8 (3). The data are shown in Table I-4.

EXAMPLE I-12

Production of Olefin Resin Composition:

(1) Production of High-rubber Block Copolymer:

<1> Production of Catalyst through Prepolymerization:

48 g of the solid catalyst component (A) prepared in Example I-11 (1)<2> was put into a nitrogen-purged, 1-liter three-neck flask equipped with a stirrer. 400 ml of dewatered heptane was added thereto. This was heated up to 40° C., and 2 mmols of triethylaluminium and 6.3 ml of dicyclopentyldimethoxysilane were added thereto. Propylene gas was introduced into this under ordinary pressure, and reacted with it for 2 hours. The solid component was fully washed with dewatered heptane. This is a solid catalyst (B).

<2> Production of High-rubber Block Polypropylene:

A 5-liter stainless autoclave equipped with a stirrer was fully purged with nitrogen gas, then dried, and thereafter purged with propylene gas. This was kept at 70° C., and propylene gas was introduced into it to have an increased pressure of 0.05 MPaG. In this condition, hydrogen gas was introduced into it to have a partial pressure of 0.9 MPaG, and propylene gas was gradually introduced thereinto to have a further increased pressure of 2.8 MPaG. Apart from this, 20 ml of heptane, 4 mmols of triethylaluminium, 1 mmol of dicyclopentyldimethoxysilane, and 0.02 mmols of the solid catalyst (B) were put into a 60-ml catalyst supply tube that had been purged with nitrogen gas, and these were led into the autoclave through the tube. In the autoclave containing them, propylene was polymerized for 60 minutes into a propylene homopolymer.

Next, the autoclave was degassed to atmospheric pressure, and the homopolymer therein was sampled in a nitrogen atmosphere. The sample is for measuring its intrinsic viscosity [η].

Next, the autoclave was degassed to vacuum, and ethylene/propylene gas in a ratio of 1:1 by mol was introduced thereinto to have an increased pressure of 1.5 MPaG, and copolymerized at 70° C. for 65 minutes. During the copolymerization, the pressure and the monomer flow rate were kept constant. After this, the autoclave was degassed and cooled to room temperature, and the polymer powder was taken out.

Its copolymer moiety formed in the second-stage polymerization was 42.6% by weight.

The intrinsic viscosity of the homopolymer moiety of the block copolymer was 1.0 dl/g; and that of the copolymer moiety thereof was 4.8 dl/g.

(2) Preparation of Olefin Resin Composition:

An olefin resin composition was prepared in the same manner as in Example I-6 (2), for which, however, used were 100 parts by weight of the high-rubber block polypropylene obtained in the above (1) and 5 parts by weight of the graft copolymer obtained in Example I-10.

(3) Evaluation of Olefin Resin Composition:

The relaxation rate of the olefin resin composition was determined in the same manner as in Example I-8 (3). The data are shown in Table I-4.

COMPARATIVE EXAMPLE I-4

Production of Olefin Resin Composition

An olefin resin composition was prepared in the same manner as in Example I-8 (2), for which, however, 100 parts by weight of the low-stereospecificity polypropylene of Example I-11 (1) was used alone. The relaxation rate of the olefin resin composition was determined in the same manner as in Example I-8 (3). The data are shown in Table I-4.

COMPARATIVE EXAMPLE I-5

Production of Olefin Resin Composition

An olefin resin composition was prepared in the same manner as in Example I-8 (2), for which, however, 100 parts by weight of the high-rubber block polypropylene of Example I-12 (1) was used alone. The relaxation rate of the olefin resin composition was determined in the same manner as in Example I-8 (3). The data are shown in Table I-4.

TABLE I-4

| Resin Composition | Example 11 | Example 12 | Co. Ex. 4 | Co. Ex. 5 |
|---|---|---|---|---|
| A (wt. %) | 100 | — | 100 | — |
| B (wt. %) | — | 100 | — | 100 |
| Type of Graft | Example 10 | Example 10 | — | — |
| Polymer (wt. pts.) | 3.0 | 5.0 | | |
| Relaxation Rate $(1/R_1)$ (1/sec) | 1.62 | 1.55 | — | — |
| Relaxation Rate $(1/R_1)_0$ (1/sec) | — | — | 1.50 | 1.45 |
| Ratio of Relaxation Rate $[(1/R_1)/(1/R_1)_0]$ | 1.08 | 1.07 | — | — |

A: low-stereospecificity polypropylene
B: high-rubber block polypropylene

II. Second Aspect of the Invention:

In this section, the second aspect of the invention will be simply referred to as "the invention".

The propylene macromonomer [1], the propylene graft copolymer [2] and the olefin resin composition [3] of the invention are described in detail hereinunder.

[1] Propylene Macromonomer:

The propylene branched macromonomer of the invention is a propylene polymer satisfying the following (a), (b) and (c):

(a) its weight-average molecular weight (MW) measured through gel permeation chromatography (GPC) falls between 800 and 500000;

(b) its vinyl content is at least 70 mol % of all the unsaturated groups in the macromonomer;

(c) its propylene content falls between 50 and 100 mol %.

The propylene macromonomer of the invention (hereinafter this will be referred to as "the macromonomer") is a linear propylene polymer having a low to middle-level molecular weight, in which the terminals of the main chain contain vinyl groups in a specific ratio. Since the macromonomer contains many vinyl groups, it is effective in various chemical reactions such as typically grafting reaction. In addition, since its molecular weight falls in a broad range of from relatively low to high molecular weights, it is usable as the material for compatibilizers for various resins and also as a resin moldability improver.

The weight-average molecular weight (Mw) of the macromonomer of the invention, measured through GPC, falls between 800 and 500000, but preferably between 800 and 400000, more preferably between 900 and 350000, even more preferably between 1000 and 300000, most preferably between 1000 and 250000. Macromonomers having Mw of smaller than 800 are useless in production of graft copolymers, as their ability to improve a resin compatibility and resin melt tension is not good; but those having Mw of larger than 500000 are unfavorable since the apparent terminal vinyl content thereof is extremely small and the graft copolymerization efficiency with them is poor.

For GPC for the invention, referred to is the same as that mentioned in the section of the first aspect of the invention.

In the invention, the vinyl content of the macromonomer falls between 70 and 100% of all the unsaturated groups in the macromonomer. Preferably, it falls between 75 and 100%, more preferably between 80 and 100%, most preferably between 85 and 100%. If the vinyl content is smaller than 70%, the efficiency in grafting reaction with the macromonomer is low, and the residual macromonomer lowers the physical properties of graft polymers.

The vinyl content relative to all the unsaturated groups in the macromonomer may be measured (1) through $^1$H-NMR or (2) through IR. For the details of the methods, referred to are the same as those mentioned in the section of the first aspect of the invention. In the invention, employable is any of these methods.

The propylene macromonomer of the invention has a propylene content of from 50 to 100 mol %, preferably from 55 to 100 mol %, more preferably from 60 to 100 mol %.

If its propylene content is smaller than 50 mol %, the macromonomer is ineffective as a compatibilizer for thermoplastic resin blends.

So far as it satisfies the above-mentioned requirements, the propylene macromonomer [1] is not specifically defined any more. The monomer to constitute the macromonomer is propylene, or propylene and at least one selected from ethylene, α-olefins having from 4 to 20 carbon atoms, cyclic olefins and styrenes.

Concretely, the macromonomer is a propylene homopolymer, or a propylene copolymer of propylene and at least one selected from ethylene, α-olefins having from 4 to 20 carbon atoms, cyclic olefins and styrenes.

The propylene homopolymer includes atactic polypropylene APP, isotactic polypropylene IPP, and syndiotactic polypropylene SPP. The propylene copolymer includes IPP-PE, APP-PE and SPP-PE in which PE indicates polyethylene, and also those for which ethylene is replaced with any of α-olefins having from 4 to 20 carbon atoms, cyclic olefins and styrenes.

The α-olefins having from 4 to 20 carbon atoms include, for example, α-olefins such as 1-butene, 3-methyl-1-butene, 4-methyl-1-butene, 4-phenyl-1-butene, 1-pentene, 3-methyl-1-pentene, 4-methyl-1-pentene, 3,3-dimethyl-1-pentene, 3,4-dimethyl-1-pentene, 4,4-dimethyl-1-pentene, 1-hexene, 4-methyl-1-hexene, 5-methyl-1-hexene, 6-phenyl-1-hexene, 1-octene, 1-decene, 1-dodecene, 1-tetradecene, 1-hexadecene, 1-octadecene, 1-eicosene, vinylcyclohexane; and halogen-substituted α-olefins such as hexafluoropropene, tetrafluoroethylene, 2-fluoropropene, fluoroethylene, 1,1-difluoroethylene, 3-fluoropropene, trifluoroethylene, 3,4-dichloro-1-butene.

The cyclic olefins includes those of the following general formula (II-1):

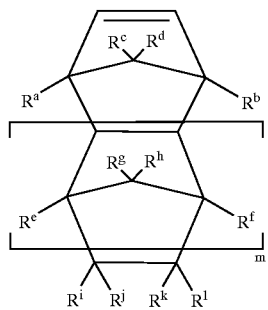

(II-1)

wherein $R^a$ to $R_1$ each represent a hydrogen atom, a hydrocarbon group having from 1 to 20 carbon atoms, or a halogen-, oxygen- or nitrogen-containing substituent; m indicates an integer of 0 or more; $R^i$ and $R^j$, each combined with $R^j$ and $R^1$, respectively, may form a ring; and $R^a$ to $R^1$ may be the same or different.

In the cyclic olefins of formula (II-1), $R^a$ to $R^1$ each represent a hydrogen atom, a hydrocarbon group having from 1 to 20 carbon atoms, or a halogen-, oxygen- or nitrogen-containing substituent, as so mentioned hereinabove.

Concretely, the hydrocarbon group having from 1 to 20 carbon atoms includes, for example, an alkyl group having from 1 to 20 carbon atoms such as methyl, ethyl, n-propyl, isopropyl, n-butyl, isobutyl, t-butyl and hexyl groups; an aryl, alkylaryl or arylalkyl group having from 6 to 20 carbon atoms such as phenyl, tolyl and benzyl groups; an alkylidene group having from 1 to 20 carbon atoms such as methylidene, ethylidene and propylidene groups; and an alkenyl group having from 2 to 20 carbon atoms such as vinyl and allyl groups. However, $R^a$, $R^b$, $R^e$ and $R^f$ must not be an alkylene group. In case where any of $R^c$, $R^d$, $R^g$ to $R^l$ is an alkylidene group, the carbon atom to which it is bonded does not have any other substituent.

Concretely, the halogen-containing substituent includes, for example, a halogen atom such as fluorine, chlorine, bromine and iodine atoms; and a halogen-substituted alkyl group having from 1 to 20 carbon atoms such as chloromethyl, bromomethyl and chloroethyl groups.

The oxygen-containing substituent includes, for example, an alkoxy group having from 1 to 20 carbon atoms such as methoxy, ethoxy, propoxy and phenoxy groups; and an alkoxycarbonyl group having from 1 to 20 carbon atoms such as methoxycarbonyl and ethoxycarbonyl groups.

The nitrogen-containing substituent includes, for example, an alkylamino group having from 1 to 20 carbon atoms such as dimethylamino and diethylamino groups, and a cyano group.

Examples of the cyclic olefins of formula (II-1) are norbornene, 5-methylnorbornene, 5-ethylnorbornene, 5-propylnorbornene, 5,6-dimethylnorbornene, 1-methylnorbornene, 7-methylnorbornene, 5,5,6-trimethylnorbornene, 5-phenylnorbornene, 5-benzylnorbornene, 5-ethylidenenorbornene, 5-vinylnorbornene, 1,4,5,8-dimethano-1,2,3,4,4a,5,8,8a-octhydronaphthalene, 2-methyl-1,4,5,8-dimethano-1,2,3,4,4a,5,8,8a-octahydronaphthalene, 2-ethyl-1,4,5,8-dimethano-1,2,3,4,4a,5,8,8a-octahydronaphthalene, 2,3-dimethyl-1,4,5,8-dimethano-1,2,3,4,4a,5,8,8a-octahydronaphthalene, 2-hexyl-1,4,5,8-dimethano-1,2,3,4,4a,5,8,8a-octahydronaphthalene, 2-ethylidene-1,4,5,8-dimethano-1,2,3,4,4a,5,8,8a-octahydronaphthalene, 2-fluoro-1,4,5,8-dimethano-1,2,3,4,4a,5,8,8a-octahydronaphthalene, 1,5-dimethyl-1,4,5,8-dimethano-1,2,3,4,4a,5,8,8a-octahydronaphthalene, 2-cyclohexyl-1,4,5,8-dimethano-1,2,3,4,4a,5,8,8a-octahydronaphthalene, 2,3-dichloro-1,4,5,8-dimethano-1,2,3,4,4a,5,8,8a-octahydronaphthalene, 2-isobutyl-1,4,5,8-dimethano-1,2,3,4,4a,5,8,8a-octahydronaphthalene, 1,2-dihydrocyclopentadiene, 5-chloronorbornene, 5,5-dichloronorbornene, 5-fluoronorbornene, 5,5,6-trifluoro-6-trifluoromethylnorbornene, 5-chloromethylnorbornene, 5-methoxynorbornene, 5,6-dicarboxynorbornene anhydrate, 5-dimethylaminonorbornene, and 5-cyanonorbornene.

The styrenes for use herein are not specifically defined, but preferred are styrene, alkylstyrenes, and divinylbenzene. More preferred are styrene, α-methylstyrene, p-methylstyrene and divinylbenzene.

The styrenes include, for example, styrene; alkylstyrenes such as p-methylstyrene, p-ethylstyrene, p-propylstyrene, p-isopropylstyrene, p-butylstyrene, p-tert-butylstyrene, p-phenylstyrene, o-methylstyrene, o-ethylstyrene, o-propylstyrene, o-isopropylstyrene, m-methylstyrene, m-ethylstyrene, m-isopropylstyrene, m-butylstyrene, mesitylstyrene, 2,4-dimethylstyrene, 2,5-dimethylstyrene, 3,5-dimethylstyrene; alkoxystyrenes such as p-methoxystyrene, o-methoxystyrene, m-methoxystyrene; and halogenostyrenes such as p-chlorostyrene, m-chlorostyrene, o-chlorostyrene, p-bromostyrene, m-bromostyrene, o-bromostyrene, p-fluorostyrene, m-fluorostyrene, o-fluorostyrene, o-methyl-p-fluorostyrene. Further mentioned are trimethylsilylstyrene, vinylbenzoates, and divinylbenzene.

Of those, ethylene is preferred for the comonomer. In the invention, one or more of the above-mentioned olefins may be used either singly or as combined in any desired manner.

The macromonomer of the invention can be produced by polymerizing propylene, or propylene and at least one comonomer selected from ethylene, α-olefins having from 4 to 20 carbon atoms, cyclic olefins and styrenes, in the presence of a catalyst comprising (A) a transition metal compound of Group 4 of the Periodic Table of the following general formula (II-2), (B) at least one selected from a compound group consisting of (B-1) aluminoxanes and (B-2) compounds capable of forming ionic complexes from the transition metal compound or its derivatives, and optionally (C) an organoaluminium compound.

$$(R^1{}_{5-m}H_mC_5)(R^2{}_{5-n}H_nC_5)M^1X^1{}_2 \qquad (II-2)$$

wherein $M^1$ represents titanium, zirconium or hafnium; $R^1$ and $R^2$ each represent a hydrocarbon group having from 1 to 20 carbon atoms, and these may be the same or different; $(R^1{}_{5-m}H_mC_5)$ and $(R^2{}_{5-n}H_nC_5)$ each represent a hydrocarbon-substituted cyclopentadienyl group, and these may be the same or different; $X^1$ represents a hydrogen atom, a halogen atom, or a hydrocarbon group having from 1 to 20 carbon atoms, and two $X^1$'s may be the same or different; m and n each independently represent 0, 1 or 2, but these must not be m=n=0 at the same time.

In formula (II-2), the hydrocarbon group having from 1 to 20 carbon atoms for $R^1$, $R^2$ and $X^1$ is not specifically defined. Preferably, for example, it is an alkyl, aryl, arylalkyl or alkylaryl group having from 1 to 20 carbon atoms. The alkyl group having from 1 to 20 carbon atoms includes, for example, methyl, ethyl, propyl, isopropyl, butyl, isobutyl, t-butyl, amyl, hexyl, heptyl, octyl, nonyl, capryl, undecyl, lauryl, tridecyl, myristyl, pentadecyl, cetyl, heptadecyl, stearyl, nonadecyl and eicosyl groups. The aryl and arylalkyl groups having from 1 to 20 carbon atoms include, for example, phenyl, benzyl and phenethyl groups. The alkylaryl group having from 1 to 20 carbon atoms includes, for example, p-tolyl and p-n-butylphenyl groups.

In compounds of formula (II-2), for example, $(R^1_{5-m}H_mC_5)$ and $(R^2_{5-n}H_nC_5)$ are the same. Concretely, they include bis(1,2-dimethyl-3,5-diethylcyclopentadienyl) zirconium dichloride, bis(1,2-dimethyl-3,5-di-n-butylcyclopentadienyl)zirconium dichloride, bis(1-n-butyl-2,3,4-trimethylcyclopentadienyl)zirconium dichloride, bis (1,2,4-trimethylcyclopentadienyl)zirconium dichloride, bis (1,2-dimethyl-4-ethylcyclopentadienyl)zirconium dichloride, bis(1-methyl-2,4-diethylcyclopentadienyl) zirconium dichloride, bis(1,2,4-triethylcyclopentadienyl) zirconium dichloride, bis(1,2-diethyl-4-methylcyclopentadienyl)zirconium dichloride, and bis(1,2-dimethyl-4-isopropylcyclopentadienyl)zirconium dichloride.

Examples of the compounds in which $(R^1_{5-m}H_mC_5)$ and $(R^2_{5-n}H_nC_5)$ differ from each other are (pentamethylcyclopentadienyl) (tetramethylcyclopentadienyl)zirconium dichloride, (pentamethylcyclopentadienyl)(1,2,4-trimethylcyclopentadienyl)zirconium dichloride, (pentamethylcyclopentadienyl)(1,2-dimethyl-3,5-diethylcyclopentadienyl)zirconium dichloride, (pentamethylcyclopentadienyl)(1,2-dimethyl-3,5-di-n-butylcyclopentadienyl)zirconium dichloride, (pentamethylcyclopetandienyl)(1-n-butyl-2,3,4-trimethylcyclopentadienyl)zirconium dichloride, (pentamethylcyclopentadienyl)(1-methyl-2,4-diethylcyclopentadienyl)zirconium dichloride, (pentamethylcyclopentadienyl)(1,2-dimethyl-4-ethylcyclopentadienyl)zirconium dichloride, (pentamethylcyclopentadienyl)(1,2,4-triethylcyclopentadienyl)zirconium dichloride, (pentamethylcyclopentadienyl)(1,2-diethyl-4-methylcyclopentadienyl)zirconium dichloride, (pentamethylcyclopentadienyl)(1,2-dimethyl-4-isopropylcyclopentadienyl)zirconium dichloride, (tetramethylcyclopentadienyl)(1,2,4-trimethylcyclopentadienyl)zirconium dichloride, (tetraethylcyclopentadienyl)(1,2,4-trimethylcyclopentadienyl)zirconium dichloride, and (1,2-dimethyl-3,5-diethylcyclopentadienyl)(1,2,4-trimethylcyclopentadienyl)zirconium dichloride.

For the component (A), two or more different types of the compounds may be combined.

The aluminoxanes for the component (B-1) include linear aluminoxanes of a general formula (II-3):

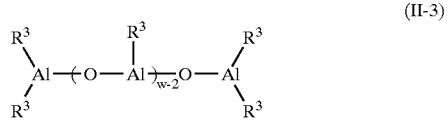

(II-3)

wherein $R^1$ represents a hydrocarbon group, such as an alkyl, alkenyl, aryl or arylalkyl group having from 1 to 20, preferably from 1 to 12 carbon atoms, or represents a halogen atom; w indicates a mean degree of polymerization, and is an integer generally falling between 2 and 50, preferably between 2 and 40; and $R^3$'s may be the same or different, and cyclic aluminoxanes of a general formula (II-4):

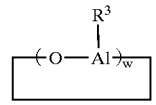

(II-4)

wherein $R^3$ and w have the same meanings as those in formula (II-3).

For producing the aluminoxanes mentioned above, for example, employable is a method of contacting alkylaluminiums with a condensation agent such as water, for which, however, the means are not specifically defined. The reaction in the method may be effected in any known manner. For example, <1> an organoaluminium compound is dissolved in an organic solvent, and this is contacted with water; <2> an organoaluminium compound is added to the polymerization system, and water is added thereto later; <3> crystal water existing in metal salts and the like, or water adsorbed by inorganic or organic matters is applied to and reacted with an organoaluminium compound; <4> a tetraalkyldialuminoxane is reacted with a trialkylaluminium, and then with water.

The aluminoxanes may be soluble or insoluble in hydrocarbon solvents. Preferably, however, they are soluble in hydrocarbon solvents, and have a residual organoaluminium compound content of at most 10% by weight measured through $^1$H-NMR. More preferably, they have a residual organoaluminium compound content of from 3 to 5% by weight or smaller, even more preferably from 2 to 4% by weight or smaller. The aluminoxanes of the type are preferred, as the percentage of the aluminoxane to be held on a carrier (carrier-held percentage) increases. Another advantage is that, since they are soluble in hydrocarbon solvents, those not held on a carrier can be recycled. In addition, the properties of the aluminoxanes of the type are stable, and therefore, they do not require any additional treatment before use. Moreover, the polyolefins produced through polymerization in the presence of such aluminoxanes are good in point of their mean particle size and particle size distribution (morphology as a generic term for these). These are other advantages of the aluminoxanes of the type. If, however, the residual organoaluminium compound content thereof is larger than 10% by weight, the aluminoxanes will lower the polymerization activity of the catalyst comprising it.

To obtain the preferred aluminoxanes, for example, employable is a so-called dry-up method that comprises dissolving an ordinary aluminoxane in a solvent, followed by drying up the resulting aluminoxane solution under heat under reduced pressure to remove the solvent. In the dry-up method, it is preferable that the aluminoxane solution is heated under reduced pressure at a temperature not higher than 80° C., more preferably not higher than 60° C. for removing the solvent.

For removing the matters insoluble in hydrocarbon solvents from aluminoxanes, for example, the insoluble matters are spontaneously precipitated in an aluminoxane solution in a hydrocarbon solvent and then removed from the solution through decantation. Alternatively, the insoluble matters may also be removed through centrifugation or the like. With that, the solubilized component thus recovered is filtered through a G5 glass filter or the like in a nitrogen atmosphere. The method is preferable as it ensures complete removal of the insoluble matters. The aluminoxanes thus prepared will often gel when stored for long. Therefore, it is desirable that they are used in the invention within 48 hours after their preparation. More preferably, they are used immediately after their preparation. The proportion of the aluminoxane to the hydrocarbon solvent in which it is processed is not specifically defined, but it is desirable that the aluminoxane concentration in the hydrocarbon solvent falls between 0.5 and 10 mols, in terms of the aluminium atom, in one liter of the hydrocarbon solvent.

The hydrocarbon solvent includes, for example, aromatic hydrocarbons such as benzene, toluene, xylene, cumene, cymene; aliphatic hydrocarbons such as pentane, hexane, heptane, octane, decane, dodecane, hexadecane, octadecane; alicyclic hydrocarbons such as cyclopentane, cyclohexane, cyclooctane, methylcyclopentane; petroleum fractions such as naphtha, kerosene, light gas oil. One or more different types of such aluminoxanes may be used either singly or as combined.

For the component (B-2), usable are any ionic compounds capable of being converted into cations through reaction with the above-mentioned transition metal compound. Especially preferred for use herein are compounds of the following general formulae (II-5) and (II-6), as being able to efficiently form polymerization-active points.

  (II-5)

  (II-6)

In these, $L^2$ represents $M^2$, $R^5R^6M^3$, $R^7_3C$ or $R^8M^3$.

In formulae (II-5) and (II-6), $L^1$ represents a Lewis base; $[Z]^-$ represents a non-coordinating anion $[Z^1]^-$ or $[Z^2]^-$; $[Z^1]^-$ represents an anion of a plurality of groups bonded to an element, $[M^4G^1G^2\ldots G^f]^{-1}$; $M^4$ represents an element of Groups 5 to 15 of the Periodic Table, preferably an element of Groups 13 to 15 of the Periodic Table; $G^1$ to $G^f$ each represents a hydrogen atom, a halogen atom, an alkyl group having from 1 to 20 carbon atoms, a dialkylamino group having from 2 to 40 carbon atoms, an alkoxy group having from 1 to 20 carbon atoms, an aryl group having from 6 to 20 carbon atoms, an aryloxy group having from 6 to 20 carbon atoms, an alkylaryl group having from 7 to 40 carbon atoms, an arylalkyl group having from 7 to 40 carbon atoms, a halogen-substituted hydrocarbon group having from 1 to 20 carbon atoms, an acyloxy group having from 1 to 20 carbon atoms, an organometalloid group, or a hetero atom-containing hydrocarbon group having from 2 to 20 carbon atoms, and at least two of $G^1$ to $G^f$ may form a ring; f is an integer, indicating [(atomic valency of the center metal $M^4$)+1]; $[Z^2]^-$ represents a conjugated base of a single Brønsted acid of which the logarithm of the reciprocal of the acid dissociation constant ($pK_a$) is at most −10, or of a combination of such a Brønsted acid and a Lewis acid, or represents a conjugated base of an ordinary ultra-strong acid, and optionally, this may be coordinated with a Lewis base; $R^4$ represents a hydrogen atom, an alkyl group having from 1 to 20 carbon atoms, an aryl, alkylaryl or arylalkyl group having from 6 to 20 carbon atoms; $R^5$ and $R^6$ each represent a cyclopentadienyl group, a substituted cyclopentadienyl group, an indenyl group, or a fluorenyl group; $R^7$ represents an alkyl, aryl, alkylaryl or arylalkyl group having from 1 to 20 carbon; $R^8$ represents a macrocyclic ligand such as tetraphenylporphyrin or phthalocyanine; h is an integer of from 1 to 3, indicating the ionic valency of $[L^1—R^4]$ or $[L^2]$; a is an integer of at least 1; b=(h×a); $M^2$ represents an element of Groups 1 to 3, 11 to 13 and 17 of the Periodic Table; and $M^3$ represents an element of Groups 7 to 12 of the Periodic Table.

Examples of $L^1$ are amines such as ammonia, methylamine, aniline, dimethylamine, diethylamine, N-methylaniline, diphenylamine, N,N-dimethylaniline, trimethylamine, triethylamine, tri-n-butylamine, methyldiphenylamine, pyridine, p-bromo-N,N-dimethylaniline, p-nitro-N,N-dimethylaniline; phosphines such as triethylphosphine, triphenylphosphine, diphenylphosphine; thioethers such as tetrahydrothiophene; esters such as ethyl benzoate; nitriles such as acetonitrile, benzonitrile.

Examples of $R^4$ are a hydrogen atom, a methyl group, an ethyl group, a benzyl group, a trityl group. Examples of $R^5$ and $R^6$ are a cyclopentadienyl group, a methylcyclopentadienyl group, an ethylcyclopentadienyl group, a pentamethylcyclopentadienyl group. Examples of $R^7$ are a phenyl group, a p-tolyl group, a p-methoxyphenyl group. Examples of $R^8$ are tetraphenylporphine, phthalocyanine, allyl, methallyl. Examples of $M^2$ are Li, Na, K, Ag, Cu, Br, I, $I_3$. Examples of $M^3$ are Mn, Fe, Co, Ni, Zn.

In $[Z^1]^-$ indicating $[M^5G^1G^2\ldots G^f]^-$, $M^5$ includes B, Al, Si, P, As, Sb, but is preferably B or Al. Examples of the dialkylamino group for $G^1$, $G^2$ to $G^f$ are a dimethylamino group, a diethylamino group; those of the alkoxy group and the aryloxy group are a methoxy group, an ethoxy group, an n-butoxy group, a phenoxy group; those of the hydrocarbon group are a methyl group, an ethyl group, an n-propyl group, an isopropyl group, an n-butyl group, an isobutyl group, an n-octyl group, an n-eicosyl group, a phenyl group, a p-tolyl group, a benzyl group, a 4-t-butylphenyl group, a 3,5-dimethylphenyl group; those of the halogen atom are fluorine, chlorine, bromine and iodine atoms; those of the hetero atom-containing hydrocarbon group are a p-fluorophenyl group, a 3,5-difluorophenyl group, a pentachlorophenyl group, a 3,4,5-trifluorophenyl group, a pentafluorophenyl group, a 3,5-bis(trifluoromethyl)phenyl group, a bis(trimethylsilyl)methyl group; those of the organometalloid group are a pentamethylantimonyl group, a trimethylsilyl group, a trimethylgermyl group, a diphenylarsenyl group, a dicyclohexylantimonyl group, a diphenylboryl group.

Examples of the non-coordinating anion, $[Z^2]^-$ that indicates a conjugated base of a single Brønsted acid having pKa of at most −10, or of a combination of such a Brønsted acid and a Lewis acid are a trifluoromethanesulfonate anion $(CF_3SO_3)^-$, a bis(trifluoromethanesulfonyl)methyl anion, a bis(trifluoromethanesulfonyl)benzyl anion, a bis(trifluoromethanesulfonyl)amido anion, a perchlorate anion $(ClO_4)^-$, a trifluoroacetate anion $(CF_3CO_2)^-$, a hexafluoroantimonyl anion $(SbF_6)^-$, a fluorosulfonate anion $(FSO_3)^-$, a chlorosulfonate anion $(ClSO_3)^-$, a fluorosulfonate/pentafluoroantimonyl anion $(FSO_3/SbF_5)^-$, a fluorosulfonate/pentafluoroarsenyl anion $(FSO_3/AsF_5)^-$, a trifluoromethanesulfonate/pentafluoroantimonyl anion $(CF_3SO_3SbF_5)^-$.

Examples of the compounds for the component (B-2) are triethylammonium tetraphenylborate, tri-n-butylammonium tetraphenylborate, trimethylammonium tetraphenylborate, tetraethylammonium tetraphenylborate, methyl(tri-n-butyl)ammonium tetraphenylborate, benzyl(tri-n-butyl)ammonium tetraphenylborate, dimethyldiphenylammonium tetraphenylborate, triphenyl(methyl)ammonium tetraphenylborate, trimethylanilinium tetraphenylborate, methylpyridinium tetraphenylborate, benzylpyridinium tetraphenylborate, methyl(2-cyanopyridinium) tetraphenylborate, triethylammonium tetrakis (pentafluorophenyl)borate, tri-n-butylammonium tetrakis (pentafluorophenyl)borate, triphenylammonium tetrakis (pentafluorophenyl)borate, tetra-n-butylammonium tetrakis (pentafluorophenyl)borate, tetraethylammonium tetrakis (pentafluorophenyl)borate, benzyl(tri-n-butyl)ammonium tetrakis(pentafluorophenyl)borate, methyldiphenylammonium tetrakis(pentafluorophenyl)borate, triphenyl(methyl) ammonium tetrakis (pentafluorophenyl)borate, methylanilinium tetrakis(pentafluorophenyl)borate, dimethylanilinium tetrakis(pentafluorophenyl)borate, methylanilinium tetrakis(pentafluorophenyl)borate, methylpyridinium tetrakis(pentafluorophenyl)borate, methylpyridinium tetrakis(pentafluorophenyl)borate, methyl(2-cyanopyridinium) tetrakis(pentafluorophenyl)borate, benzyl (2-cyanopyridinium) tetrakis(pentafluorophenyl)borate, methyl(4-cyanopyridinium) tetrakis(pentafluorophenyl)

borate, triphenylphosphonium tetrakis(pentafluorophenyl) borate, dimethylanilinium tetrakis[bis(3,5-ditrifluoromethyl)phenyl]borate, ferrocenium tetraphenylborate, silver tetraphenylborate, trityl tetraphenylborate, tetraphenylporphyrylmanganese tetraphenylborate, ferrocenium tetrakis(pentafluorophenyl) borate, (1,1'-dimethylferrocenium) tetrakis(pentafluorophenyl)borate, decamethylferrocenium tetrakis(pentafluorophenyl)borate, silver tetrakis(pentafluorophenyl)borate, trityl tetrakis(pentafluorophenyl) borate, lithium tetrakis(pentafluorophenyl)borate, sodium tetrakis(pentafluorophenyl)borate, tetraphenylporphyrylmanganese tetrakis(pentafluorophenyl)borate, silver tetrafluoroborate, silver hexafluorophosphate, silver hexafluoroarsenate, silver perchlorate, silver trifluoroacetate, and silver trifluoromethanesulfonate. For the component (B-2), preferred are the boron compounds mentioned above.

For the component (B-2), one or more different types of ionic compounds capable of being converted into cations through reaction with the transition metal compound of the component (A) may be used, either singly or as combined.

In the olefin polymerization catalyst for use in the invention, the component (B) may be the component (B-1) or (B-2) alone, or a combination of the components (B-1) and (B-2).

The catalyst for producing the macromonomer of the invention may consists, as the essential ingredients, the component (A) and the component (B) mentioned above, or may consists, as the essential ingredients, the component (A), the component (B) and the organoaluminium compound (C). The organoaluminium compound for the component (C) includes those of a general formula (II-7):

$$R^9_v AlQ_{3-v} \qquad (II-7)$$

wherein R9 represents an alkyl group having from 1 to 10 carbon atoms; Q represents a hydrogen atom, an alkoxy group having from 1 to 20 carbon atoms, an aryl group having from 6 to 20 carbon atoms, or a halogen atom; and v is an integer of from 1 to 3.

Examples of the compounds of formula (II-7) are trimethylaluminium, triethylaluminium, triisopropylaluminium, triisobutylaluminium, dimethylaluminium chloride, diethylaluminium chloride, methylaluminium dichloride, ethylaluminium dichloride, dimethylaluminium fluoride, diisobutylaluminium hydride, diethylaluminium hydride, and ethylaluminium sesquichloride. One or more different types of the organoaluminium compounds may be used herein either singly or as combined.

The proportion of the catalyst components (A) and (B) of the polymerization catalyst for use in the invention is described. In case where the compound (B-1) is used for the catalyst component (B), the molar ratio of the two components preferably falls between 1/1 and $1/10^6$, more preferably between 1/10 and $1/10^3$. If the ratio oversteps the range, the catalyst cost per the unit weight of the polymer produced increases and is therefore impracticable. In case where the compound (B-2) is used, the molar ratio preferably falls between 1/0.1 and 1/100, more preferably between 1/0.5 and 1/10, even more preferably between 1/0.8 and 1/5. If the ratio oversteps the range, the catalyst cost per the unit weight of the polymer produced increases and is therefore impracticable.

The molar ratio of the catalyst component (A) to the optional catalyst component (C) preferably falls between 1/1 and 1/1000, more preferably between 1/10 and 1/700, even more preferably between 1/20 and 1/500. The catalyst component (C), if any, improves the polymerization activity per the transition metal of the catalyst. However, if too much, overstepping the range as above, it is undesirable since the excess organoaluminium compound comes to nothing and will remain in the polymer produced; but if too small, it is also undesirable since the catalyst activity is low.

In the invention, at least one catalyst component may be held on a suitable carrier. The type of the carrier is not specifically defined. For the carrier, for example, usable are inorganic oxides, and also other inorganic carriers and organic carriers. For morphology control of the polymers produced, preferred are inorganic oxides and other inorganic carriers. Concretely, the inorganic oxide carriers include $SiO_2$, $Al_2O_3$, MgO, $ZrO_2$, $TiO_2$, $Fe_2O_3$, $B_2O_3$, CaO, ZnO, BaO, $ThO_2$, and their mixtures such as silica-alumina, zeolite, ferrite and glass fibers. Of those, especially preferred are $SiO_2$ and $Al_2O_3$. The inorganic oxide carriers may contain minor carbonates, nitrates, sulfates, etc. Other examples of the carriers than those mentioned above are magnesium compounds of a general formula $MgR^{10}_x X^2_y$ such as typically $MgCl_2$ and $Mg(OC_2H_5)_2$, and their complexes. In the formula, $R^{10}$ represents an alkyl group having from 1 to 20 carbon atoms, an alkoxy group having from 1 to 20 carbon atoms, or an aryl group having from 6 to 20 carbon atoms; $X^2$ represents a halogen atom, or an alkyl group having from 1 to 20 carbon atoms; x falls between 0 and 2; y falls between 0 and 2; and x+y=2. $R^{10}$'s as well as $X^2$'s, if any, may be the same or different. The organic carriers usable herein include, for example, polymers such as polystyrene, styrene-divinylbenzene copolymer, polyethylene, polypropylene, substituted polystyrene, polyarylate; and starch and carbon. For the carrier for use in the invention, preferred are $MgCl_2$, $MgCl(OC_2H_5)$, $Mg(OC_2H_5)_2$, $SiO_2$ and $Al_2O_3$. The properties of the carriers vary, depending on their type and the method for producing them. In general, their mean particle size falls between 1 and 300 $\mu$m, preferably between 10 and 200 $\mu$m, more preferably between 20 and 100 $\mu$m. If the carriers are too small, fine powder in the polymers produced will increase; but if too large, coarse particles in the polymers produced will increase and they lower the bulk density of the polymers and clog hoppers. The specific surface area of the carriers may fall generally between 1 and 1000 m$^2$/g, preferably between 50 and 500 m$^2$/g; and the pore volume thereof may fall generally between 0.1 and 5 cm$^3$/g, preferably between 0.3 and 3 cm$^3$/g. If any of the specific surface area and the pore volume of the carrier used oversteps the range, the catalyst activity will lower. The specific surface area and the pore volume of the carriers may be calculated from the volume of the nitrogen gas adsorbed by the carriers, for example, according to the BET method (see J. Am. Chem. Soc., Vol. 60, p. 309, 1983). Preferably, the carriers are calcined generally at a temperature falling between 100 and 1000° C., preferably between 130 and 800° C. before use.

In case where at least one catalyst component is held on carriers, it is desirable that at least one of the catalyst components (A) and (B), preferably both of them are held on the carrier from the viewpoint of the morphology control of polymers and of the process applicability of the catalyst, for example, to vapor-phase polymerization.

The method of making at least one of the components (A) and (B) held on carriers is not specifically defined. For example, <1> at least one of the components (A) and (B) is mixed with a carrier; <2> a carrier is processed with an organoaluminium compound or a halogen-containing silicon compound, and then it is mixed with at least one of the components (A) and (B) in an inert solvent; <3> a carrier is, along with the component (A) or (B) or with the two, reacted with an organoaluminium compound or a halogen-containing silicon compound; <4> the component (A) or (B) is first held on a carrier, and then the components (A) and (B) are mixed; <5> a contact reaction product of the components (A) and (B) is mixed with a carrier; or <6> the components (A) and (B) are contacted in the presence of a carrier. In the methods <4>, <5> and <6>, an organoaluminium compound for the component (C) may be added to the system.

In the invention, the blend ratio of the component (B-1) and the carrier preferably falls between 1/0.5 and 1/1000, more preferably between 1/1 and 1/50 by weight. The blend ratio of the component (B-2) and the carrier preferably falls between 1/5 and 1/10000, more preferably between 1/10 and 1/500 by weight. In case where two or more different types of compounds are combined and used for the catalyst component (B), it is desirable that the blend ratio of each compound for the component (B) and the carrier falls within the range as above. The blend ratio of the component (A) and the carrier preferably falls between 1/5 and 1/10000, more preferably between 1/10 and 1/500 by weight.

The blend ratio of the component (B) (component (B-1), component (B-2)) and the carrier, or the blend ratio of the component (A) and the carrier oversteps the range as above, the catalyst activity will lower. The mean particle size of the polymerization catalyst prepared in the manner as above for use in the invention may fall generally between 2 and 200 $\mu$m, preferably between 10 and 150 $\mu$m, more preferably between 20 and 100 $\mu$m; and the specific surface area thereof may fall generally between 20 and 1000 m$^2$/g, preferably between 50 and 500 m$^2$/g. If the mean particle size is smaller than 2 $\mu$m, fine powder in the polymers produced will increase; but if larger than 200 $\mu$m, coarse particles in the polymers will increase. If the specific surface area is smaller than 20 m$^2$/g, the catalyst activity will lower; but if larger than 1000 m$^2$/g, the bulk density of the polymers produced will lower. In the polymerization catalyst, the amount of the transition metal preferably falls between 0.05 and 10 g, more preferably between 0.1 and 2 g, per 100 g of the carrier therein. If the amount of the transition metal oversteps the range, the catalyst activity will lower. Using the catalyst held on a carrier, the olefin polymers produced have an increased bulk density and a desired particle size distribution and are therefore favorable for industrial applications.

The treatment for contacting the component (A), the component (C) and optionally the component (C) and/or carrier with each other may be effected in an inert gas such as nitrogen, or in a hydrocarbon solvent such as pentane, hexane, heptane, toluene or cyclohexane. The temperature for the contact treatment may fall between −30° C. and the boiling point of the solvent used, preferably between −10° C. and 100° C.; the time for it may fall generally between 30 seconds and 10 hours. After the contact treatment, the solid catalyst component may be or may not be washed. The catalyst thus prepared may be used for polymerization after it is once subjected to distillation for solvent removal to separate the solid catalyst, or may be directly used with no such treatment.

In the invention, the treatment for making at least one of the components (A) and (B) held on a carrier may be effected in the polymerization system to form the catalyst in situ. For example, at least one of the components (A) and (B) and a carrier, and optionally an organoaluminium compound for the component (C) are put in a reactor, in which an olefin is prepolymerized to form the catalyst. The olefin to be used for the prepolymerization may be any of ethylene and α-olefins having from 3 to 20 carbon atoms, such as propylene, 1-butene, 1-pentene, 4-methyl-1-pentene, 1-hexene, 1-octene, 1-decene, 1-dodecene, and 1-tetradecene. Of those, especially preferred are ethylene, propylene, and their combinations with α-olefins for ethylene-propylene polymerization. For the inert hydrocarbon solvent for the prepolymerization, referred to are the same as those mentioned hereinabove for the preparation of solid catalyst components. The amount of the components to be processed through such prepolymerization may fall generally between $10^{-6}$ and $2 \times 10^2$ mols/liter (solvent), in terms of the transition metal therein, preferably between $5 \times 10^{-5}$ and $10^{-2}$ mols/liter (solvent). In one gram of the carrier, the atomic ratio of the aluminium in the organoaluminium compound such as methylaluminoxane (MAO), to the transition metal, (Al/transition metal), generally falls between 10 and 5000, preferably between 20 and 1000. The atomic ratio of the aluminium atom in the optional organoaluminium compound to the aluminium atom in MAO generally falls between 0.02 and 3, preferably between 0.05 and 1.5. The prepolymerization temperature may fall between −20 and 60° C., preferably between 0 and 50° C. The prepolymerization time may fall between 0.5 and 100 hours, preferably between 1 and 50 hours or so. In the invention, the catalyst to be used is preferably prepared through olefin prepolymerization.

Regarding the polymerization condition in producing the macromonomer of the invention, the ratio of the monomer concentration to the concentration of the linear macromonomer produced in the reaction system must be large in order to control the molecular weight of the macromonomer and to make the macromonomer have a linear structure. In that condition, the linear macromonomer produced is prevented from being further copolymerized with the monomer in the reaction system to form branches, and therefore the efficiency in producing the intended linear macromonomer is increased. For example, it is desirable that the monomer concentration in the reaction system is increased, or that is, the reaction pressure is increased or the reaction temperature is lowered. This is for preventing the formation of branched macromonomers, and, in addition, for increasing the molecular weight of the intended linear macromonomer produced, whereby undesirable oligomers such as dimers and trimers, to which the invention is not directed, are prevented from being formed. Concretely, the following polymerization condition 1 or 2 is employed.

Polymerization Condition 1:

The polymerization temperature falls between −50° C. and lower than 20° C., preferably between −50° C. and 18° C., more preferably between −40° C. and 16° C., even more preferably between −35° C. and 15° C. Within the polymerization temperature range, the polymerization pressure falls generally between 0.001 and 5 MPa (gauge), preferably between 0.005 and 5 MPa (gauge), more preferably between 0.005 and 4 MPa (gauge), even more preferably between 0.01 and 3.5 MPa (gauge).

Polymerization Condition 2:

The polymerization temperature falls between 40° C. and 100° C., preferably between 40° C. and 90° C., more preferably between 45° C. and 90° C., even more preferably between 45° C. and 80° C. Within the polymerization temperature range, the polymerization pressure falls generally between 1.5 and 15 MPa (gauge), preferably between 2 and 15 MPa (gauge), more preferably between 2.4 and 15 MPa (gauge).

The polymerization may be effected in any mode of solution polymerization, bulk polymerization or vapor-phase polymerization. The solvent to be used in the polymerization includes, for example, aromatic hydrocarbons such as benzene, toluene, xylene; aliphatic hydrocarbons such as hexane, heptane; and alicyclic hydrocarbons such s cyclopentane, cyclohexane.

[2]Propylene Graft Copolymer:

The propylene graft copolymer of the invention is a polymer obtained by copolymerizing the above-mentioned propylene macromonomer [1] with at least one comonomer selected from ethylene, propylene, α-olefins having from 4 to 20 carbon atoms, cyclic olefins and styrenes, in the presence of a metallocene catalyst or a Ziegler-Natta catalyst, preferably in the presence of a metallocene catalyst.

The propylene graft copolymer of the invention may have or may not have terminal vinyl groups, but preferably has no terminal vinyl groups. It may be any of random copolymers or block copolymers. Regarding its stereospecificity, the copolymer may be any of atactic, isotactic or syndiotactic copolymers.

Preferably, the propylene graft copolymer of the invention contains from 0.01 to 40% by weight, more preferably from 0.02 to 40% by weight, even more preferably from 0.02 to 35% by weight of the above-mentioned propylene macromonomer.

If its propylene macromonomer content is smaller than 0.01% by weight, the copolymer is ineffective for improving the workability of resin compositions containing it; but if larger than 40% by weight, the melt flowability of the resin compositions lowers.

Preferably, the propylene graft copolymer of the invention satisfies the following (1) and/or (2):

(1) its intrinsic viscosity [η] measured in a solvent decalin at 135° C. falls between 0.3 and 15 dl/g;

(2) the ratio of the weight-average molecular weight (Mw) to the number-average molecular weight (Mn) thereof measured through GPC, Mw/Mn, falls between 1.5 and 4.5.

If the copolymer does not satisfy the above (1), or that is, if its [η] is smaller than 0.3, its mechanical strength is not so good; but if larger than 15, its workability is often poor. If it does not satisfy the above (2), propylene graft copolymers having Mw/Mn of smaller than 1.5 are impossible to produce in the current arts. On the other hand, those having the ratio of larger than 4.5 contain a large amount of low-molecular weight matters, and, in addition, sticky matters increase in them. The mechanical properties, the optical properties (transparency) and other properties such as heat-sealability of the copolymers are not good.

More preferably, the copolymer satisfies the following (3) and/or (4):

(3) its intrinsic viscosity [η] measured in a solvent decalin at 135° C. falls between 0.5 and 14 dl/g;

(4) the ratio of the weight-average molecular weight (Mw) to the number-average molecular weight (Mn) thereof measured through GPC, Mw/Mn, falls between 1.5 and 4.0.

Even more preferably, it satisfies the following (5) and/or (6):

(5) its intrinsic viscosity [η] measured in a solvent decalin at 135° C. falls between 0.6 and 13 dl/g;

(6) the ratio of the weight-average molecular weight (Mw) to the number-average molecular weight (Mn) thereof measured through GPC, Mw/Mn, falls between 1.5 and 3.8.

Most preferably, it satisfies the following (7) and/or (8):

(7) its intrinsic viscosity [η] measured in a solvent decalin at 135° C. falls between 0.7 and 12 dl/g;

(8) the ratio of the weight-average molecular weight (Mw) to the number-average molecular weight (Mn) thereof measured through GPC, Mw/Mn, falls between 1.5 and 3.0.

One example of the metallocene catalysts usable in producing the propylene graft copolymer of the invention comprises, as the essential ingredients, (A) a metal or lanthanoid-series transition metal compound of Groups 3 to 10 of the Periodic Table, and (B) at least one selected from a compound group consisting of (B-1) aluminoxanes and (B-2) compounds capable of forming ionic complexes from the transition metal compound or its derivatives. Concretely, for example, the metallocene catalysts described in the applicant's own Japanese Patent Laid-Open No. 2942/1995 are usable herein. More concretely, the component (A) includes (i) a monocyclopentadienyl-type metallocene catalyst in which the ligand has at least one cyclopentadienyl group; (ii) a biscyclopentadienyl-type metallocene catalyst in which the ligand has at least two cyclopentadienyl groups, (iii) a crosslinked biscyclopentadienyl-type metallocene catalyst in which the ligand has at least two cyclopentadienyl groups crosslinked, (iv) a restrained geometric metallocene catalyst, and (v) a double-crosslinked metallocene catalyst.

The above (i) includes transition metal compounds of the following general formula, and their derivatives.

$$C_p M^6 R^{11}{}_a R^{12}{}_b R^{13}{}_c \quad \text{(II-8)}$$

The above (ii) includes transition metal compounds of the following general formula, and their derivatives.

$$C_{p2} M^6 R^{11}{}_a R^{12}{}_b \quad \text{(II-9)}$$

The above (iii) includes transition metal compounds of the following general formula, and their derivatives.

$$(C_p-A_e-C_p) M^6 R^{11}{}_a R^{12}{}_b \quad \text{(II-10)}$$

In formulae (II-9) to (II-10), M represents a transition metal such as titanium, zirconium, hafnium, vanadium, niobium, chromium; $C_p$ represents a cyclic unsaturated hydrocarbon group or a linear unsaturated hydrocarbon group, such as a cyclopentadienyl group, a substituted cyclopentadienyl group, an indenyl group, a substituted indenyl group, a tetrahydroindenyl group, a substituted tetrahydroindenyl group, a fluorenyl group, or a substituted fluorenyl group; $R^{11}$, $R^{12}$ and $R^{13}$ each independently represent a σ-bonding ligand, a chelating ligand, a Lewis base-derived ligand. Concretely, the σ-bonding ligand includes, for example, a hydrogen atom, an oxygen atom, a halogen atom, an alkyl group having from 1 to 20 carbon atoms, an alkoxy group having from 1 to 20 carbon atoms, an aryl, alkylaryl or arylalkyl group having from 6 to 20 carbon atoms, an acyloxy group having from 1 to 20 carbon atoms, an allyl group, a substituted allyl group, a silicon-containing substituent; the chelating ligand includes, for example, an acetylacetonato group and a substituted acetylacetonato group. A indicates a covalent-bonding crosslinking group. a, b and c each independently represent an integer of from 0 to 3; and e represents an integer of from 0 to 6. At least two of $R^{11}$, $R^{12}$ and $R^{13}$ may be bonded to each other to form a ring. When $C_p$ has a substituent, the substituent is preferably an alkyl group having from 1 to 20 carbon atoms. In formulae (II-9) and (II-10), two $C_p$'s may be the same or different.

The substituted cyclopentadienyl group in formulae (II-8) to (II-10) includes, for example, methylcyclopentadienyl, ethylcyclopentadienyl, isopropylcyclopentadienyl, 1,2-dimethylcyclopentadienyl, tetramethylcyclopentadienyl, 1,3-dimethylcyclopentadienyl, 1,2,3-trimethylcyclopentadienyl, 1,2,4-trimethylcyclopentadienyl, pentamethylcyclopentadienyl, and trimethylsilylcyclopentadienyl groups. Examples of $R^{11}$ to $R^{13}$ in formulae (II-8) to (II-10) area halogen atom such as fluorine, chlorine, bromine and iodine atoms; an alkyl group having from 1 to 20 carbon atoms, such as methyl, ethyl, n-propyl, isopropyl, n-butyl, octyl and 2-ethylhexyl groups; an alkoxy group having from 1 to 20 carbon atoms, such as methoxy, ethoxy, propoxy, butoxy and phenoxy groups; an aryl, alkylaryl or arylalkyl group having from 6 to 20 carbon atoms, such as phenyl, tolyl, xylyl and benzyl groups; an acyloxy group having from 1 to 20 carbon atoms, such as heptadecylcarbonyloxy group; and a silicon-containing substituent such as trimethylsilyl and trimethylsilylmethyl groups. The Lewis base for these includes, for example, ethers such as dimethyl ether, diethyl ether, tetrahydrofuran; thioethers such as tetrahydrothiophene; esters such as ethyl benzoate; nitriles such as acetonitrile, benzonitrile; amines such as trimethylamine, triethylamine, tributylamine, N,N-dimethylaniline, pyridine, 2,2'-bipyridine, phenanthroline; and phosphines such as triethylphosphine, triphenylphosphine. The linear unsaturated hydrocarbon for these includes, for example, ethylene, butadiene, 1-pentene, isoprene, pentadiene, 1-hexene and their derivatives; and the cyclic unsaturated hydrocarbon includes, for example, benzene, toluene, xylene, cycloheptatriene, cyclooctadiene, cyclooctatriene, cyclooctatetraene, and their derivatives. The covalent-bonding linking group for A in formula (II-10) includes, for example, methylene crosslinking, dimethylmethylene crosslinking, ethylene crosslinking, 1,1'-cyclohexylene crosslinking, dimethylsilylene crosslinking, dimethylgermylene crosslinking, and dimethylstannylene crosslinking.

Examples of the compounds of formula (II-8) are (pentamethylcyclopentadienyl)trimethylzirconium, (pentamethylcyclopentadienyl)triphenylzirconium, (pentamethylcyclopentadienyl)tribenzylzirconium, (pentamethylcyclopentadienyl)trichlorozirconium, (pentamethylcyclopentadienyl)trimethoxyzirconium, (cyclopentadienyl)trimethylzirconium.

Examples of the compounds of formula (II-9) are bis(cyclopentadienyl)dimethylzirconium, bis(cyclopentadienyl)diphenylzirconium, bis(cyclopentadienyl)diethylzirconium, bis(cyclopentadienyl)dibenzylzirconium, bis(cyclopentadienyl)dimethoxyzirconium, bis(cyclopentadienyl) dichlorozirconium.

Examples of the compounds of formula (II-10) are rac-dimethylsilanediyl-bis-1-(2-methyl-4,5-benzoindenyl)-zirconium dichloride, rac-ethanediyl-bis-1-(2-methyl-4,5-benzoindenyl)-zirconium dichloride, rac-dimethylsilanediyl-bis-1-(4,5-benzoindenyl)-zirconium dichloride, rac-dimethylsilanediyl-bis-1-(2-methyl-4-phenylindenyl)-zirconium dichloride, rac-dimethylsilanediyl-bis-1-[2-methyl-4-(1-naphthyl)indenyl]-zirconium dichloride.

The above (iv) includes transition metal compounds of the following general formula (II-11) and their derivatives.

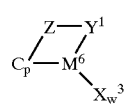

(II-11)

wherein $M^6$ represents a titanium, zirconium or hafnium atom; CP represents a cyclic unsaturated hydrocarbon group or a linear unsaturated hydrocarbon group, such as a cyclopentadienyl group, a substituted cyclopentadienyl group, an indenyl group, a substituted indenyl group, a tetrahydroindenyl group, a substituted tetrahydroindenyl group, a fluorenyl group or a substituted fluorenyl group; $X^3$ represents a hydrogen atom, a halogen atom, an alkyl group having from 1 to 20 carbon atoms, an aryl, alkylaryl or arylalkyl group having from 6 to 20 carbon atoms; Z represents $SiR^{14}_2$, $CR^{14}_2$, $SiR^{14}_2SiR^{14}_2$, $CR^{14}_2CR^{14}_2$, $CR^{14}_2CR^{14}_2CR^{14}_2{=}CR^{14}$, $CR^{14}_2SiR^{14}_2$ or $GeR^{14}_2$; $Y^1$ represents —N($R^{15}$)—, —O—, —S—, or —P($R^{15}$)—; $R^{14}$ represents a hydrogen atom, or an alkyl, aryl, silyl, halogenoalkyl or halogenoaryl group having at most 20 non-hydrogen atoms, or is a combination of such groups; $R^{15}$ represents an alkyl group having from 1 to 10 carbon atoms, or an aryl group having from 6 to 10 carbon atoms, or it may form a closed ring system along with one or more $R^{14}$'s and at most 30 non-hydrogen atoms; and w indicates 1 or 2.

Examples of the compounds of formula (II-11) are (tert-butylamido) (tetramethyl-$\eta^5$-cyclopentadienyl)-1,2-ethanediylzirconium dichloride, (tert-butylamido) (tetramethyl-$\eta^5$-cyclopentadienyl)-1,2-ethanediyltitanium dichloride, (methylamido)(tetramethyl-$\eta^5$-cyclopentadienyl)-1,2-ethanediylzirconium dichloride, (methylamido) (tetramethyl-$\eta^5$-cyclopentadienyl)-1,2-ethanediyltitanium dichloride.

The above (v) includes transition metal compounds of the following general formula (II-12) and their derivatives.

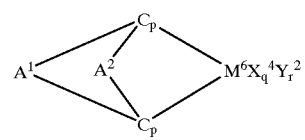

(II-12)

wherein $M^6$ represents a titanium, zirconium or hafnium atom; $C_p$ represents a ligand selected from a cyclopentadienyl group, a substituted cyclopentadienyl group, an indenyl group, a substituted indenyl group, a heterocyclopentadienyl group, a substituted heterocyclopentadienyl group, an amido group, a phosphido group, a hydrocarbon group and a silicon-containing group, and this forms a crosslinked structure via $A^1$ and $A^2$; two $C_p$'s may be the same or different; $X^4$ represents a σ-bonding ligand; plural $X^4$'s, if any, may be the same or different, and may be crosslinked with other $X^4$, $C_p$ or $y^2$; $y^2$ represents a Lewis base; plural $y^2$'s, if any, may be the same or different, and may be crosslinked with other $y^2$, $C_p$ or $X^4$; $A^1$ and $A^2$ each are a divalent crosslinking group that bonds the two ligands, representing a hydrocarbon group having from 1 to 20 carbon atoms, a halogen-containing hydrocarbon group having from 1 to 20 carbon atoms, a silicon-containing group, a germanium-containing group, a tin-containing group, —O—, —CO—, —S—, —SO$_2$—, —NR$^{16}$—, —PR$^{16}$—, —P(O)R$^{16}$—, —BR$^{16}$—, or —AlR$^{16}$—; $R^{16}$ represents a hydrogen atom, a halogen atom, a hydrocarbon group having from 1 to 20 carbon atoms, or a halogen-containing hydrocarbon group having from 1 to 20 carbon atoms; $A^1$ and $A^2$ may be the same or different; l is an integer of from 1 to 5, indicating [(atomic valency of $M^6$)−2]; and r is an integer of from 0 to 3.

In the transition metal compounds of formula (II-12) (hereinafter referred to as double-crosslinked complexes), $M^6$ is titanium, zirconium or hafnium, and is preferably zirconium or hafnium. As so mentioned in the above, $C_p$ represents a ligand selected from a cyclopentadienyl group, a substituted cyclopentadienyl group, an indenyl group, a substituted indenyl group, a heterocyclopentadienyl group, a substituted heterocyclopentadienyl group, an amido group (—N<), a phosphido group (—P<), a hydrocarbon group (>CR$^{17}$—, >C<), and a silicon-containing group (>SiR$^{17}$—, >C<) (in which $R^{17}$ represents a hydrogen atom, a hydrocarbon group having from 1 to 20 carbon atoms, or a hetero atom-containing group), and this $C_p$ forms a crosslinked structure via $A^1$ and $A^2$; and two $C_p$'s may be the same or different. $C_p$ is preferably a cyclopentadienyl group, a substituted cyclopentadienyl group, an indenyl group or a substituted indenyl group.

Examples of the σ-bonding ligand for $X^4$ are a halogen atom, a hydrocarbon group having from 1 to 20 carbon atoms, an alkoxy group having from 1 to 20 carbon atoms, an aryloxy group having from 6 to 20 carbon atoms, an amido group having from 1 to 20 carbon atoms, a silicon-containing group having from 1 to 20 carbon atoms, a phosphido group having from 1 to 20 carbon atoms, a sulfido group having from 1 to 20 carbon atoms, and an acyl group having from 1 to 20 carbon atoms. Plural $X^4$'s, if any, may be the same or different, and may be crosslinked with other $X^4$, $C_p$ or $y^2$.

Examples of the Lewis base for $y^2$ are amines, ethers, phosphines, and thioethers. Plural $y^2$'S, if any, may be the same or different, and may be crosslinked with other $y^2$, $C_p$ or $X^4$.

Preferably, at least one crosslinking group of $A^1$ and $A^2$ is a hydrocarbon group. For example, it is represented by:

wherein $R^{18}$ and $R^{19}$ each represent a hydrogen atom, or a hydrocarbon group having from 1 to 20 carbon atoms, and these may be the same or different, and may be bonded to each other to form a cyclic structure; and e indicates an integer of from 1 to 4.

Examples of the group are a methylene group, an ethylene group, an ethylidene group, a propylidene group, an isopropylidene group, a cyclohexylidene group, a 1,2-cyclohexylene group, and a vinylidene group (CH$_2$=C=). Of those, preferred are a methylene group, an ethylene group and an isopropylidene group. $A^1$ and $A^2$ may be the same or different.

In the transition metal compounds of formula (II-12) in which $C_p$ is a cyclopentadienyl group, a substituted cyclopentadienyl group, an indenyl group or a substituted indenyl group, the crosslinking bond of $A^1$ and $A^2$ may be either a (1,1')(2,2')-double-crosslinking bond or a (1,2')(2,1')-double-crosslinking bond. Of the transition metal compounds of formula (II-12) of the type, preferred are those of the following general formula (II-12a) having, as the ligand, a double-crosslinked biscyclopentadienyl derivative.

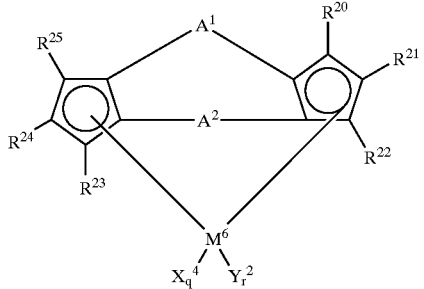

(II-12a)

In formula (II-12a), $M^6$, $A^1$, $A^2$, q and r have the same meanings as above. $X^4$ represents a σ-bonding ligand, and plural $X^4$'s, if any, may be the same or different, and may be crosslinked with other $X^4$ or $Y^2$. For examples of $X^4$ in formula (II-12a), referred to are the same as those mentioned hereinabove for $X^4$ in formula (II-12). $Y^2$ represents a Lewis base, and plural $Y^2$'s, if any, may be the same or different, and may be crosslinked with other $Y^2$ or $X^4$. For examples of $Y^2$ in formula (II-12a), referred to are the same as those mentioned hereinabove for $Y^2$ in formula (II-12). $R^{20}$ to $R^{25}$ each represent a hydrogen atom, a halogen atom, a hydrocarbon group having from 1 to 20 carbon atoms, a halogen-containing hydrocarbon group having from 1 to 20 carbon atoms, a silicon-containing group, or a hetero atom-containing group, but at least one of them must not be a hydrogen atom. $R^{20}$ to $R^{25}$ may be the same or different, and the neighboring groups of these may be bonded to each other to form a ring.

In the transition metal compounds having a ligand of such a double-crosslinked biscyclopentadienyl derivative, the ligand may be in any form of (1,1')(2,2')-double-crosslinking or (1,2')(2,1')-double-crosslinking. Examples of the transition metal compounds of formula (II-12) are (1,1'-ethylene)(2,2'-ethylene)-bis(indenyl)zirconium dichloride, (1,2'-ethylene)(2,1'-ethylene)-bis(indenyl)zirconium dichloride, (1,1'-methylene) (2,2'-methylene)-bis(indenyl) zirconium dichloride, (1,2'-methylene)(2,1'-methylene)-bis(indenyl)zirconium dichloride, (1,1'-isopropylidene)(2,2'-isopropylidene)-bis(indenyl)zirconium dichloride, (1,2'-isopropylidene)(2,1'-isopropylidene)-bis(indenyl)zirconium dichloride, (1,1'-ethylene)(2,2'-ethylene)-bis(3-methylindenyl)zirconium dichloride, (1,2'-ethylene)(2,1'-ethylene)-bis(3-methylindenyl)zirconium dichloride, (1,1'-ethylene)(2,2'-ethylene)-bis(4,5-benzoindenyl)zirconium dichloride, (1,2'-ethylene)(2,1'-ethylene)-bis(4,5-benzoindenyl)zirconium dichloride, (1,1'-ethylene)(2,2'-ethylene)-bis(4-isopropylindenyl)zirconium dichloride, (1,2'-ethylene)(2,1'-ethylene)-bis(4-isopropylindenyl)zirconium dichloride, (1,1'-ethylene)(2,2'-ethylene)-bis(5,6-dimethylindenyl)zirconium dichloride, (1,2'-ethylene)(2,1'-ethylene)-bis(5,6-dimethylindenyl)zirconium dichloride, (1,1'-ethylene)(2,2'-ethylene)-bis(4,7-diisopropylindenyl)zirconium dichloride, (1,2'-ethylene)(2,1'-ethylene)-bis(4,7-diisopropylindenyl)zirconium dichloride, (1,1'-ethylene)(2,2'-ethylene)-bis(4-phenylindenyl)zirconium dichloride, (1,2'-ethylene)((2,1'-ethylene)-bis(4-phenylindenyl)zirconium dichloride, (1,1'-ethylene)(2,2'-ethylene)-bis(3-methyl-4-isopropylindenyl)zirconium dichloride, (1,2'-ethylene)(2,1'-ethylene)-bis(3-methyl-4-isopropylindenyl)zirconium dichloride, (1,1'-ethylene)(2,2'-ethylene)-bis(5,6-benzoindenyl)zirconium dichloride, (1,2'-ethylene)(2,1'-ethylene)-bis(5,6-benzoindenyl)zirconium dichloride, (1,1'-ethylene)(2,2'-isopropylidene)-bis(indenyl)zirconium dichloride, (1,2'-ethylene)(2,1'-isopropylidene)-bis(indenyl)zirconium dichloride, (1,1'-isopropylidene)(2,2'-ethylene)-bis(indenyl) zirconium dichloride, (1,2'-ethylene)(2,1'-ethylene)-bis (indenyl)zirconium dichloride, (1,1'-methylene)(2,2'-ethylene)-bis(indenyl)zirconium dichloride, (1,1'-ethylene)(2,2'-methylene)-bis(indenyl)zirconium dichloride, (1,1'-methylene)(2,2'-isopropylidene)-bis(indenyl)zirconium dichloride, (1,2'-methylene)(2,1'-isopropylidene)-bis(indenyl)zirconium dichloride, (1,1'-isopropylidene)(2,2'-methylene)-bis(indenyl)zirconium dichloride, (1,1'-methylene)(2,2'-methylene)(3-methylcyclopentadienyl)(cyclopentadienyl)zirconium dichloride, (1,1'-isopropylidene)(2,2'-isopropylidene)(3-methylcyclopentadienyl)(cyclopentadienyl)zirconium dichloride, (1,1'-propylidene)(2,2'-propylidene)(3-methylcyclopentadienyl)(cyclopentadienyl)zirconium dichloride, (1,1'-ethylene)(2,2'-methylene)-bis(3-methylcylopentadienyl)zirconium dichloride, (1,1'-methylene)(2,2'-ethylene)-bis(3-methylcyclopentadienyl)zirconium dichloride, (1,1'-isopropylidene)(2,2'-ethylene)-bis(3-methylcyclopentadienyl)zirconium dichloride, (1,1'-ethylene)(2,2'-isopropylidene)-bis(3-methylcyclopentadienyl)zirconium dichloride, (1,1'-methylene)(2,2'-methylene)-bis(3-methylcyclopentadienyl) zirconium dichloride, (1,1'-methylene)(2,2'-isopropylidene)-bis(3-methylcyclopentadienyl)zirconium dichloride, (1,1'-isopropylidene)(2,2'-isopropylidene)-bis(3-methylcyclopentadienyl)zirconium dichloride, (1,1'-ethylene)(2,2'-methylene)-bis(3,4-dimethylcyclopentadienyl)zirconium dichloride, (1,1'-ethylene)(2,2'-isopropylidene)-bis(3,4-dimethylcyclopentadienyl)zirconium dichloride, (1,1'-methylene)(2,2'-methylene)-bis(3,4-dimethylcyclopentadienyl)zirconium dichloride, (1,1'-methylene)(2,2'-isopropylidene)-bis(3,4-dimethylcyclopentadienyl)zirconium dichloride, (1,1'-isopropylidene)(2,2'-isopropylidene)-bis(3,4-dimethylcyclopentadienyl)zirconium dichloride, (1,2'-ethylene)(2,1'-methylene)-bis(3-methylcyclopentadienyl) zirconium dichloride, (1,2'-ethylene)(2,1'-isopropylidene)-bis(3-methylcyclopentadienyl)zirconium dichloride, (1,2'-methylene)(2,1'-methylene)-bis(3-methylcyclopentadienyl) zirconium dichloride, (1,2'-methylene)(2,1'-isopropylidene)-bis(3-methylcyclopentadienyl)zirconium dichloride, (1,2'-isopropylidene)(2,1'-isopropylidene)-bis(3-methylcyclopentadienyl)zirconium dichloride, (1,2'-ethylene)(2,1'-methylene)-bis(3,4- dimethylcyclopentadienyl)zirconium dichloride, (1,2'-ethylene)(2,1'-isopropylidene)-bis(3,4-dimethylcyclopentadienyl)zirconium dichloride, (1,2'-methylene)(2,1'-methylene)-bis(3,4-dimethylcyclopentadienyl)zirconium dichloride, (1,2'-methylene)(2,1'-isopropylidene)-bis(3,4-dimethylcyclopentadienyl)zirconium dichloride, (1,2'-isopropylidene)(2,1'-isopropylidene)-bis(3,4-dimethylcyclopentadienyl)zirconium dichloride, and their derivatives in which zirconium is replaced with titanium or hafnium. For the component (A), two or more of the compounds may be used as combined.

The component (B) (components (B-1) and (B-2)) may be the same as the component (B) (components (B-1) and (B-2)) to be in the catalyst for the macromonomer production mentioned above.

Like that for the macromonomer production, the catalyst for the graft copolymer production in the invention comprises the component (A), the component (B) and optionally an organoaluminium compound for the component (C), and the catalyst components may be held on a carrier or may be subjected to prepolymerization before use. For the details of the catalyst for the graft copolymer production, referred to are the same as those mentioned hereinabove.

In producing the propylene graft copolymer of the invention, a Ziegler-Natta catalyst may also be used. For the details of the Ziegler-Natta catalyst, referred to are the same as those mentioned in the section of the first aspect of the invention.

The comonomer for producing the graft copolymer of the invention includes ethylene, propylene, α-olefins having from 4 to 20 carbon atoms, cyclic olefins and styrenes such as those mentioned hereinabove. The copolymerization may be effected in the same manner and under the same condition as those mentioned hereinabove. In the invention, one and the same or two or more different types of the above-mentioned propylene macromonomer [1] may be copolymerized with the comonomer, either singly or as combined in any desired ratio. Different types of the macromonomer [1], if combined for copolymerization, may be blended in a mode of solution blending or powder blending, or may be directly blended in a reactor. Preferably, the polymerization condition to be employed in the invention is such that the resulting copolymer may have a higher molecular weight, for which, for example, the monomer concentration is increased.

The method for producing the propylene graft copolymer of the invention is described more concretely. The macromonomer component is first prepared, then this is transferred into a separate polymerization reactor while the catalytic activity is not still lost, and this is copolymerized with the comonomer therein (two-stage polymerization). Alternatively, the copolymerization may be effected in a polymerization reactor that differs from the polymerization reactor in which the macromonomer component is prepared through polymerization. In any of such two-stage polymerization (or more multi-stage polymerization) or separate line polymerization as above, the condition of reaction temperature and reaction pressure may be the same as that for the polymerization to prepare the macromonomer component. For the second stage polymerization in the two-stage polymerization process, a fresh catalyst may be or may not be added to the system after the first stage polymerization. According to the process, obtained are, for example, APP-g-APP, IPP-g-IPP and SPP-g-SPP, for which both the first and second stages of the process are for homopolymerization. For these, X-g-Y indicates that X and Y are grafted. In the process, when suitable catalyst components are combined to prepare a metallocene catalyst and when the thus-prepared metallocene catalyst is used, various types of graft copolymers can be obtained, including, for example, graft copolymers of which the main chain and the side chains have the same stereospecificity, and graft copolymers of which the main chain differs from the side chains in point of the stereospecificity, such as APP-g-IPP, APP-g-SPP, IPP-g-SPP. According to the process, also produced are IPP-g-PE, APP-g-PE, SPP-g-PE and the like in which PE indicates polyethylene. Further produced are IPP-g-(P-co-E), in which (P-co-E) indicates copolymerization (-co-) of propylene (P) and ethylene (E); as well as those in which ethylene (E) is replaced with any of α-olefins having from 4 to 20 carbon atoms such as butene, hexane, octene or the like, or with any of styrene derivatives or cyclic olefins, and those in which IPP is replaced with any of APP or SPP. Examples of the propylene graft copolymer are shown in the following matrix, marked with "O".

TABLE II-1

|  |  | Main Chain | | | | | |
|---|---|---|---|---|---|---|---|
|  |  | P-co-E | P-co-$C_{4-20}$ | P-co-Cy | P-co-St | E-co-$C_{4-20}$ | E-co-Cy |
| Side Chains | P-co-E | 0 | 0 | 0 | 0 | 0 | 0 |
|  | P-co-$C_{4-20}$ |  | 0 | 0 | 0 | 0 | 0 |
|  | P-co-Cy |  |  | 0 | 0 | 0 | 0 |
|  | P-co-St |  |  |  | 0 | 0 | 0 |

P-co-E: propylene-ethylene copolymer
P-co-$C_{4-20}$: propylene-$C_{4-20}$ α-olefin copolymer
P-co-Cy: propylene-cyclic olefin copolymer
P-co-St: propylene-styrene copolymer
E-co-$C_{4-20}$: ethylene $C_{4-20}$ α-olefin copolymer
E-co-Cy: ethylene-cyclic olefin copolymer In the invention, both the first and second steps may be effected in the presence of a metallocene catalyst, or the second step may be effected in the presence of a Ziegler-Natta catalyst.

[3] Olefin Resin Composition:

The olefin resin composition of the invention comprises 100 parts by weight of a thermoplastic resin and from 0.05 to 70 parts by weight of the above-mentioned propylene macromonomer [1] or propylene graft copolymer [2]. Preferably, it comprises 100 parts by weight of a thermoplastic resin and from 0.1 to 65 parts by weight, more preferably from 0.2 to 60 parts by weight, even more preferably from 0.3 to 50 parts by weight, most preferably from 0.35 to 40 parts by weight of the above-mentioned propylene macromonomer [1] or olefin graft copolymer [2]. If the amount of the macromonomer [1] or the copolymer [2] serving as a compatibilizer is smaller than 0.05 parts by weight in the resin composition, the absolute amount of the compatibilizer is not enough and the compatibilizer will be ineffective for improving the physical-properties of the resin composition. However, if its amount is larger than 70 parts by weight, the propylene macromonomer [1] or the propylene graft copolymer [2] is to be the main ingredient of the resin composition, and, if so, the macromonomer [1] or the copolymer [2] could not serve as a compatibilizer in the resin composition. In the olefin resin composition of the invention, any of the propylene macromonomer [1] or the propylene graft copolymer [2] may be used. Preferably, however, the resin composition contains the propylene graft copolymer [2].

The thermoplastic resin to be in the resin composition includes, for example, polyolefin resins, polystyrene resins, condensed polymers having an increased molecular weight, and polymers produced through addition polymerization and having an increased molecular weight. Examples of the polyolefin resins are high-density polyethylene, low-density polyethylene, poly-3-methylbutene-1, poly-4-methylpentene-1; linear low-density polyethylene copolymerized with any of butene-1, hexene-1, octene-1,4-methylpentene-1, or 3-methylbutene-1; saponified ethylene-vinyl acetate copolymer, ethylene-acrylic acid copolymer, ethylene-acrylate copolymer, ethylene ionomer, and polypropylene. Examples of the polystyrene resins are general polystyrene, isotactic polystyrene, and high-impact polystyrene (modified with rubber). Examples of the condensed polymers having an increased molecular weight are polyacetal resin, polycarbonate resin; polyamide resin such as nylon 6 and nylon 6·6; polyester resin such as polyethylene terephthalate and polybutylene terephthalate; polyphenylene-oxide resin, polyimide resin, polysulfone resin, polyether-sulfone resin, and polyphenylene-sulfide resin. Examples of the polymers produced through addition polymerization and having an increased molecular weight are polymers of polar vinyl monomers, and polymers of diene monomers, concretely, polymethyl methacrylate, polyacrylonitrile, acrylonitrile-butadiene copolymer, acrylonitrile-butadiene-styrene copolymer, diene polymer in which the diene chain is hydrogenated, and thermoplastic elastomer.

In the olefin resin composition of the invention, one preferred combination of thermoplastic resins is a polyolefin—polyolefin combination. For example, it includes a combination of polypropylene and polyethylene such as LLDPE, LDPE or HDPE; a combination of polypropylene and a soft olefin polymer such as ethylene/propylene copolymer, thermoplastic elastomer, EPDM or EPR; a combination of polyethylene and a soft olefin polymer such as ethylene/propylene copolymer, thermoplastic elastomer, EPDM or EPR; a combination of polypropylene and polystyrene such as APS, IPS or SPS; a combination of polypropylene and propylene/α-olefin copolymer; a combination of polyethylene and polystyrene such as APS, IPS or SPS; a combination of polyethylene and ethylene/α-olefin copolymer; a combination of propylene/α-olefin copolymer and polystyrene such as APS, IPS or SPS; a combination of ethylene/α-olefin copolymer and polystyrene such as APS, IPS or SPS; a combination of ethylene/styrene copolymer and polypropylene resin; and a combination of ethylene/styrene copolymer and polyethylene resin. To the composite resin system as above, added is the propylene macromonomer [1] or the propylene graft copolymer [2] serving as a compatibilizer, and the mechanical properties of the resulting resin composition are improved.

Preferably, the olefin resin composition of the invention is such that the relaxation rate of the long-term relaxation component therein, measured through solid $^1$H-NMR, $(1/R_1)$ falls between 1.0 and 2.0 (1/sec), more preferably between 1.2 and 1.8 (1/sec), even more preferably between 1.3 and 1.6 (1/sec). Also preferably, the olefin resin composition of the invention is such that the ratio of the relaxation rate $(1/R_1)$ to the relaxation rate $(1/R_1)_0$ of the long-term relaxation component, measured through solid $^1$H-NMR, of a resin composition containing neither the propylene macromonomer nor the propylene graft copolymer, $[(1/R_1)/(1/R_1)_0]$, satisfies the following relationship:

$$[(1/R_1)/(1/R_1)_0] \geq 1.01.$$

Satisfying it, the resin compatibility in the composition is good.
More preferably, the ratio satisfies;
$$[(1/R_1)/(1/R_1)_0] \geq 1.02,$$

even more preferably, $$[(1/R_1)/(1/R_1)_0] \geq 1.03.$$

In the invention, the values $(1/R_1)$ and $(1/R_1)_0$ of the resin compositions are measured according to a method of inversion recovery (180°-τ-90°, pulse process), using a solid $^1$H-NMR device mentioned below.

Device: BRUKER's CPX-90

Nucleus to be measured: hydrogen nucleus ($^1$H)

Frequency: 90 MHz

Temperature: 30° C.

90° pulse width: 2.4 to 2.5 microseconds

For producing the olefin resin composition of the invention, employable is a melt blending method or a solution blending method. If desired, an antioxidant (e.g., BHT) may be added to the composition.

The invention is described in more detail with reference to the following Examples, which, however, are not intended to restrict the scope of the invention.

First mentioned are the methods for analyzing and evaluating the macromonomer, the graft copolymer and the resin composition of the invention.

(1) "Analysis of Macromonomer"

<1> Measurement through $^1$H-NMR:

The terminal structure of each sample is measured under the condition mentioned below. The result is shown in Table II-2.

Device: JEOL's JNM-LA500

Frequency: 10000 Hz

Pulse width: 2.9 μsec (450)

Pulse repetition time: 9 sec

Integration frequency: 500 times

Solvent: 1,2,4-trichlorobenzene/heavy benzene (9/1 by volume)

Temperature: 130° C.

The spectral pattern has peaks based on the terminal vinyl group at 5.8 ppm and 5.0 ppm, and a minor peak based on the terminal vinylidene group at 4.7 ppm. The ratio of the terminal vinyl group to all the terminal unsaturated groups is calculated, and it indicates the vinyl selectivity of the sample.

<2> Measurement of Weight-average Molecular Weight (Mw) through GPC:

The weight-average molecular weight (Mw) of each sample is measured under the condition mentioned below.

Device: Waters 150C
   Detector, RI
   Columns (two), Shodex UT-806M
Condition: Solvent: TCB
   Temperature; 145° C.
   Flow Rate: 1.0 ml/min
   Sample Concentration: 0.2%

Calibration Curve: Universal Calibration

<3> Monomer Composition Analysis:

From the monomer-based peak intensity in the $^1$H-NMR spectral pattern, the monomer composition is determined in an ordinary manner.

(2) "Analysis of Graft Copolymer"

<1> Measurement of Macromonomer Content:

According to the method <1> for "Analysis of Macromonomer" mentioned above, each graft copolymer sample is analyzed through $^1$H-NMR, and the macromonomer content of the graft copolymer is calculated from the compositional ratio of propylene/ethylene in the graft copolymer and the compositional ratio of propylene/ethylene in the macromonomer.

<2> Measurement of Intrinsic Viscosity [η]:

In a solvent decalin at 135° C., the intrinsic viscosity [η] of each sample is measured, and corrected according to the Huggins' viscosity equation in which the Huggins' constant is 0.35.

<3> Measurement of Molecular Weight Distribution (Mw/Mn):

Each sample is analyzed according to the method <1> for "Analysis of Macromonomer" mentioned above, and its molecular weight distribution is calculated from the data.

<4> Melting Point:

Using a differential scanning calorimeter (Parkin Elmer's DSC-7), 10 mg of each sample is heated and melted in a nitrogen atmosphere at 230° C. for 3 minutes, then cooled to 0° C. at a cooling rate of 10° C./min, kept at 0° C. for 3 minutes, and thereafter again heated at a heating rate of 10° C./min. The peak top of the highest peak in the endothermic curve of the sample melt is read, and this is the melting point (° C.) of the sample.

(3) "Analysis of Olefin Resin Composition"

<1> In a solvent decalin at 135° C., the intrinsic viscosity [η] of each sample of olefin resin compositions is measured, and corrected according to the Huggins' viscosity equation in which the Huggins' constant is 0.35.

<2> Using a solid $^1$H-NMR device mentioned below, the relaxation rate of the long-term relaxation component of each sample of resin compositions, $(1/T_1)$ and $(1/T_1)_0$, was measured according to a method of inversion recovery (180°-τ-90°, pulse process).

Device: BRUKER's CPX-90

Nucleus to be measured: hydrogen nucleus ($^1$H)

Frequency: 90 MHz

Temperature: 30° C.

90° pulse width: 2.4 to 2.5 microseconds

Measured through DSC and solid $^1$H-NMR (solid echo process), the degree of crystallization was the same between PP and HDPE.

EXAMPLE II-1

Production of Propylene/ethylene Copolymerized Macromonomer (1) Synthesis of (pentamethylcyclopentadienyl)(tetramethylcyclopentadienyl)-zirconium dichloride:

10.0 g (33.6 mmols) of (pentamethylcyclopentadienyl) zirconium trichloride, and 150 ml of tetrahydrofuran were put into a 300-ml two-neck egg-plant flask. To this, dropwise added was a tetrahydrofuran solution (50 ml) of 4.3 g (33.6 mmols) of (tetramethylcyclopentadienyl) lithium that had been separately prepared at 0° C. This was warmed up to room temperature, and then stirred as such for 8 hours. The solvent was evaporated away, and the residue was extracted in 100 ml of dichloromethane. The resulting extract was concentrated and cooled to −20° C. to obtain 5.8 g of (pentamethylcyclopentadienyl)(tetramethylcyclopentadienyl)zirconium dichloride. A part of this was collected and dissolved in dewatered toluene to prepare a catalyst solution having a concentration of 10 μmols/ml.

(2) Production of Copolymerized Macromonomer:

In a nitrogen atmosphere, 1000 ml of dewatered toluene, 10 mmols (in terms of Al) of ALBEMARLE's methylaluminoxane, and 10 μmols of the (pentamethylcyclopentadienyl)(tetramethylcyclopentadienyl)zirconium dichloride prepared in the above (1) were put into a 2-liter stainless pressure autoclave equipped with a stirrer. With stirring, this was heated up to 40° C. Propylene at a rate of 10 normal liters/min and ethylene at a rate of 0.5 normal liters/min were continuously fed into the autoclave, and the total pressure of the reaction system was kept at 0.5 MPa (gauge). In that condition, the monomers were copolymerized for 60 minutes.

After the reaction, the autoclave was degassed and opened, and the reaction mixture was taken out and put into a large amount of methanol to wash the macromonomer. The viscous macromonomer was collected, and dried under reduced pressure at 80° C. for 30 hours. The yield of the propylene-ethylene copolymerized macromonomer obtained was 68.4 g. This was analyzed according to the above-mentioned "Analysis of Macromonomer", and its data are shown in Table II-2.

EXAMPLE II-2

Production of Propylene/ethylene Copolymerized Macromonomer (1) Production of Copolymerized Macromonomer:

In the same manner as in Example II-1 (2), 37 g of a propylene/ethylene copolymerized macromonomer was obtained, for which, however, the feed rate of ethylene was 0.2 normal liters/min.

(2) Analysis of Copolymerized Macromonomer:

The macromonomer was analyzed in the same manner as in Example II-1, and its data are shown in Table II-2.

EXAMPLE II-3

Production of Propylene Macromonomer (1) Preparation of Aluminoxane:

For use herein, methylaluminoxane was processed in the following manner.

1.0 liter of a toluene solution of methylaluminoxane (1.5 mols/liter, from ALBEMARLE, containing 14.5% by weight of trimethylaluminium) was vaporized under reduced pressure (10 mmHg) at 60° C. to remove the solvent, and then dried up. In this condition, this was kept as it was for 4 hours, and then cooled to room temperature to obtain dry-up methylaluminoxane. The dry-up methylaluminoxane was re-dissolved in dewatered toluene added thereto, to thereby restore its volume to the original before solvent removal. Then, the trimethylaluminium content of the methylaluminoxane solution was determined through $^1$H-NMR, and was 3.6% by weight. The total aluminium content of the methylaluminoxane solution was measured according to a fluorescent X-ray (ICP) method, and was 1.32 mols/liter. Then, the solution was statically left as it was for 2 full days to thereby make the insoluble component deposited therein. The supernatant was filtered through a G5 glass filter in a nitrogen atmosphere to recover the filtrate. This is methylaluminoxane (a) for use herein. Its concentration measured through ICP was 1.06. From the thus-processed methylaluminoxane, 10.9% by weight of organoaluminium and 17.3% by weight of the insoluble component were removed.

(2) Preparation of Carrier for Olefin Polymerization Catalyst:

27.1 g of SiO$_2$ (Fuji Silicia Chemical's P-10) was dried under reduced pressure at 200° C. for 4.0 hours in a slight nitrogen atmosphere, and 25.9 g of dry SiO$_2$ was obtained. The dry SiO$_2$ was put into 400 ml of dewatered toluene that had been previously cooled to −78° C. in a bath of dry ice/methanol, and stirred. With still stirring, 145.5 ml of a toluene solution of the methylaluminoxane (a) prepared in the above (1) was dropwise added to the toluene suspension of SiO$_2$, over a period of 2 hours all through a dropping funnel.

Next, this was stirred for 4.0 hours, and then warmed from −78° C. up to 20° C. over a period of 6 hours, and this was kept in this condition for 4.0 hours. Next, this was heated from 20° C. up to 80° C. over a period of 1 hour, and then left at 80° C. for 4.0 hours to thereby complete the reaction of silica and methylaluminoxane therein. The resulting suspension was filtered at 80° C., and the solid thus obtained was washed twice with 400 ml of dewatered toluene at 60° C. and then twice with 400 ml of dewatered n-heptane at 60° C. After thus washed, the solid was dried under reduced pressure at 60° C. for 4.0 hours, and 33.69 g of SiO$_2$-held methylaluminoxane was obtained. This serves as a carrier for olefin polymerization catalyst. The proportion of methylaluminoxane held on SiO$_2$ was 30.1% per gram of SiO$_2$.

To all the thus-obtained, SiO$_2$-held methylaluminoxane, added was dewatered n-heptane to make 500 ml. The methylaluminoxane concentration in the suspension thus obtained herein was 0.27 mols/liter.

(3) Preparation of Catalyst Component:

2.0 mmols (7.41 ml) of the SiO$_2$-held methylaluminoxane prepared in the above (2) was put into a 50-ml container that had been purged with dry nitrogen, to which was added 20 ml of dewatered toluene and stirred. To the resulting suspension, added was 1.0 ml (10 μmols) of the toluene solution of (pentamethylcyclopentadienyl)(tetramethylcyclopentadienyl)zirconium dichloride prepared in Example II-1, and kept stirred at room temperature for 0.5 hours. Stirring it was stopped, and the solid catalyst component was deposited. The thus-deposited solid catalyst component was found red and the solution was colorless transparent. The solution was removed through decantation, 20 ml of n-heptane was added to the residue, and an SiO$_2$-held metallocene catalyst slurry was thus obtained.

(4) Production of Polymer:

In a nitrogen atmosphere, 1000 ml of dewatered toluene, 0.5 mmols of triisobutylaluminium (TIBA), and 10 μmols, in terms of zirconium, of the carrier-held catalyst prepared in the above (3) were put into a 2-liter stainless pressure autoclave equipped with a stirrer. This was stirred and kept at 15° C. Propylene to have a pressure of 0.8 MPa (gauge) was introduced into it for 120 minutes and polymerized into a polymer.

After the reaction, the autoclave was degassed and opened, and the reaction mixture was taken out and put into a large amount of methanol to wash the macromonomer. The viscous macromonomer was collected, and dried under reduced pressure at 80° C. for 30 hours. The yield of the propylene macromonomer obtained was 45 g.

(5) Analysis of Macromonomer:

This was analyzed in the same manner as in Example II-1, and its data are shown in Table II-2.

In the Table, "Example 1" means "Example II-1", and the same shall apply to all the other Examples and Comparative Examples.

TABLE II-2

| Details | Example 1 | Example 2 | Example 3 |
|---|---|---|---|
| Resin Properties | | | |
| Terminal Vinyl Selectivity (%) | 95.4 | 95.5 | 91.7 |
| Mw | 1280 | 1010 | 2500 |
| Propylene Content (mol %) | 63 | 82 | 100 |
| Ethylene Content (mol %) | 37 | 18 | 0 |

EXAMPLE II-4

Production of Graft Copolymer:

(1) Preparation of Catalyst Component:

A catalyst component was prepared in the same manner as in Example II-3 (3), for which, however, used was 5 μmols of racemi-dimethylsilyldiyl-bis[2-methyl-4-phenylindenyl]zirconium dichloride [rac-Me$_2$Si-(2Me-4-Ph-Ind)$_2$ZrCl$_2$] in place of 10 μmols of (pentamethylcyclopentadienyl)(tetramethylcyclopentadienyl)zirconium dichloride.

(2) Production of Graft Copolymer:

10 g of the macromonomer produced in Example II-1 (2) was dissolved in toluene, and bubbled with nitrogen to attain complete oxygen removal and water removal from it. In a nitrogen atmosphere, 200 ml of the heptane solution of the macromonomer, 0.5 mmols of triisobutylaluminium (TIBA), and 5 μmols, in terms of zirconium, of the carrier-held catalyst prepared in the above (1) were put into a 1.6-liter stainless pressure autoclave equipped with a stirrer. This was stirred and kept at 60° C. Propylene to have a pressure of 0.6 MPa (gauge) was introduced into it for 120 minutes and polymerized into a polymer.

After the reaction, the autoclave was degassed and opened, and the reaction mixture was taken out and filtered to recover the graft copolymer. This was washed repeatedly four times with a large amount of heptane to remove the non-reacted macromonomer. The thus-washed graft copolymer was dried under reduced pressure at 80° C. for 6 hours. The yield of the copolymer was 30 g. This was analyzed according to "Analysis of Graft Copolymer" mentioned above, and its data are shown in Table II-3.

EXAMPLE II-5

Production of Graft Copolymer:

In the same manner as in Example II-4, produced was an ethylene graft copolymer; for which, however, 10 g of the macromonomer produced in Example II-3 (4) was used, and ethylene and not propylene was introduced into the system to have a pressure of 0.1 MPa (gauge) with 30 ml of hydrogen added thereto. The yield of the graft copolymer was 45 g. This was analyzed in the same manner as in Example II-4, according to "Analysis of Graft Copolymer" mentioned above, and its data are shown in Table II-3.

EXAMPLE II-6

Production of Graft Copolymer

In the same manner as in Example II-4, produced was a graft copolymer, for which, however, 10 g of the macromonomer produced in Example II-3 was used. The yield of the graft copolymer was 40 g. This was analyzed in the same manner as in Example II-4, according to "Analysis of Graft Copolymer" mentioned above, and its data are shown in Table II-3.

TABLE II-3

| Details | Example 4 | Example 5 | Example 6 |
|---|---|---|---|
| Intrinsic Viscosity [η] (dl/g) | 2.68 | 1.66 | 2.55 |
| Macromonomer Content (wt. %) | 0.2 | 0.5 | 0.2 |
| Mw/Mn | 2.1 | 2.0 | 1.8 |
| Melting Point (° C.) | 146 | 132 | 146 |

EXAMPLE II-7

Production of Resin Composition
(1) Preparation of Resin Composition:

A polymer comprised of 90% by weight of IPP mentioned below and 10% by weight of APP also mentioned below, and containing 5.0 parts by weight, relative to the total weight of these IPP and APP, of the graft copolymer that had been prepared in Example II-4 was dissolved under heat in xylene containing 4000 ppm of an antioxidant, BHT. The resulting mixture was re-precipitated in a large amount of methanol, and dried to prepare a resin composition.

IPP:

This is isotactic polypropylene prepared by polymerizing polypropylene in a solvent heptane in the presence of racemi-dimethylsilyldiyl-bis[2-methyl-4-phenylindenyl] zirconium dichloride, rac-Me$_2$Si-[2-Me-4-Ph-Ind]$_2$ZrCl$_2$, and methylaluminoxane (MAO). Its intrinsic viscosity [η] is 2.76 dl/g; and its melting point is 148° C.

APP:

This is atactic polypropylene prepared by polymerizing propylene in a solvent toluene in the presence of a catalyst CP*Me$_2$Si(tBuN)TiCl$_2$/MAO (so-called CGC catalyst). Its intrinsic viscosity [η] is 3.10 dl/g.

(2) Analysis of Olefin Resin Composition:

The resin composition was analyzed according to "Analysis of Olefin Resin Composition" mentioned above, and its data are shown in Table II-4.

EXAMPLE II-8

Production of Resin Composition:

A resin composition was produced in the same manner as in Example II-7, for which, however, used was 1.0 part by weight of the graft copolymer prepared in Example II-4. Its data are shown in Table II-4.

COMPARATIVE EXAMPLE II-1

Production of Resin Composition

A resin composition was produced in the same manner as in Example II-7, for which, however, the graft copolymer of a Example II-4 was not used. Its data are shown in Table II-b 4.

EXAMPLE II-9

Production of Resin Composition

A polymer comprised of 90% by weight of the same APP as that used in Example II-7 and 10% by weight of Idemitsu Petrochemical's HDPE (grade 440M), and containing 5.0 parts by weight, relative to the total weight of these APP and HDPE, of the graft copolymer that had been prepared in Example II-5 was dissolved under heat in xylene containing 4000 ppm of an antioxidant, BHT. The resulting mixture was re-precipitated in a large amount of methanol, and dried to prepare a resin composition. This was evaluated in the same manner as in Example II-7. Its data are shown in Table II-4.

COMPARATIVE EXAMPLE II-2

Production of Resin Composition

A resin composition was produced in the same manner as in Example II-9, for which, however, the graft copolymer of Example II-5 was not used. Its data are shown in Table II-4.

EXAMPLE II-10

Production of Resin Composition

A resin composition was produced in the same manner as in Example II-7, for which, however, used was the graft copolymer of Example II-6 in place of that of Example II-4. Its data are shown in Table II-4.

COMPARATIVE EXAMPLE II-3

Production of Resin Composition

A resin composition was produced in the same manner as in Example II-7, for which, however, a sample A prepared in the manner mentioned below was used in place of the graft copolymer of Example II-4. Its data are shown in Table II-4.

Sample A:

This is a polymer prepared according to the process of Example II-2 in Japanese Patent Laid-Open No. 23017/1988.

TABLE II-4 (1)

|  | Example 7 | Example 8 | Co. Ex. 1 |
|---|---|---|---|
| IPP (wt. %) | 90 | 90 | 90 |
| APP (wt. %) | 10 | 10 | 10 |
| HDPE (wt. %) | — | — | — |
| Type of Graft | Example 4 | Example 4 | — |
| Copolymer (wt. pts.) | 5.0 | 10 |  |
| Relaxation Rate (1/R$_1$) (1/sec) | 1.45 | 1.50 | — |
| Relaxation Rate (1/R$_1$)$_0$ (1/sec) | — | — | 1.40 |
| Relaxation Rate Ratio [(1/R$_1$)/(1/R$_1$)$_0$] | 1.04 | 1.07 | — |

TABLE II-4 (1)

|  | Example 9 | Co. Ex. 2 | Example 10 | Co. Ex. 3 |
|---|---|---|---|---|
| Resin Composition |  |  |  |  |
| IPP (wt. %) | — | — | 90 | 90 |
| APP (wt. %) | 10 | 10 | 10 | 10 |
| HDPE (wt. %) | 90 | 90 | — | — |
| Type of Graft | Example 5 | — | Example 6 | Sample A |
| Copolymer (wt. pts.) | 5.0 |  | 5.0 | 5.0 |
| Relaxation Rate (1/R$_1$) (1/sec) | 1.60 | — | 1.45 | 1.40 |
| Relaxation Rate (1/R$_1$)$_0$ (1/sec) | — | 1.52 | — | — |
| Relaxation Rate Ratio [(1/R$_1$) (1/R$_1$)$_0$] | 1.05 | — | 1.04 | 1.00 |

EXAMPLE II-11

Production of Ethylene Graft Copolymer

An ethylene graft copolymer was produced in the same manner as in Example II-5, for which, however, used was the macromonomer prepared in Example II-1 (2). Its yield was 35 W g. Its analysis gave the following data.

Intrinsic viscosity [η]: 1.50 dl/g

Macromonomer content: 0.8% by weight

Mw/Mn: 2.2

Melting point: 132° C.

EXAMPLE II-12

Production of Olefin Resin Composition (1) Production of Propylene/ethylene Copolymer:

In a nitrogen atmosphere, 400 ml of dewatered heptane, 1 mmol of triisobutylaluminium, and 0.5 mmols of ALBEMARLE's methylaluminoxane were put into a 1.6-liter stainless pressure autoclave equipped with a stirrer, and kept at 30° C. Propylene gas/ethylene gas in a molar ratio of 3.0/2.4 was introduced into this to have a controlled pressure of 0.5 MPaG.

1.0 ml of a toluene solution of 0.1 μmols of racemi-dimethylsilylbis[2-methyl-4-phenyl-indenyl]zirconium dichloride [rac-SiMe$_2$-(2-Me-4-Ph-Ind)$_2$ZrCl$_2$] was added to this, and the monomers were copolymerized. After copolymerized for 10 minutes, the reaction mixture was put into a large amount of methanol, and filtered to recover the ethylene/propylene copolymer.

Its yield was 16.1 g. The ethylene content of the copolymer was 22 mol %; and the intrinsic viscosity [η] thereof was 1.1.

(2) Preparation of Olefin Resin Composition:

In the same manner as in Example II-7 (1), an olefin resin composition was prepared, for which, however, 3 parts by weight of the ethylene graft copolymer of Example II-11 was added to 100 parts by weight of a polymer mixture comprised of 90% by weight of high-density polyethylene (Idemitsu Petrochemical Is 440M) and 10% by weight of the ethylene/propylene copolymer prepared in the above (1).

(3) Evaluation of Olefin Resin Composition:

The olefin resin composition was evaluated according to "Analysis of Olefin Resin Composition" mentioned above, and its data are shown in Table II-5.

EXAMPLE II-13

Production of Olefin Resin Composition (1) Production of Low-stereospecificity Polypropylene:

<1> Preparation of Magnesium Compound:

A glass reactor having a capacity of about 6 liters and equipped with a stirrer was fully purged with nitrogen gas. About 2430 g of ethanol, 16 g of iodine and 160 g of metal magnesium were put into it, heated with stirring, and reacted under reflux until no hydrogen gas went out of the system, to thereby form a solid reaction product. The reaction liquid containing the solid product was dried under reduced pressure, and a magnesium compound was thus obtained.

<2> Preparation of Solid Catalyst Component (A):

16 g of the magnesium compound obtained in the above <1>, 80 ml of pure heptane, 2.4 ml of silicon tetrachloride, and 2.3 ml of diethyl phthalate were put into a 0.5-liter, three-neck glass flask that had been fully purged with nitrogen gas. This was kept at 90° C., and 77 ml of titanium tetrachloride was added thereto with stirring, and reacted at 110° C. for 2 hours. Then, the solid component was separated from it, and washed with pure heptane at 80° C. 122 ml of titanium tetrachloride was further added thereto, reacted at 110° C. for 2 hours, and then fully washed with pure heptane. Thus was obtained a solid catalyst component (A).

<3> Production of Low-stereospecificity Polypropylene:

20 g of polypropylene powder, 5.0 mmols of triisobutylaluminium (TIBA), 0.125 mmols of 1-allyl-3,4-dimethoxybenzene (ADMB), 0.2 mmols of diphenyldimethoxysilane (DPDMS), and 20 ml of a heptane solution containing 0.05 mmols (in terms of titanium) of the solid catalyst component (A) obtained in the above <2> were put into a 5-liter, stainless pressure autoclave, and this was degassed for 5 minutes. Then, propylene was introduced into it to have a total pressure of 2.8 MPa·G, and polymerized at 70° C. for 1.7 hours in a mode of vapor-phase polymerization.

<4> Properties of Polypropylene:

The polypropylene obtained in the above <3> is a soft polypropylene having the following properties:

(i) boiling heptane-insoluble content: 62.4% by weight, (ii) intrinsic viscosity [η] in a solvent decalin at 135° C.: 4.27 dl/g, (iii) structure: composition of isotactic polypropylene and atactic polypropylene.

(2) Preparation of Olefin Resin Composition;

An olefin resin composition was prepared in the same manner as in Example II-7 (1), for which, however, used were 100 parts by weight of the low-stereospecificity polypropylene obtained in the above (1) and 5 parts by weight of the graft copolymer obtained in Example II-6.

(3) Evaluation of Olefin Resin Composition:

The olefin resin composition was evaluated according to "Analysis of Olefin Resin Composition" mentioned above. Its data are shown in Table II-5.

EXAMPLE II-14

Production of Olefin Resin Composition:

(1) Production of High-rubber Block Copolymer:

<1> Production of Catalyst through Prepolymerization:

48 g of the solid catalyst component (A) prepared in Example II-13 (1)<2> was put into a nitrogen-purged, 1-liter three-neck flask equipped with a stirrer. 400 ml of dewatered heptane was added thereto. This was heated up to 40° C., and 2 mmols of triethylaluminium and 6.3 ml of dicyclopentyldimethoxysilane were added thereto. Propylene gas was introduced into this under ordinary pressure, and reacted with it for 2 hours. The solid component was fully washed with dewatered heptane. This is a solid catalyst (B).

<2> Production of High-rubber Block Polypropylene:

A 5-liter stainless autoclave equipped with a stirrer was fully purged with nitrogen gas, then dried, and thereafter purged with propylene gas. This was kept at 70° C., and propylene gas was introduced into it to have an increased pressure of 0.05 MPaG. In this condition, hydrogen gas was introduced into it to have a partial pressure of 0.9 MPaG, and propylene gas was gradually introduced thereinto to have a further increased pressure of 2.8 MPaG. Apart from this, 20 ml of heptane, 4 mmols of triethylaluminium, 1 mmol of dicyclopentyldimethoxysilane, and 0.02 mmols of the solid catalyst (B) were put into a 60-ml catalyst supply tube that had been purged with nitrogen gas, and these were led into the autoclave through the tube. In the autoclave containing them, propylene was polymerized for 60 minutes into a propylene homopolymer.

Next, the autoclave was degassed to atmospheric pressure, and the homopolymer therein was sampled in a nitrogen atmosphere. The sample is for measuring its intrinsic viscosity [η].

Next, the autoclave was degassed to vacuum, and ethylene/propylene gas in a ratio of 1:1 by mol was introduced thereinto to have an increased pressure of 1.5 MPaG, and copolymerized at 70° C. for 65 minutes. During the copolymerization, the pressure and the monomer flow rate were kept constant. After this, the autoclave was degassed and cooled to room temperature, and the polymer powder was taken out.

Its copolymer moiety formed in the second-stage polymerization was 42.6% by weight.

The intrinsic viscosity of the homopolymer moiety of the block copolymer was 1.0 dl/g; and that of the copolymer moiety thereof was 4.8 dl/g.

(2) Preparation of Olefin Resin Composition:

An olefin resin composition was prepared in the same manner as in Example II-7 (1), for which, however, used were 100 parts by weight of the high-rubber block polypropylene obtained in the above (1) and 5 parts by weight of the graft copolymer obtained in Example II-4.

(3) Evaluation of Olefin Resin Composition:

The olefin resin composition was evaluated according to "Analysis of Olefin Resin Composition" mentioned above. Its data are shown in Table II-5.

COMPARATIVE EXAMPLE II-4

Production of Olefin Resin Composition

An olefin resin composition was prepared in the same manner as in Example II-7 (1), for which, however, a polymer mixture comprised of 90% by weight of high-density polyethylene (Idemitsu Petrochemical's 440M) and 10% by weight of the ethylene/propylene copolymer prepared in Example II-12 (1) was used alone.

(1) Evaluation of Olefin Resin Composition:

The relaxation rate, $(1/R_1)$ and $(1/R_1)_0$, of the olefin resin composition was determined according to "Analysis of Olefin Resin Composition" mentioned above. Its data are shown in Table II-5.

COMPARATIVE EXAMPLE II-5

Production of Olefin Resin Composition

An olefin resin composition was prepared in the same manner as in Example II-7 (1), for which, however, 100 parts by weight of the low-stereospecificity polypropylene prepared in Example II-13 (1) was used alone.

The relaxation rate, $(1/R_1)$ and $(1/R_1)_0$, of the olefin resin composition was determined according to "Analysis of Olefin Resin Composition" mentioned above. Its data are shown in Table II-5.

COMPARATIVE EXAMPLE II-6

Production of Olefin Resin Composition

An olefin resin composition was prepared in the same manner as in Example II-7 (1), for which, however, 100 parts by weight of the high-rubber block polypropylene prepared in Example II-14 (1) was used alone. The relaxation rate, $(1/R_1)$ and $(1/R_1)_0$, of the olefin resin composition was determined according to "Analysis of Olefin Resin Composition" mentioned above. Its data are shown in Table II-5.

TABLE II-5 (1)

| Resin Composition | Example 12 | Example 13 | Example 14 |
|---|---|---|---|
| A (wt. %) | 90 | — | — |
| B (wt. %) | 10 | — | — |
| C (wt. %) | — | 100 | — |
| D (wt. %) | — | — | 100 |
| Type of Graft Polymer (wt. pts.) | Example 11 | Example 6 | Example 4 |
| | 3.0 | 5.0 | 5.0 |
| Relaxation Rate $(1/R_1)$ (1/sec) | 1.52 | 1.47 | 1.57 |
| Relaxation Rate $(1/R_1)_0$ (1/sec) | — | — | — |
| Ratio of Relaxation Rate $[(1/R_1)/((1/R_1)_0]$ | 1.05 | 1.05 | 10.6 |

TABLE II-5 (2)

| | Co. Ex. 4 | Co. Ex. 5 | Co. Ex. 6 |
|---|---|---|---|
| A (wt. %) | 90 | — | — |
| B (wt. %) | 10 | — | — |
| C (wt. %) | — | 100 | — |
| D (wt. %) | — | — | 100 |
| Type of Graft Polymer (wt. pts.) | — | — | — |
| Relaxation Rate $(1/R_1)$ (1/sec) | — | — | — |
| Relaxation Rate $(1/R_1)_0$ (1/sec) | 1.45 | 1.40 | 1.48 |
| Ratio of Relaxation Rate $[(1/R_1)/(1/R_1)_0]$ | — | — | — |

A: HDPE
B: ethylene/propylene copolymer
C: low-stereospecificity polypropylene
D: high-rubber block polypropylene

INDUSTRIAL APPLICABILITY

The olefin branched macromonomer, the propylene macromonomer, the olefin graft copolymer and the olefin resin composition of the invention have the advantage of good compatibility with polyolefin resins, and are therefore expected to much contribute toward expanding the applications of polyolefin resins in the field of compound materials. In addition, these are favorable to the field that requires high-level moldability and workability of resins (for example, for extrusion foaming, large-size blow molding, sheet forming, sheet working, thermoforming).

What is claimed is:

1. An olefin graft copolymer obtained by copolymerizing an atactic branched macromonomer, wherein the macromonomer is derived from monomers selected from the group consisting of (1) propylene and (2) the combination of propylene and at least one selected from ethylene, α-olefins having from 4 to 20 carbon atoms, cyclic olefins and styrenes, and of which the propylene content falls between 0.1 and 100 mol %, and which macromonomer satisfies the following (a) and (b):

(a) its weight-average molecular weight (Mw) measured through gel permeation chromatography (GPC) falls between 400 and 200000;

(b) its vinyl content is at least 70 mol % of all the unsaturated groups in the macromonomer, wherein the macromonomer satisfies each of the following (i), (ii) and (iii):

(i) the ratio of the temperature dependency ($E_2$) of the macromonomer solution viscosity to the temperature dependency ($E_1$) of the solution viscosity of the linear polymer which has the same type of monomer, the same chemical composition and the same intrinsic viscosity as those of the macromonomer, $E_2/E_1$, satisfies the following relationship:

$$1.01 < E_2/E_1 < 2.5;$$

(ii) the ratio of the number-average molecular weight measured through GPC (GPC-Mn) to the number-average molecular weight measured through $^{13}$C-NMR (NMR-Mn) of the macromonomer satisfies the following relationship:

$$(GPC\text{-}Mn)/(NMR\text{-}Mn) > 1;$$

(iii) the macromonomer has branches existing not at the α- and/or β-substituents of the monomer that constitutes the macromonomer, and the number of the branches falls between 0.01 and 40 in one molecule of the macromonomer, with at least one comonomer selected from ethylene, propylene, α-olefins having from 4 to 20 carbon atoms, cyclic olefins and styrenes, in the presence of a metallocene catalyst.

2. The olefin graft copolymer as claimed in claim 1, which satisfies the following (1) and/or (2):
- (1) its intrinsic viscosity [η] measured in a solvent decalin at 135° C. falls between 0.3 and 15 dl/g;
- (2) it contains from 0.01 to 70% by weight of repeat units derived from the atactic branched macromonomer satisfying the following (a) and (b):
- (a) its weight-average molecular weight (Mw) measured through gel permeation chromatography (GPC) falls between 400 and 200000;
- (b) its vinyl content is at least 70 mol % of all the unsaturated groups in the macromonomer.

3. An olefin resin composition comprising 100 parts by weight of a thermoplastic resin, and from 0.05 to 70 parts by weight of the olefin graft copolymer of claim 1.

4. The olefin resin composition as claimed in claim 3, of which the relaxation rate of the long-term relaxation component measured through solid $^1$H-NMR ($1/R_1$) falls between 1.0 and 2.0 (1/sec).

5. An olefin graft copolymer obtained by copolymerizing an atactic propylene macromonomer satisfying the following (a), (b) and (c):
- (a) its weight-average molecular weight (Mw) measured through gel permeation chromatography (GPC) falls between 800 and 500000;
- (b) its vinyl content is at least 70 mol % of all the unsaturated groups in the macromonomer;
- (c) its propylene content falls between 50 and 100 mol %,
- with at least one comonomer selected from ethylene, propylene, α-olefins having from 4 to 20 carbon atoms, cyclic olefins and styrenes, in the presence of a metallocene catalyst,
- which olefin graft copolymer satisfies the following (1), (2), (3) and (4):
- (1) its intrinsic viscosity [η] measured in a solvent decalin at 135° C. falls between 0.7 and 12 dl/g;
- (2) the ratio of the weight-average molecular weight (Mw) to the number-average molecular weight (Mn) thereof measured through GPC, Mw/Mn, falls between 1.5 and 3.0;
- (3) it contains from 0.01 to 40% by weight of repeat units derived from the propylene atactic macromonomer;
- (4) it has no terminal vinyl group in the olefin graft copolymer.

6. An olefin resin composition comprising 100 parts by weight of a thermoplastic resin, and from 0.05 to 70 parts by weight of the propylene graft copolymer of claim 5.

7. The olefin resin composition as claimed in claim 6, of which the relaxation rate of the long-term relaxation component measured through solid $^1$H-NMR ($1/R_1$) falls between 1.0 and 2.0 (1/sec).

8. An olefin resin composition comprising 100 parts by weight of a thermoplastic resin, and from 0.05 to 70 parts by weight of the olefin graft copolymer of claim 2.

9. The olefin resin composition as claimed in claim 8, of which the relaxation rate of the long-term relaxation component measured through solid $^1$H-NMR ($1/R_1$) falls between 1.0 and 2.0 (1/sec).

10. The olefin resin composition as claimed in claim 8, of which the ratio of the relaxation rate of the long-term relaxation component measured through solid $^1$H-NMR ($1/R_1$) falls between 1.0 and 2.0 (1/sec) to the relaxation rate $(1/R_1)_0$ of the long-term relaxation component, measured through solid $^1$H-NMR, of a resin composition not containing the propylene branched macromonomer, $[(1/R_1)/(1/R_1)_0]$ satisfying the following (a) and (b):
- (a) its weight-average molecular weight (Mw) measured through gel permeation chromatography (GPC) falls between 400 and 200000,
- (b) its vinyl content is at least 70 mol % of all the unsaturated groups in the macromonomer, $[(1/R_1)/(1/R_1)_0]$, satisfies the following relationship:

$$[(1/R_1)/(1/R_1)_0] > 1.01.$$

* * * * *